United States Patent
LeMieux

(10) Patent No.: US 9,764,376 B2
(45) Date of Patent: Sep. 19, 2017

(54) SYSTEM FOR RIVET FASTENING

(71) Applicant: David L. LeMieux, Clancy, MT (US)

(72) Inventor: David L. LeMieux, Clancy, MT (US)

( * ) Notice: Subject to any disclaimer, the term of this patent is extended or adjusted under 35 U.S.C. 154(b) by 34 days.

(21) Appl. No.: 14/659,550

(22) Filed: Mar. 16, 2015

(65) Prior Publication Data

US 2015/0251240 A1    Sep. 10, 2015

Related U.S. Application Data

(63) Continuation-in-part of application No. 13/694,379, filed on Nov. 26, 2012, now Pat. No. 8,978,231, which is a continuation-in-part of application No. 12/384,392, filed on Apr. 1, 2009, now Pat. No. 8,316,524.

(51) Int. Cl.
| | |
|---|---|
| *B21J 15/28* | (2006.01) |
| *B21J 15/36* | (2006.01) |
| *G05B 19/4063* | (2006.01) |
| *B21J 15/16* | (2006.01) |
| *B21J 15/02* | (2006.01) |
| *B21J 15/14* | (2006.01) |

(52) U.S. Cl.
CPC ............ *B21J 15/28* (2013.01); *B21J 15/02* (2013.01); *B21J 15/142* (2013.01); *G05B 19/4063* (2013.01); *G05B 2219/14063* (2013.01); *Y10T 29/49943* (2015.01); *Y10T 29/53065* (2015.01)

(58) Field of Classification Search
CPC .......... B21J 15/28; B21J 15/02; B21J 15/142; G05B 19/4063; G05B 2219/14063; Y10T 29/49943; Y10T 29/53065
See application file for complete search history.

(56) References Cited

U.S. PATENT DOCUMENTS

| | | | |
|---|---|---|---|
| 1,803,965 A | 5/1931 | Evans, Sr. |
| 2,354,914 A | 8/1944 | Goldstein |
| 3,478,567 A | 11/1969 | Galutia |
| 3,559,269 A | 2/1971 | Schmitt |
| 3,574,918 A | 4/1971 | Focht |
| 3,933,025 A | 1/1976 | Briles |
| 4,046,039 A | 9/1977 | Griesbach |
| 4,130,006 A | 12/1978 | Ebbert |
| 4,218,911 A | 8/1980 | Johnston |

(Continued)

FOREIGN PATENT DOCUMENTS

| | | |
|---|---|---|
| EP | 0 826 443 A2 | 3/1998 |
| JP | 46-4954 U1 | 2/1971 |

(Continued)

OTHER PUBLICATIONS

Extended European Search Report mailed Aug. 17, 2016, issued in corresponding European Application No. 12888910.2, filed Nov. 26, 2012, 11 pages.

*Primary Examiner* — John C Hong
(74) *Attorney, Agent, or Firm* — Christensen O'Connor Johnson Kindness PLLC

(57) ABSTRACT

A system and method for rivet setting comprising an anvil having an anvil face and a plunger having a sensor coupled to a control system that measures the distance between the anvil face and the work surface during the rivet setting process and stops the rivet driver when the driven rivet head achieves a desired head height above the work surface. In preferred embodiments, the control system also communicates the stage of the rivet driving cycle to the operators to expedite the rivet driving process.

4 Claims, 31 Drawing Sheets

(56) References Cited

U.S. PATENT DOCUMENTS

| | | |
|---|---|---|
| 4,566,182 A | 1/1986 | Altwicker |
| 4,885,836 A | 12/1989 | Bonomi et al. |
| 4,995,148 A | 2/1991 | Bonomi et al. |
| 5,086,965 A | 2/1992 | Marsteller et al. |
| 5,398,537 A | 3/1995 | Michalewski |
| 5,953,952 A | 9/1999 | Strickland |
| 6,011,482 A | 1/2000 | Banks |
| 6,073,326 A | 6/2000 | Banks |
| 6,088,897 A | 7/2000 | Banks |
| 6,357,101 B1 | 3/2002 | Sarh |
| 6,363,768 B1 | 4/2002 | Earls |
| 6,823,709 B2 | 11/2004 | Dowell |
| 7,331,205 B2 | 2/2008 | Chitty |
| 8,316,524 B1 | 11/2012 | LeMieux |
| 8,978,231 B2 | 3/2015 | LeMieux |
| 2011/0114346 A1 | 5/2011 | Suzuki et al. |

FOREIGN PATENT DOCUMENTS

| | | |
|---|---|---|
| JP | 50-125867 U1 | 2/1975 |
| JP | 50-125867 U1 | 10/1975 |
| JP | 53-115477 U1 | 9/1978 |
| JP | 59-016749 U1 | 2/1984 |
| JP | 07-001070 A | 1/1995 |
| JP | 2003-340619 A | 12/2003 |
| JP | 2005-046862 A | 2/2005 |
| JP | 2005-514210 A | 5/2005 |
| JP | 2007-203307 A | 8/2007 |
| WO | 2005/007319 A1 | 1/2005 |

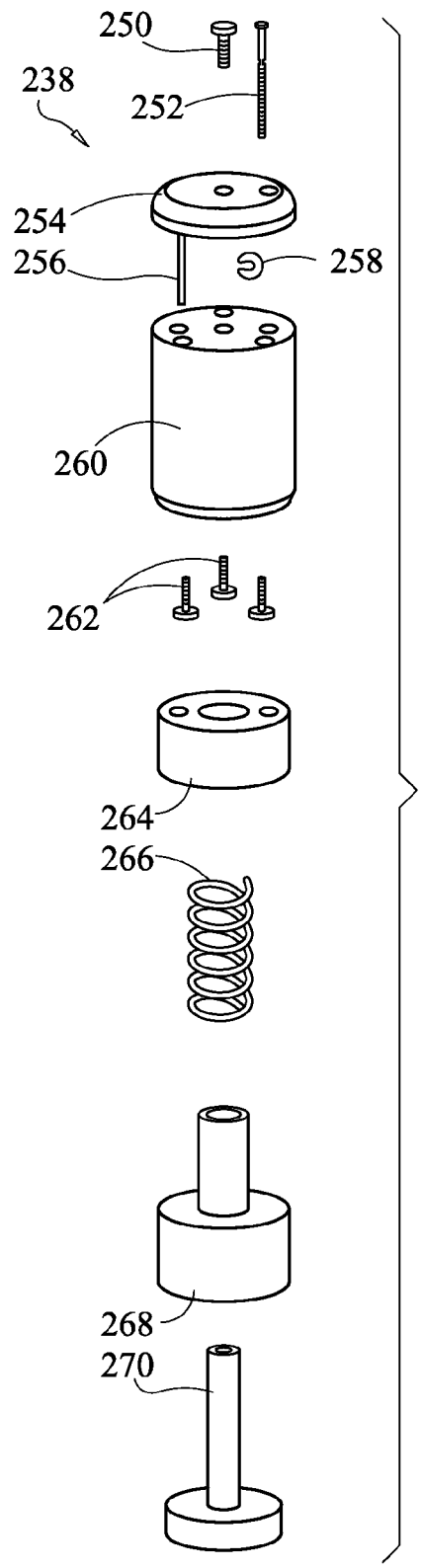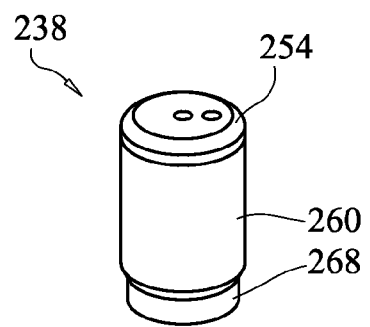
FIG. 6A
FIG. 6B

1. Start

2. Initialize

3. Main Program
   - 3a. CALL Subroutine: Identify Coupled Tools and
   - 3b. CALL Subroutine: Tool Calibration        Determine Operation Mode
   - 3c. CALL Subroutine: Rivet Set (according mode determined)
   - 3d. Provide fault notification or other communication to user
   - 3e. Loop back to Main Program 4. Subroutine: Identify Coupled Tools and Determine Operation Mode
   - 4a. If Mode A:      Backriveting with LED communication;
   - 4b. If Mode A':     Backriveting without LED communication;
   - 4c. If Mode B:      Forward riveting with LED communication;
   - 4d. Mode B':       Forward riveting without LED communication;
   - 4e. Mode C:        LED communication mode only;
   - 4f. Mode D:        Hybrid functionality;
   - 4g. Return to Main Program 5. Subroutine: Tool Calibration
   - 5a. If analog sensor perform 2-point calibration
   - 5b. Return to Main Program 6. Subroutine: Set Rivet - Mode A
   - 6a. Clear flags and Turn LED on to illuminate work;
   - 6b. Detect when set tool anvil face is in contact with rivet shank end, THEN set first flag, enable rivet gun by solenoid valve actuation;
   - 6c. While in rivet driving stage:
     - i. Monitor to determine when rivet set becomes substantially equal to desired rivet set (measured rivet set height stored in second memory is substantially equal to desired rivet head height stored in first memory);
     - ii. Optionally monitor to determine if rivet set anvil face becomes decoupled from rivet shank end;
     - iii. If condition in Step 6c,i is met; cease riveting, exit loop and cycle to next rivet after timing delay so operators can drive the next rivet;
     - iv. If condition in Step 6c,ii is met, cease riveting, indicate error to operator the via LED light flashing and then commence a timing delay and exit loop so operators can continue driving the same rivet.
   - 6d. RETURN to MAIN PROGRAM

FIG. 29A

7. Subroutine: Set Rivet - Mode D
    7a. Clear flags and turn on set tool LED and if available bucking bar tool LED, to illuminate work;
    7b. Detect when set tool anvil face first contacts rivet universal manufactured head; set first flag, momentarily flash LEDs to indicate rivet gun operator is "ready";
    7c. Detect when bucking bar anvil face first contacts rivet shank end; store length of protruding rivet shank into first memory and determine desired rivet set head height from calculation or look-up table and store in second memory, set second flag, momentarily flash LEDs to indicate bucker operator is "ready";
    7d. While in rivet driving stage:
        i. Enable rivet gun by coupling to air supply with solenoid valve actuation;
        ii. Monitor to determine when rivet set becomes substantially equal to desired rivet set (measured rivet set height stored in second memory is substantially equal to desired rivet head height stored in first memory) ;
        iii. Monitor to determine if rivet set anvil face becomes decoupled from rivet manufactured head;
        iv. Optionally monitor to determine if bucking bar anvil face becomes substantially removed from rivet shank end;
        v. If condition in Step 7d,ii is met; cease riveting, exit loop and cycle to next rivet after timing delay so operators can drive the next rivet;
        vi. If either conditions in Step 7d,iii or Step 7d,iv are met, cease riveting, indicate error to operators the via LED lights and then commence a timing delay and exit loop so operators can continue driving the same rivet.
    7e. RETURN to MAIN PROGRAM

FIG. 29B

SYSTEM FOR RIVET FASTENING

CROSS-REFERENCES TO RELATED APPLICATIONS

This application is a continuation-in-part of U.S. patent application Ser. No. 13/694,379, filed Nov. 26, 2012, now U.S. Pat. No. 8,978,231, which is a continuation-in-part of U.S. patent application Ser. No. 12/384,392, filed Apr. 1, 2009, now U.S. Pat. No. 8,316,524, the disclosures of which are incorporated by reference as if fully set forth herein.

BACKGROUND

This invention relates to a system and method for fastening rivets and/or using process indicators to communicate to operators the stage of each rivet during a rivet setting cycle. In particular, the invention relates to a system and method that relies on sensors that are used as part of a feedback control system to achieve rivet setting tolerances by measuring in real-time or near-real-time the rivet's driven head (sometimes called the upset head or shop head) height while the control system also controls rivet gun operation and communicates the rivet driving-cycle stage to the rivet setting operator(s).

Riveting produces the strongest practical means of fastening airplane skins and substructure together. Although the cost of installing one rivet is small, installing the great number of rivets used in airplane manufacture represents a large percentage of the total cost of any airplane.

It should be first noted that the term "tolerance" is used broadly throughout this disclosure. Conventionally, the term tolerance signifies a plus or minus range of acceptance on a bell-shaped-curve distribution of samples with preferably the peak of the bell-shaped curve representing the optimum and the distribution of samples being bounded by a narrow band having upper and lower specification limits. The curve is used with a measure of standard deviation to quantitatively characterize defects by a measure of standard deviation or sigma value. In this disclosure, the term tolerance also sometimes refers to a specific value representing the optimum peak of the bell-curve (or very near peak, i.e., extremely tight tolerance). For example, "It is often difficult to consistently set rivets to meet tolerances but it is extremely difficult to consistently set rivets to an optimal tolerance." In other words, a very tight tolerance being met consistently by a large data set having that is both accurate and precise also has a high sigma value.

Although this invention may be applied to special types of rivets, for purposes of clarity, this disclosure uses as an example conventional solid-shank rivets that comprise a manufactured head, a shank, a shank end, and a driven head. The driven head is formed by upsetting the rivet shank with a rivet gun or rivet driver while backing the shank with a bucking bar. The shank actually expands slightly while being driven so the rivet fits tightly in the drilled hole and the shank end deforms to produce a driven head. Fastened material is then held between the manufactured head and the driven head.

Where there is easy access to both sides of the work, the rivet-gun operator can sometimes simultaneously drive the rivet and back the rivet with a bucking bar; however, in most cases both a rivet-gun operator and a bucking-bar operator or bucker must work together to drive solid-shank rivets. The conventional procedure for driving rivets is as follows: (1) the rivet gun operator adjusts the air regulator which controls the air pressure and/or air flow to increase or decrease hitting force of the pneumatic rivet gun; next (2) the rivet gun operator inserts the rivet into the drilled hole, places the rivet set tool anvil face against the rivet and waits for the bucker; next (3) the bucker holds the bucking bar anvil face on the opposite end of the rivet; next (4) the rivet gun operator should "feel" the pressure being applied by the bucker through the rivet; and finally (5) the rivet-gun operator will start the rivet gun by pulling the trigger to release a short burst of rivet-gun blows and then stop the rivet gun when the rivet has been driven or set to be within a desired range of manufacturing specifications or tolerances. Forward-set rivets are formed when the set tool hammers on the manufactured head and the bucking bar backs the shank end of the rivet. Backset rivets are formed when the set tool hammers on the shank end of the rivet and the bucking bar backs the manufactured head of the rivet. It is to be understood that teachings of this disclosure apply to both forward-set and backset rivet driving methods and one skilled in the art could apply the teachings of one method to achieve another method.

Throughout the rivet setting process, both operators must hold their tools perpendicular or orthogonal to the work so the rivet is driven axially. The entire rivet setting process requires both skill and experience since the rivet-gun operator must determine rivet gun burst-length or blows needed according to variables such as manual forces applied by either bucker or gun operator, the rivet size being driven, the rivet gun design and air-flow or pressure settings and the mass of the rivet gun and bucking bars. These variables must be judged by the rivet-gun operator to time the length of the rivet driving stage needed to achieve desired rivet set tolerances.

Further, to communicate with each other, the rivet-gun operator and bucker conventionally use a tapping code to enable the bucker to communicate with the rivet-gun operator: one-tap on the rivet by the bucker means start or resume driving the rivet (resuming is often necessary when the rivet has been under-driven and has not reached tolerance); two-taps on the rivet by the bucker means the finished or set rivet was within satisfactory tolerance; three-taps on the rivet by the bucker means the rivet was improperly set and must be removed (this typically occurs when the rivet has been over-driven and cannot be modified to achieve tolerance). Where verbal communication is possible, the rivet-gun operator typically announces "ready" when he is ready to begin riveting and waits for the bucker to likewise announce "ready" when he is ready to begin bucking and follows with a "good", "drive more", or "not good" verbal report of the completed set rivet.

To achieve design strength, the driven head of a rivet must fall within an acceptable tolerance range; to inspect rivets, the bucker sometimes uses a gauge to measure the driven head-height or driven head-width after the rivet has been set. Often, however, to save time, the bucker only visually inspects the driven head to determine if it meets required tolerances. If the rivet has been under-driven leaving the head height too high, additional driving is needed (although due to work hardening of the rivet material, rivet holding strength for rivets driven in repeated driving stages is often reduced). Over-driven rivets require removal, which is a time consuming process that can often damage the work and sometimes requires using an oversized replacement rivet having a different setting tolerance. Over-driven rivets often blemish or bend the work, sometimes causing costly rework or irreparable damage.

The background art is characterized by U.S. Pat. Nos. 1,803,965; 2,354,914; 3,478,567; 3,559,269; 3,574,918;

3,933,025; 4,218,911; 4,566,182; 5,398,537; 5,953,952; 6,011,482; 6,088,897; 6,357,101; 6,363,768; 6,823,709; and 7,331,205; the disclosures of which patents are incorporated by reference as if fully set forth herein.

Although the conventional method of driving rivets described above has been effective for many years, there are some background art inventions that have unsuccessfully attempted to improve the process. What is needed is a rivet fastener system that overcomes the disadvantages of the background art; such a rivet fastening system is disclosed herein.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A purpose of the invention is to provide means and methods for fastening rivets and/or using process indicators to communicate to operators the driving stage of each rivet during a rivet setting cycle.

As used herein, the following terms and variations thereof have the meanings given below, unless a different meaning is clearly intended by the context in which such term is used:

"A," "an" and "the" and similar referents used herein are to be construed to cover both the singular and the plural unless their usage in context indicates otherwise.

"About" and "approximately" mean within plus or minus ten percent of a recited parameter or measurement, and preferably within plus or minus five percent of such parameter or measurement; if a parameter or measure is not referenced, these terms mean that a reasonable allowance in parameter or measurement is permitted as one skilled in the art might determine.

"Comprise" and variations of the term, such as "comprising" and "comprises," as well as "having" and "including" are not intended to exclude other additives, components, integers, or steps.

"Debounces" means any kind of hardware device or software that identifies only one digital signature from a plurality of digital signatures within the space of a determined time (usually milliseconds).

"Exemplary," "illustrative," and "preferred" mean "another."

"Substantially" means "equivalent" or "approximately equivalent" or "about equal to", given equipment and conditions involved.

"Desired rivet head height" means "rivet head height within the specification" (between upper and lower specification limits) but can also have a tighter tolerance than the specification.

"Switching threshold" means a measured relative position, point, or location where a switching operation occurs; where switching is a reversible transition from high-resistivity state to a low-resistivity state or the equivalent as determined by software and the relative position is preferably both accurate and precise.

"Loop circuit" means an electrically conductive path; when coupled with microprocessor software to detect a "make" or a "break" in the circuit, a sensor is produced.

"Rivet driver" means any equipment used to impart work energy to deform a rivet shank, e.g., a rivet driver includes a hand-held manually operated rivet gun or a robotically operated hammering machine. The term "rivet gun" may be replaced by "rivet driver."

"Load source" means any applied force and though not limiting may be an applied force from at least one of a mechanic, a robotic appendage and a rivet driver.

"A protruding rivet shank length" means the length of a rivet shank extending beyond a work surface while the manufactured head of the rivet is nominally fully seated against or into a rivet hole. A protruding shank length may change in length when the rivet is driven and the shank is plastically deformed into a shop-head or button, and therefore may be a plurality of lengths. In some cases the terms "protruding shank length" or "protruding rivet shank length" can also mean the length of the rivet extending beyond a work surface when the manufactured head is nominally seated but before the rivet shank is plastically deformed.

"Anvil face" means a rivet impacting surface of an anvil on a bucking bar or a set tool.

"First contact" means when an anvil face first makes contact with a rivet manufactured head or a shank end, preferably at the beginning of a rivet driving stage and just before the rivet driver is enabled.

"Control subsystem" means any subset of a control system optionally including a "controller" and may be comprised of at least one of: a microprocessor, a microcontroller, a computer, or digital logic device;

"Controller" may be any driver device comprised of a relay a field effect transistor a transistor or a microprocessor; a driver device may be any intermediate device or equipment used to operate or actuate another device or equipment such as a valve. In some cases the term "controller" can also mean microprocessor, microcontroller, computer or other digital logic device.

"Visual indicator" means a "visually observable communication signal" and may be synonymous with terms "indicator", "visual signal", "light", or "Light Emitting Diode."

"Power regulator" means anything to provide a controlled or specific "power level" or "energy level" or "force level;" an example for pneumatic power supply a power regulator is an air regulator.

"Resilient member" means a "load source" and may be understood as a force applying system or component; for example a spring.

In this disclosure, a plurality of sensors are described. Various sensors perform various tasks and some sensors may perform a plurality of tasks. To better illustrate the disclosure, these sensors are summarized here and presented later in more detail when discussing illustrative embodiments of the invention.

First sensor: A first sensor preferably is used to sense when a distance between an anvil face and a work surface represents a driven rivet head height that substantially matches a desired rivet head height. First sensors may be either analogue or digital. This sensor is used to determine when to cease riveting.

Second sensor: A second sensor preferably is used to sense when an anvil face comes into contact with a rivet manufactured head or a rivet shank end and may serve as an impact sensor. Preferably, a loop sensor is used in second sensors but other sensor types such as a current sourcing sensor or a touch capacitance sensor may be used. Preferably, second sensors are digital. This sensor is used for a plurality of determining purposes including at least one of: a possible damage event condition, a rivet driver impact, or providing a signal to measure a protruding rivet shank length.

Third sensor: A third sensor preferably is used to sense when a distance between an anvil face and a work surface represents a protruding shank length. Preferably, a third sensor works in conjunction with a second sensor where a signal from a second sensor is needed to indicate when an anvil face first comes into contact with a rivet shank end. A third sensor is preferably analogue and, therefore, may also be used as a first sensor. A purpose of a third sensor is to sense a rivet protruding shank length when an anvil face first comes into contact with a rivet shank end and normally requires a second sensor to determine when this contact occurs; however, it is possible for the third sensor to measure the described protruding shank length without using a second sensor (as described later).

Fourth sensor: A fourth sensor preferably is used to sense tool alignment by determining spindles feet contact with work surface. Preferably, a loop sensor is used in fourth sensors but other sensor types such as a current sourcing sensor or a touch capacitance sensor may be used. Preferably, fourth sensors are digital. Normally a plurality of fourth sensors are on distal end of plunger and serve to detect when the spindles feet rest on a work surface.

Fifth sensor: a fifth sensor preferably is used to sense tool alignment by determining matching or nearly matching parallel alignment between a set tool and a bucking bar tool, during the rivet driving stage. Preferably the bucking bar and the set tools are co-linearly aligned during the rivet driving stage. This type of sensor is a 3-axis inclination or accelerometer sensor affixed to each tool. For each sensor, sub-sensors are affixed to three orthogonally aligned axes. A controller uses sensor information to determine tool 3-dimensional special orientation.

Sixth sensor: a sixth sensor preferably is used to sense a plurality of parameters related to axial displacement of a plunger relative to an anvil face. Parameters include but are not limited to measurement of position (including absolute position measurement), velocity, acceleration, impact and change of plunger travel direction. The sixth sensor may be an absolute linear displacement encoder. Plurality parameter measurement capability is typically achieved with at least one of software, firmware, and digital logic components. Any sensor with plurality measurement capability is not limiting and may be used to replace one or more sensors, for example a sixth sensor may replace the above first, second and third sensors. Also it should be understood that any sensor with limited sensing parameter capability can be substituted with any other sensor with at least the same sensing parameter capability, so for example referring to a first sensor is analogous to implicitly referring to a sixth sensor. Further by exhibition of this sixth sensor as a substitute for other sensors it is understood by those skilled in the art that without limit any sensor can be applied to achieve the scope and spirit of this invention. As a result using the term "sensor" is defined to be analogous for use when referring to any sensor with the appropriate or desired sensing capability needed for measurement or determination.

Seventh sensor: a seventh sensor also termed a sensor system and sometimes more simply referred to as a "sensor" preferably uses a plurality of components together in order to achieve sensing. Though not limiting an example of a seventh sensor system is the use in conjunction of an encoder (sixth sensor), a microprocessor timer and software code (control logic) to form a plurality of components.

This example includes any of microprocessor capabilities such as using memory for storage and software for comparison or determining purposes. Related to sensing the length of a protruding rivet shank through non-electrically conductive materials (discussed later), a seventh sensor system may use software to determine when the plunger travels from its nominal at-rest position and then additionally using a timer to determine when plunger travel stops by substantially remaining at a same position for a predetermined elapsed time period and finally storing the determined plunger stop position into memory (representative of sensing the desired length of protruding rivet shank).

One object of preferred embodiments of the invention is to measure the height of the formed rivet head during the rivet driving process and through a feedback control process disable or stop the rivet gun the moment the rivet head achieves the desired set tolerance. In this embodiment, an automated control process allows both operators to focus on holding their tools orthogonal to the work surface and not be concerned about under-driving or over-driving the rivet. Another object of preferred embodiments of the invention is to provide a means for communicating the stage of the rivet driving process to both rivet-gun and bucking operators by means of light, e.g., light-emitting diode (LED) indicators, with at least one LED located on or near the bucking bar and at least one LED located on or near the rivet gun. By detecting the switch states of one or more switches, the control system operates the LED indicator lights to sequentially signal the operators and thus guide them through each sequential stage of the rivet setting cycle. It is yet another object of preferred embodiments of the invention to prevent inadvertent damage to the airframe by using a control system to disable the rivet gun when not needed and enable the rivet gun only when both the rivet-gun operator and bucker have signaled (by LED lights via a microprocessor detecting switch states) that they are ready for the rivet driving stage of a rivet setting cycle.

It is yet another object of preferred embodiments of the invention to use a unique micro-adjustable bucking bar that may be adjusted to toggle a switch state during the rivet driving stage when the height of a rivet's driven head achieves an optimal rivet set tolerance; this switching action then disables the rivet gun and stops the riveting process. In this embodiment, preferably an electromechanical switch and/or an optical photointerrupter switch is used to detect a rivet set threshold. However, other means of measuring the formed rivet head height during the rivet driving stage are envisioned by the applicant. For example, in an alternate embodiment, during the rivet's driving-stage, continuous analog measurement of the rivet head height above the work surface may be achieved with a Linear Variable Differential Transducer (LVDT) sensor. In this embodiment, a LVDT sensor continuously measures the formed rivet head height by likewise directly or indirectly measuring the gap or distance between the bucking anvil face and the work to determine the rivet-head-height of the driven rivet head. Embodiments comprising non-contact sensors are also envisioned and may include at least one inductive, capacitive and/or optical technologies.

It is yet another object of preferred embodiments of the invention to perform data logging in microprocessor memory of the measured rivet driven head height after the rivet has been set for Quality Assurance and Quality Control verification purposes. It is yet another object of preferred embodiments of the invention to use a disclosed plunger mechanism to press pieces of joined work pieces together by applying compression spring force to the work surface during the rivet setting process. Additionally, the plunger mechanism in this preferred embodiment of this invention also forms a shroud around the rivet head and thus serves to prevent the bucking tool from sliding off the formed rivet head during the rivet driving stage. This reduces a damage event condition or opportunity of the rivet gun hammering on a rivet this is not backed by a bucking bar and thus causing damage to the airframe or substructure work. Furthermore, the plunger mechanism also helps the bucker maintain orthogonal alignment of the bucking tool relative to the work by holding the spindles feet of the plunger flush against the work during the rivet driving cycle.

It is still another object of preferred embodiments of the invention to log at least one of the quality of set rivets, the rivets setting performance of operators, the time to complete specific riveting projects, and the projected time to complete specific riveting jobs.

While as previously stated preferred embodiments of the invention eliminate under-driving the rivet and consequently prevents a plurality of hammering sessions; it is yet another object of preferred embodiments of the invention to maximize set rivet material strength. During the rivet driving stage, the rivet shank undergoes plastic deformation; the shank-end becomes the driven head and forms into a mushroom shape and the shank also simultaneously expands. If the gun force is set too low, then excessive rivet gun blows or impacts are required to set the rivet; this causes the rivet material to fatigue or work harden resulting in reduced material strength of the rivet and therefore reduced rivet holding strength. Ideally to achieve the best rivet properties, rivets should be set with a minimum number of impacts but excessive rivet gun force is difficult for operators to control while simultaneously maintaining tool alignment orthogonal to the work surface. In this embodiment, therefore, the control system provides feedback for optimal air flow and/or air pressure supplied to the gun based on the number of impacts and/or the driving stage time to set a rivet. In other words, the feedback system determines if the rivet gun impact force should be increased or decreased while also keeping the impacting force within acceptable operator-tool-control limits. The rivet setting time interval measurement begins when the rivet driving stage starts and ends when the driven head achieves optimum tolerance (when a measuring threshold has been reached). The number of impacts is preferably counted by assessing the digital signature to debounce the signals from the bucking bar contact with the rivet, as detected by a momentary break or switching in a circuit by a computer or microprocessor. Alternately, an accelerometer or other impact sensor attached to the rivet gun, bucking bar or air supply line may be used to count the number of rivet-driving-stage impacts. Therefore, either an accelerometer or signal debouncer may serve as an impact sensor. Rivet setting time is a measurement of the driving stage time by a microprocessor. The control system then indicates to the operator to increase or decrease the impact force via flow or pressure changes or alternately automatically makes this adjustment by controlling the air regulator settings or other settings for the rivet gun. Any type of communication such as LEDs, LED light bars or liquid crystal displays (LCDs) may be used to notify the rivet gun operator of recommended air-pressure regulator setting changes.

In an alternate embodiment of the invention, the operator provides microprocessor inputs such as the size of the rivet being driven and the total joined sheathing material thickness into the microprocessor's memory via any type of input device such as a keypad. This allows the microprocessor to determine the optimal number of impacts needed for the job in order to produce the highest strength rivets and also determines the optimal tolerance threshold for the formed rivet head height (where analogue sensors are employed). Determining rivet size may also be achieved by measuring the protruding shank length after a rivet has been inserted into a hole. Those skilled in the art will appreciate that a control approach disclosed herein, coupled with real-time or near-real-time measurement of the upsetting rivet head, may also be used to set solid shank rivets at a specified location on a stress-strain curve to maximize rivet fastener strength and durability. Furthermore, with accurate and precise measurement systems coupled to real-time feedback control incorporated into the invention, achieving "ideal" or very low standard deviations (at, near or better than "six sigma") for any desired rivet set objective is possible. Furthermore, even higher rivet set tolerance (higher standard deviation) is desired to more precisely control the set rivet product. Achieving extremely high tolerance levels may involve feedback and/or feed forward control strategies.

In an illustrative embodiment, the invention comprises electronic circuits, a microprocessor, software code, sensors, switches, a specialized bucking bar or set tool equipment and lights (such as LEDs) to provide means of communication between the rivet gun operator and the bucker and additionally to provide feedback control of the rivet gun operation. In this embodiment, several switches and LEDs are used to identify and communicate the stage of the riveting cycle to the operators as well as to enable the rivet gun; another switch detects when a rivet has been set to a specific height or width and ends the riveting cycle by disabling the rivet gun. A microprocessor operating in accordance with software disclosed herein preferably reads switch states and controls the rivet setting process by sequencing the rivet driving process (communicating the sequenced rivet driving stage to operators) by status LED lights indicators and enabling and disenabling the rivet gun. The circuit preferably includes a multi-conductor cable that extends from a circuit board located near the rivet gun to the bucking bar system and serves to service communication and control; although, in an alternate embodiment, this cable is replaced with radio frequency (RF) signals, infrared, or other wireless means. In some embodiments, the bucking bar system preferably has a micro-adjustable gap-height setting that the operator sets to match the desired driven head height of a rivet; when this dimension is achieved during the rivet driving process, a switch is thrown which ends the cycle by electro-mechanically disabling the rivet gun. The rivet gun is preferably enabled and disabled by electromechanical means including at least one of the following: an air solenoid controlling air power to the rivet gun or electromechanical control of gun operation. Alternately, instead of having a micro-adjustable gap-height setting capability, a plurality of tools are provided with each tool having a specific pre-calibrated rivet head height designed for setting a corresponding specific rivet size. Sensors may be digital or analogue.

In another illustrative embodiment, the invention is a method for setting a rivet in a work piece, said rivet having a rivet manufactured head and a shank having a shank end, said method comprising: sensing when a rivet set tool of a rivet gun has been placed on the rivet manufactured head and indicating to a bucking bar operator that a rivet gun operator is ready to commence riveting; sensing when a bucking bar has been placed on the shank end and indicating to said rivet gun operator that said bucking bar operator is ready to commence riveting; driving the rivet by forcing the shank against said bucking bar with said rivet set tool to form a driven rivet head; sensing when the height of said driven rivet head is substantially equal to a desired set rivet head height and indicating to both said bucking bar operator and said rivet gun operator that said desired set rivet head height has been achieved; and ceasing driving the rivet when said driven rivet height is substantially equal to said desired set rivet head height. In one form of the present invention, said rivet gun is a pneumatic rivet gun, the operation of which is controlled by a solenoid valve, said method further comprising: first actuating said solenoid valve when said driven rivet head height is substantially equal to said desired set rivet head height to operatively decouple said rivet gun from an air supply source and stop riveting; and second actuating said solenoid valve to operatively couple said rivet gun to said air supply source when said rivet gun operator and said bucking bar operator are both ready to start riveting. Said rivet gun may be a pneumatic rivet gun, the operation of which is controlled by a (e.g., normally open) solenoid valve, and said method further comprises: closing said solenoid valve when said driven rivet head height is substantially equal to said desired set rivet head height. A person having ordinary skill in the art would understand that a normally closed solenoid valve may be used instead.

In another illustrative embodiment, the invention is a system for setting a rivet in a work piece, said rivet having a rivet manufactured head and a shank having a shank end, said system comprising: means for sensing when a rivet set tool has been placed on the rivet manufactured head and indicating to a bucking bar operator that a rivet gun operator is ready to commence riveting; means for sensing when a bucking bar has been placed on said shank end and indicating to said rivet gun operator that said bucking bar operator is ready to commence riveting; means for driving the rivet by forcing the shank against said bucking bar with said rivet set tool to form a driven rivet head; means for sensing when the height of said driven rivet head is substantially equal to a desired set rivet head height and indicating to both said bucking bar operator and said rivet gun operator that said desired set rivet head height has been achieved; and means for ceasing driving the rivet when said driven rivet height is substantially equal to said desired set rivet head height. Preferably, said means for driving is a pneumatic rivet gun that is controlled by a solenoid valve, and said system further comprises: means for actuating said solenoid valve when said driven rivet head height is substantially equal to said desired set rivet head height to decouple said gun from said air supply.

In yet another preferred embodiment, the invention is a bucking bar for forming a rivet head, said bucking bar comprising: a housing having a cap and a cavity into which a cylinder stem protrudes, said cylinder stem having a distal shoulder; a plunger that is slidably mounted in said cavity, said plunger comprising a plunger stem that is mounted on said cylinder stem, said plunger stem having a plunger shoulder and a proximal shoulder; a compression spring that is disposed within said plunger stem and that has a first end that rests on said distal shoulder and a second end that rests on said proximal shoulder; a hammer that is slidably mounted in said plunger, said hammer having an anvil face at one end and being immovably attached to said housing at another end. Preferably, the bucking bar further comprises: a traveling nut that is disposed within said cavity and around said plunger stem, said traveling nut being held in position relative to said anvil face by a micro-adjustable jackscrew assembly; and a switch that is attached to said traveling nut and that is operative to change its state (e.g., to open or to close) when the position of said plunger shoulder relative to said switch indicates that a desired set rivet head height has been achieved. Preferably, the bucking bar further comprises: a wire that connects said switch to and between a power supply and means for detecting when said desired set rivet head height has been achieved. Preferably, the bucking bar further comprises: a conducting post that is attached to said cap and disposed in said cavity and that passes through said traveling nut, said conducting post being in electrical communication with said anvil face; a bucking bar indicator light that is attached to the exterior of said housing; a first wire that connects said conducting post to means for detecting when said anvil face is in contact with the rivet shank; and a second wire that connects said bucking bar indicator light to a ground; wherein said bucking bar indicator light is operative to become illuminated when said rivet gun operator and said bucking bar operator are both ready to commence riveting. Preferably, said plunger further comprises a shroud that surrounds said rivet head when said bucking bar is in use. In a preferred embodiment, the shroud's being bucked off because the anvil face gets bucked far away from the forming rivet head is correctable by having the shroud extend farther past the anvil face and requiring more compressive force to be applied to the plunger for the bucker to indicate that he is ready. Preferably, said plunger further comprises a spindles feet that extends through said hammer and beyond said anvil face.

In a further illustrative embodiment, the invention is a system for setting a rivet in a work piece, said rivet having a rivet manufactured head and a shank, said rivet being in conductive communication with said work piece, said system comprising: a circuit subassembly having a first source of power and a bucker ready indicator light, said circuit subassembly being in conductive communication with said work piece; a rivet gun that is equipped with a rivet set tool, said rivet tool being in conductive communication with said circuit subassembly and having a second source of power; and a bucking bar system, said bucking bar system having a rivet gun operator ready indicator light that is in conductive communication with said circuit subassembly;

Wherein said rivet set tool is operative to impose a first voltage on said rivet manufactured head when it is placed in contact with said rivet manufactured head. Preferably, the system further comprises: a switch that is capable of isolating said second source of power from said rivet gun. Preferably, the system further comprises: a bucking bar control system comprising a microprocessor for acquiring and processing data relating to rivet driving; a power subsystem, a sensor array subsystem, and a control and communication subsystem. Preferably, said power subsystem includes rechargeable battery and/or an external power supply, and a power regulator. Preferably, said sensor array subsystem includes a plurality of bucking bar sensors and a plurality of rivet gun sensors. Preferably, said control and communication subsystem includes a pneumatic solenoid having a controller, a plurality of communication indicators, a communication port, a graphical user interface and a keypad.

In yet another illustrative embodiment, the invention is a method for controlling a system for setting a rivet in a work piece with a rivet gun and a bucking bar, said method comprising: initializing the system; waiting to receive a second signal from a second sensor that indicates that a rivet gun operator is ready to commence riveting; when said first signal is received, illuminating a rivet gun operator indicator light and a bucking bar operator indicator light; waiting to receive another second signal from another second sensor that indicates that a bucking bar operator is ready to commence riveting; when said second signal is received, flashing said rivet gun operator indicator light and said bucking bar operator indicator light on and off; optionally, starting a first user selectable time delay; enabling the operation of said rivet gun by actuating a solenoid coupling said rivet gun to an air supply source; beginning a rivet setting operation; sensing that said rivet setting operation has begun and then starting a timer, counting the number of impact blows from the rivet gun and waiting to receive a rivet head height threshold detection signal; when said rivet head height threshold detection signal is received, stopping the rivet gun, stops said timer, turning off said indicator lights and, optionally, starting a second user selectable time delay. Preferably, the method further comprises: determining strength of the rivet, displaying a recommended rivet gun air regulator setting and logging a set rivet head height.

In another illustrative embodiment, the invention is a bucking bar for forming a rivet head, said bucking bar comprising: a housing having a cavity and comprising a housing shoulder; a plunger that is slidably mounted in said cavity and that is held within said cavity by said housing shoulder, said plunger comprising a plunger stem that has a proximal shoulder; a cap screw that is mounted on said proximal shoulder; a hammer that is slidably mounted in said plunger, said hammer having an anvil face at one end and a cap at another end; a compression spring that is disposed within said cavity and that has a first end that rests on said cap and a second end that rests on said proximal shoulder. Preferably, the bucking bar further comprises: a photo switch that is mounted on said housing within said cavity, said photo switch being operative to actuate or toggle states when said cap screw is detected by said photo switch.

In another illustrative embodiment, the invention is a backriveting system, said backriveting system comprising: a plunger comprising a proximal shoulder and having a cavity; an internal collar that is slidably movable within said cavity; a rivet set tool having a set tool stem that extends through said cavity and through said internal collar, said rivet set tool having one end having an anvil face and another end being attachable to a rivet gun and said set tool stem being fixed to said internal collar; a compression spring having a first end that rests on said internal collar and a second end that rests on said proximal shoulder; an exterior collar that is attachable to said stem; and a switch that is attached to said plunger and that is operative to actuate or toggle states when the position of said exterior collar relative to said switch indicates that a desired set rivet head height has been achieved or (alternatively) when said switch indicates that a rivet gun operator is ready to begin riveting.

In yet another illustrative embodiment, the invention is a bucking bar for forming a rivet head on a rivet in a work piece, said bucking bar comprising: a housing having a cavity having an interior surface upon which is provided a key or axially-positioned tab; a first embedded switch that is embedded in said housing; a plunger that is slidably mounted in said cavity, said plunger comprising a plunger stem that has exterior threads, a proximal shoulder, a collar and a shroud; a traveling nut that has interior threads that are operative to engage with said exterior threads on said plunger, said traveling nut having a groove that is operative to engage with said key or axially-positioned tab to achieve axial slidable movement of said traveling nut; a hammer, a portion of which is mounted in said plunger, said hammer having an anvil face at one end and a cap at another end; a switch housing collar that is mounted within said cavity; a second embedded switch that is attached to said switch housing collar; and a compression spring that is disposed within said cavity and that has a first end that rests on said switch housing collar and a second end that rests on said proximal shoulder; wherein said first embedded switch is operative to toggle switch state when said collar of said plunger moves axially upward relative to said housing; and wherein said second embedded switch is operative to toggle switch state when the position of said traveling nut relative to said switch indicates that a desired set rivet head height has been achieved. Preferably, the bucking bar further comprises: three electrical conducting contact points disposed about 120 degrees apart around said shroud; a wire connecting each of said electrical conducting contact points to a microprocessor that is operative to detect which of said three electrical conducting contact points are resting on said work piece. Preferably, the bucking bar further comprises: three indicator lights disposed about 120 degrees apart around said shroud, any number of said three indicator lights being operative to illuminate if directed to do so by said microprocessor. Preferably, the bucking bar further comprises: three electrical conducting contact points disposed about 120 degrees apart around said shroud; a wire connecting each of said electrical conducting contact points to a microprocessor that is operative to detect which of said three electrical conducting contact points are resting on said work piece. Preferably, the bucking bar further comprises: three indicator lights disposed about 120 degrees apart around said shroud, any number of said three indicator lights being operative to illuminate if directed to do so by said microprocessor.

In another illustrative embodiment, the invention is a system for setting a rivet in a work piece, said rivet having a rivet manufactured head and a rivet shank, said system comprising: a rivet gun having a rivet set tool that is energized by a pressurized fluid that must pass through a solenoid valve, said solenoid valve having a first port through which said pressurized fluid enters said solenoid valve and a second port through which said pressurized fluid must pass to reach said rivet gun; an augmented bucking bar having a contact; a first source of direct current that is disposed in a first normally open electrical circuit that also includes a first work piece, a first indicator light and said rivet set tool connected in series, said first source of direct current being operative to illuminate said first indicator light when said rivet set tool is placed in contact with said rivet manufactured head; a second source of direct current that is disposed in a second normally open electrical circuit that also includes a second work piece, a second indicator light and said augmented bucking bar connected in series, said second normally open electrical circuit also being connected to a relay, said second source of direct current being operative to illuminate said second indicator light when said augmented bucking bar is placed in contact with said rivet shank; a third source of direct current that is disposed in a third normally open electrical circuit that also includes said second work piece, said relay and said contact connected in series, said third source of direct current being operative to actuate said relay when said contact is brought in contact with said second work piece during a riveting cycle (operatively, this circuit is formed when the driven rivet height is substantially equal to the desired set rivet head height); and a fourth source of direct current that is disposed in a fourth normally open electrical circuit that also includes said relay and said solenoid valve, said fourth source of direct current being operative to close said first port of said solenoid valve when said relay is actuated. Preferably, said solenoid valve is a three-port solenoid valve comprising a third port that is connected to an ambient atmosphere and said fourth source of direct current being operative to close the first port and open the second port and said third port of said solenoid valve when said relay is actuated, thereby allowing backpressure from said rivet gun to be exhausted from the rivet gun to said ambient atmosphere.

In yet another illustrative embodiment, the invention is a method for controlling a system for setting a rivet in a work piece with a rivet gun that is operated by a rivet gun operator and a bucking bar that is operated by a bucking bar operator, said method comprising: initializing system components and disabling the rivet gun; conducting system tests, comprising detecting whether the rivet gun operator is ready to begin riveting, detecting whether the bucking bar operator is ready to begin bucking and monitoring the system for system errors; turning system LEDs on, including turning on the bucking bar operator's LED to indicate the bucking bar operator that the rivet gun operator is ready to begin riveting and turning the rivet gun operator's LED on to verify that the bucking bar operator's LED has been turned on; detecting that the bucking bar operator is ready to begin bucking, enabling the rivet gun and flashing said LEDs on-and-off to indicate to both operators that the bucking bar operator is ready to begin bucking, continuing to monitor the system for said system errors and for calibration requests and disabling the rivet gun when desired set rivet head height has been achieved; if one of said system errors is detected, ceasing riveting and informing the operators of the error condition; if a calibration request is received, allowing at least one of said operators to calibrate the system; and resetting the system. Preferably, said conducting system tests step further comprises: detecting whether a rivet head height detection sensor is working, determining whether the rivet gun operator has set up on a rivet and then disengaged, determining whether the bucker has removed the bucking bar from the rivet, detecting whether a calibration mode has been requested by one of the operators or alternately by the system, and detecting when a system reset is requested by at least one of the operators or by the system following the end of a rivet driving cycle, following operation of an error management subroutine, or following operation of a calibration management subroutine. Preferably, the method further comprises: counting the number of rivets driven and invoking an automatic calibration check after the system is used to set a predetermined number of rivets. Preferably, the method further comprises: counting the number of impacts it takes to set a rivet and/or measuring each rivet setting time.

In another illustrative embodiment, the invention is a system for setting a rivet in a work piece, said rivet having a rivet manufactured head and a rivet shank, said system comprising: a rivet gun having a rivet set tool that is wired to a first circuit subassembly that is wired to a first work piece, said rivet set tool being operative to generate a first signal when it is placed on the rivet manufactured head; a bucking bar that is wired to or integral with a second circuit subassembly that is in radio frequency communication with said first circuit subassembly, or that is in radio frequency communication with a third circuit subassembly that is in radio frequency communication with said first circuit subassembly, said bucking bar being operative to generate a second signal when it is placed on the rivet shank and being operative to generate a third signal when the rivet is set; a solenoid valve that is wired to a fourth circuit subassembly that is in radio frequency communication with said first circuit subassembly, or that is in radio frequency communication with a third circuit subassembly that is in radio frequency communication with said first circuit subassembly, said solenoid valve being operative to enable and disable said rivet gun; a microprocessor or data logger that is wired to a fifth circuit subassembly that is in radio frequency communication with said first circuit subassembly and said second circuit subassembly, or that is in radio frequency communication with a third circuit subassembly that is in radio frequency communication with said first circuit subassembly and said second circuit subassembly, said microprocessor or data logger being operative to monitor productivity. Preferably, the system further comprises: a pressure regulator that is wired to a sixth circuit subassembly that is in radio frequency communication with at least one of said first circuit subassembly, said second circuit subassembly, said third circuit subassembly, said fourth circuit subassembly and said fifth circuit subassembly, said pressure regulator being operative to control the pressure being imposed on said solenoid valve and, thereby, on said rivet gun. A person having ordinary skill in the art would understand that any means of radio communication could be used to accomplish this function.

In yet another illustrative embodiment, the invention is a method for setting a rivet in a work piece, said method comprising: attaching a sensor pad having a thickness equal to a desired rivet head height to said work piece; driving a rivet having a rivet manufactured head and a rivet shank by forcing said rivet shank against a bucking bar with a rivet gun to produce said driven rivet head having a height; determining whether said height is substantially equal to a desired set rivet head height; and ceasing driving said rivet when said height is equal to said desired rivet head height. Preferably, said bucking bar being held by a bucker and said rivet gun is being held by a rivet gun operator, and said method further comprises: prior to said driving step, transmitting a rivet gun operator ready signal to said bucker when said rivet gun contacts said rivet manufactured head, thereby indicating to said bucker that said rivet gun operator is ready; and transmitting a bucker ready signal to said rivet gun operator after sensing when said bucking bar contacts said rivet shank, thereby indicating to said rivet gun operator that said bucker is ready. Preferably, the method further comprises: prior to said ceasing step (described above), transmitting an end of riveting cycle signal to said rivet gun operator when said bucking bar contacts said sensor pad. Preferably, the method further comprises: applying a force to said work piece after said rivet gun operator ready signal is transmitted and before said bucker ready signal is transmitted. Preferably, said bucking bar contacting said rivet shank is accomplished by the bucker's compressing a spring loaded plunger that is applying a force to said work piece.

In yet another illustrative embodiment, the invention is a system for setting a rivet in a work piece, said system comprising: means for driving a rivet having a rivet manufactured head and a rivet shank by forcing said rivet shank against a bucking bar with a rivet gun to produce said driven rivet head having a height; means for determining whether said height is substantially equal to a desired set rivet head height; and means for ceasing driving said rivet when said height is equal to said desired rivet head height.

In another illustrative embodiment, the invention is a method for setting a rivet in a work piece, said rivet having a rivet manufactured head and a shank having a shank end, said method comprising: sensing when a rivet set tool of a rivet gun has been placed in electrical communication with the rivet and indicating that said rivet set tool is ready; sensing when a bucking bar has been placed in electrical communication with the rivet and indicating that said bucking bar is ready; driving the rivet by forcing the shank against said bucking bar with said rivet set tool to form a driven rivet head; determining when the height of said driven rivet head is substantially equal to a desired set rivet head height and indicating that said desired set rivet head height has been achieved; and ceasing driving the rivet. Preferably, said sensing steps and/or determining step comprises: completing electrical circuits. Preferably, said indicating steps comprise turning lights on or off and/or flashing lights on and off. Preferably, said determining step further comprises disabling said rivet gun. Preferably, said disabling step comprises actuating a solenoid valve on a compressed air line from a compressed air source to said rivet gun to decouple said rivet gun from said compresses air. Preferably, said driving step comprises forcing an anvil face against the shank and simultaneously pushing a plunger having a shoulder and a base against the work piece, thereby causing said anvil face to move toward said base as said driven rivet head is formed. Preferably, said forcing step comprises compressing a spring that urges said base against said work piece when said anvil face is forced against said shank. Preferably, said determining step (described above) comprises sensing when said shoulder or said base is displaced away from a plane containing at least a portion of said anvil face a selected distance. Preferably, or more of said indicating steps comprises a radio frequency communication. Preferably, the method further comprises monitoring contact between said bucking bar and the rivet shank and counting hammer blows during the driving step.

In yet another illustrative embodiment, the invention is a method for setting a rivet in a work piece, said rivet having a rivet manufactured head and a shank having a shank end, said method comprising: a step for sensing when a rivet set tool of a rivet gun has been placed in electrical communication with the rivet and indicating that said rivet set tool is ready; a step for sensing when a bucking bar has been placed in electrical communication with the rivet and indicating that said bucking bar is ready; a step for driving the rivet by forcing the shank against said bucking bar with said rivet set tool to form a driven rivet head; a step for determining when the height of said driven rivet head is substantially equal to a desired set rivet head height and indicating that said desired set rivet head height has been achieved; and a step for ceasing driving the rivet.

In another illustrative embodiment, the invention is a system for setting a rivet in a work piece, said rivet having a rivet manufactured head and a shank having a shank end, said system comprising: means for sensing when a rivet set tool of a rivet gun has been placed in electrical communication with the rivet and indicating that said rivet set tool is ready; means for sensing when a bucking bar has been placed in electrical communication with the rivet and indicating that said bucking bar is ready; means for driving the rivet by forcing the shank against said bucking bar with said rivet set tool to form a driven rivet head; means for determining when the height of said driven rivet head is substantially equal to a desired set rivet head height and indicating that said desired set rivet head height has been achieved; and means for ceasing driving the rivet.

In yet another illustrative embodiment, the invention is a system for determining when a rivet gun set tool contacts a manufactured head and when an anvil face of a bucking bar tool contacts a rivet shank, said system comprising: means for determining when the rivet gun set tool contacts the manufactured head and when the anvil face of the bucking bar tool contacts the rivet shank that are incorporated into said rivet gun set tool and/or into the bucking bar tool; and means for informing an operator when the rivet gun set tool contacts the manufactured head and when the anvil face of the bucking bar tool contacts the rivet shank.

In another illustrative embodiment, the invention is a system for fastening a rivet in a work piece with a rivet driver, the workpiece having a work surface, said rivet having a manufactured head, a shank, and a shank end, the shank and shank end nominally projecting from said work surface, said system comprising: an anvil having an anvil face; a plunger slidably engaged with said anvil, said plunger having a distal end, said distal end nominally extending beyond said anvil face; a load source that is operative to nominally urge said plunger distal end forward relative to said anvil face to maintain contact with a work surface; a first sensor that is operative to sense the distance between a work surface and said anvil face and produce a first input signal related to said distance; a control subsystem comprising a controller; said controller subsystem operative to enable and disable a rivet driver; and receive said first input signal from said first sensor and send an output signal to the controller, and disable a rivet driver when said distance is substantially equal to a desired rivet head height. In another embodiment, the system further comprises: a second sensor that is operative to produce a second input signal when said anvil face first contacts a shank end; a third sensor that is operative to sense said distance and produce a third input signal related to said distance and representative of a shank length nominally projecting from said work surface upon said first contact; and wherein said control subsystem is operable to: receive said second input signal and said third input signal; store said distance; determine said desired rivet head height; and store said desired rivet head height. In another embodiment, the system further comprises: a third sensor that is operative to produce a third input signal when said anvil face first contacts a shank end; and wherein said control subsystem: receives said third input signal; and is operative to determine when said anvil face makes said first contact with a shank end, store said distance, determine said desired rivet head height, and store said desired rivet head height. In another embodiment, the system further comprises: a second sensor that is operative to produce a second input signal when said anvil face first contacts a shank end; wherein said control subsystem receives said second input signal and produces a second output signal that indicates that said anvil face is in contact with a shank end. In another embodiment, the system further comprises: a second sensor that is operative to produce a second input signal when the rivet driver first contacts a manufactured head or a shank end; wherein said control subsystem receives said second input signal and produces a second output signal that indicates that the rivet driver is in contact with a manufactured head or a shank end. In another embodiment, the system further comprises a second sensor that is operative to produce a second input signal when the rivet driver contacts one of a manufactured head or a shank end or said anvil face contacts the other of a manufactured head or a shank end. In another embodiment, said control subsystem receives said second input signal and is operative to activate a visual signal, said visual signal being operative to provide a communication to a user. In another embodiment, said control subsystem receives said second input signal and is operative to determine a damage event condition and to operate said controller to disable a rivet driver when said damage event condition is determined. In another embodiment, said control subsystem receives said second input signal and is operative to indicate to a user that both a rivet driver and said anvil face are in contact with a rivet. In another embodiment, the system further comprises: a fourth sensor having a plurality of spindles feet at the distal end of said plunger, said fourth sensor being operative to produce a fourth input signal that characterizes whether said plurality of spindles feet are substantially in contact with a work surface; wherein said control subsystem receives said fourth input signal and is operative to determine when said anvil face is not approximately perpendicular to a shank or parallel to the work surface and produce a fourth output signal that indicates a need for a tool alignment correction or causes said controller to disable the rivet driver. In another embodiment, said control subsystem is also operative to activate a visual signal based on said fourth input signal, said visual signal providing a communication to a user. In another embodiment, the system further comprises: a plurality of electrical conducting contact points disposed about the distal end of said plunger; and a circuit connecting said electrical conducting contact points to the control subsystem, said control subsystem being operative to detect which of said electrical conducting contact points are resting on a work surface. In another embodiment, the system further comprises a plurality of indicator lights disposed about said plunger, any number of said indicator lights being operative to illuminate if directed to do so by said control subsystem; wherein said indicator lights are illuminated in a fashion to communicate a tool alignment position correction relative to a work surface. In another embodiment, said control subsystem receives said first input signal and is operative to determine a desired rivet head height. In another embodiment, the system further comprises: a user input device that is operative to receive input from a user; wherein said first sensor is an analogue sensor; and wherein said control subsystem is operative to receive said desired rivet head height from said user input device. In another embodiment, the system further comprises: a memory; an addressable communication capability between at least two control subsystems; a central computer having central memory, said central computer in communication with or comprised of at least one control subsystem; wherein said at least one control subsystem is operable to transfer a data set of riveting information to said central memory; and wherein said central memory stores said data set. In another embodiment, the system further comprises: a data base operating on said central computer, said central computer being operative to receive a plurality of said data sets from said control subsystems and store them in said data base. In another embodiment, the system further comprises: a valve to enable and disable said rivet driver; said valve comprising: an input coupled to a power source, an output coupled to said rivet driver; and wherein said control subsystem disables said rivet driver by actuating said valve, or said control subsystem enables said rivet driver by actuating said valve, thereby coupling a power source to said rivet driver. In another embodiment said first sensor has a switching threshold; whereby a physical feature on said plunger actuates the switching threshold of said first sensor when plunger is axially displaced said distance representative to a desired rivet head height. In another embodiment, the system further comprises an adjustable mechanism that is operative to allow said first sensor to be adjusted so that said switching threshold toggles when said distance is substantially equal to said desired rivet head height. In another embodiment, the system further comprises: a user input device that is operative to receive an input from a user; wherein said control subsystem is operative to receive said input representing a known distance between the work surface and said anvil face for use in calibrating said first sensor. In another embodiment, the system further comprises: an impact sensor that is operative to sense, and produce a second input signal when a rivet driver produces an impact on a rivet; and wherein said control subsystem receives said impact sensor second input signal and is operative to determine an impact event and store a tally of said impacts. In another embodiment, the system further comprises: a third sensor that is operative to produce a third input signal when said anvil face first contacts a shank end, said third input signal being related to a shank length extending between said anvil face and the work surface; and an indicator that is operative to indicate a level of impact power transmitted from a rivet driver based on said shank length; wherein said control subsystem also receives said third input signal and is operative to determine a rivet size, then determine if said tally approximately corresponds to a rivet gun impact power substantially needed to set said rivet to a desired rivet head height using a predetermined number of rivet driver impacts according to a shank length. In another embodiment, said control subsystem is also operative to: keep a count of the number of rivets set by a rivet driver; compare said count to a predetermined number; and indicate when said count and said predetermined number are substantially equal. In another embodiment, the system further comprises: a user interface device that is operative to receive an input from a user and to provide an output to said user; and wherein said control subsystem is operative to determine an offset distance and notify said user of said offset distance, said offset distance being a difference between a first measure and a second measure, said first measure being indicated by said first sensor when a first known distance is sensed between the work surface and the anvil face before a recalibration of the rivet driver and said second measure being indicated by said first sensor when a first known distance is sensed between the work surface and the anvil face upon a recalibration of the rivet driver. In another embodiment, said control subsystem is also operative to indicate that the system for fastening a rivet requires refurbishment or replacement when said offset distance exceeds a specified level. In another embodiment, said control subsystem is operative to analyze said first input signal to assess plastic deformation of the shank in determining when said distance is substantially equal to a desired rivet head height.

In yet another illustrative embodiment, the invention is a system for fastening a rivet in a work piece with a rivet driver, the work piece having a work surface, the rivet having a shank and a shank end, said system comprising: means for setting a rivet to create a rivet head, said setting means (i.e., means for setting) having an anvil face; means for contacting a work surface having a contact point, said contact point extending beyond said anvil face; urging means (i.e., means for urging) to urge said contact point to maintain contact with a work surface; first sensing means operable to sense the distance between a work surface and said anvil face and to produce a first input signal related thereto; and controlling means (i.e., means for controlling) operable to enable and disable the rivet driver. In another embodiment, the system further comprises: means for computing that receives said input signal from said first sensing means and sends an output signal to said control means, said means for computing being operative to actuate said control means to disable the rivet driver when said distance is substantially equal to a desired rivet head height. In another embodiment, the system further comprises: second sensing means operable to produce a second input signal when said means for setting a rivet first contacts a shank end; means for storing data; means for computing that receives said first input signal and said second input signal, said computing means is operative: to store said distance as data in said means for storing; to determine a desired rivet head height; to store a desired rivet head height as data in said means for storing when said second input signal is received; and to send an output signal to said control means to disable a rivet driver when said distance is substantially equal to a desired rivet head height. In another embodiment, said second sensing means is operative to produce a second input signal when said anvil face first contacts a shank end; and said means for computing receives said second input signal and produces a second output signal that indicates that said anvil face is in first contact with a shank end. In another embodiment, the system further comprises a fourth sensing means comprising a plurality of spindles feet, said fourth sensing means being operative to produce a fourth input signal that indicates whether said plurality of spindles feet are resting on a work surface; and wherein said means for computing receives said fourth input signal, determines when said anvil face is not substantially perpendicular to the shank or substantially parallel to the work surface, and produces a third output signal that indicates a need for a tool alignment correction or that actuates a controller to disable a rivet driver. In another embodiment, said means for computing receives said second input signal and produces said second output signal that indicates that both the rivet driver and said anvil face are in first contact with the rivet. In another embodiment, said second sensing means is operative to produce said second input signal each time said anvil face contacts the shank end and said means for computing is operative to determine whether an impact from the rivet driver has occurred and count said impacts.

In a further illustrative embodiment, the invention is a system for fastening a rivet in a work piece with a rivet driver, the rivet having a manufactured head, a shank and a shank end, the work piece having a work surface, said system comprising: an anvil having an anvil face; a plunger having a distal end, said distal end extending beyond said anvil face; a load source that is operative to urge said distal end to maintain contact with the work surface; a first sensor that is operative to sense the distance between the work surface and said anvil face and produce a first input signal related to said distance; a second sensor that is operative to produce a second input signal when said anvil face first contacts the shank end; a memory; a controller that is operative to enable and disable the rivet driver; and a microprocessor that receives said first input signal and said second input signal, is operative to: store said distance in said memory; determine a desired rivet head height; store said desired rivet head height in said memory when said second input signal is received; and send an output signal to said controller to disable the rivet driver when said distance is substantially equal to a desired rivet head height. In another embodiment, said second sensor is also operative to produce a second input signal when the rivet driver first contacts one of the manufactured head or the shank end or when said anvil face first contacts the other of the manufactured head or the shank end.

In another illustrative embodiment, the invention is a method for fastening a rivet having a shank and a shank end, in a work piece having a work surface with a system comprising a rivet driver, a controller that is operative to enable and disable the rivet driver, a microprocessor that is operative to control controller, a plunger having a contact point, a load source that is operative to urge said contact point to maintain contact with the work surface, an anvil having an anvil face, and a first sensor that is operative to sense the distance between the work surface and said anvil face, said method comprising: placing the plunger against the work surface and applying a load to the plunger that is operative to load the load source until the anvil face contacts a shank end; driving the rivet with the rivet driver; with the first sensor, sensing the distance between the work surface and the anvil face and generating a first input signal related to such distance; with the microprocessor, receiving said first input signal from the first sensor, determining when said distance is substantially equal to a desired rivet head height, and then actuating the controller to disable the rivet driver. In another embodiment, the system further comprises a second sensor, and said method further comprises: with the second sensor, generating a second input signal when the anvil face first contacts the shank end; and with the microprocessor: receiving said second input signal and generating a second output signal that indicates that said anvil face is in first contact with the shank end; or, receiving said second input signal and determining a desired rivet head height based on said distance. In another embodiment, the method further comprises applying a load to the work piece with said plunger, said load being operative to minimize any air gap existing between a plurality of work pieces.

In another illustrative embodiment, the invention is one or more rivets produced in accordance with a method disclosed herein.

In yet another illustrative embodiment, the invention is a system for fastening a rivet in a work piece with a rivet driver that is operative to produce a plurality of hammer impacts, said system comprising: an anvil having an anvil face for delivering a hammer impact against the rivet; an impact sensor that is operative to sense when said hammer impact occurs or sense the duration of operation of the rivet driver, and produce an input signal related to an impact count; a microprocessor; a memory; a controller that is operative to enable and disable the rivet driver; wherein said microprocessor receives said input signal, and is operative to determine when a desired number of hammer impacts has occurred or when a desired duration of operation has occurred and then to actuate said controller to disable the rivet driver; and wherein said controller disables the rivet driver when a distance between a work surface and the anvil face substantially equals a desired rivet head height. In another embodiment, the system further comprises: a rivet driving information, said rivet driving information being obtained from the impact sensor or from a user input and selected from the group consisting of: a rivet driver hammer period or frequency, a nominal rivet size, a rivet material, a desired number of hammer impacts, and a nominal rivet driving power regulator setting; and wherein the microprocessor is operative to disable the rivet driver when the impact count is substantially equal to a desired number of impacts or the rivet driver hammering duration is substantially equal to a desired duration needed to set rivet to a desired rivet head height.

In another illustrative embodiment, the invention is a method for setting a rivet in a work piece with a rivet driver, said rivet having a rivet manufactured head and a shank having a shank end, said method comprising: sensing when a rivet driver anvil face has been placed on the rivet manufactured head or the shank end and indicating that a rivet driver is ready to commence riveting; sensing when a bucking bar anvil face has been placed on the shank end and indicating that the bucking bar is ready to commence riveting; driving the rivet by forcing the shank against said bucking bar anvil face with said rivet driver anvil face to form a driven rivet head; sensing when the height of said driven rivet head is substantially equal to a desired predetermined rivet head height; and ceasing driving the rivet when the height of said driven rivet head is substantially equal to said desired predetermined rivet head height. In another embodiment, said operation of the rivet driver is controlled by a valve, and said method further comprises: first actuating said valve when said driven rivet head height is substantially equal to said desired predetermined rivet head height to operatively decouple the rivet driver from a power supply source and stop riveting; and second actuating the valve to operatively couple the rivet driver to the power supply source when the rivet driver operator and a bucking bar operator are both ready to start setting a subsequent rivet.

In yet another illustrative embodiment, the invention is a system for setting a rivet in a work piece, said rivet having a rivet manufactured head and a shank having a shank end, said system comprising: means for sensing when a rivet set tool has been placed on the rivet manufactured head or the shank end and indicating to a bucking bar operator that a rivet gun operator is ready to commence riveting; means for sensing when a bucking bar has been placed on the shank end and indicating to the rivet gun operator that the bucking bar operator is ready to commence riveting; means for driving the rivet by forcing the shank against the bucking bar with the rivet set tool to form a driven rivet head; and means for ceasing driving the rivet when the driven rivet head height is substantially equal to the desired set rivet head height. In another embodiment, said means for driving is a rivet gun that is controlled by a valve; and said system further comprises: means for actuating said valve when the driven rivet head height is substantially equal to the desired set rivet head height to operatively decouple the rivet gun from a power supply source effectuating disabling the rivet gun; and means for subsequently actuating the valve to operatively couple the rivet gun to the power supply source when the rivet gun operator or the bucking bar operator is ready to commence setting a further rivet by effectuating enabling the rivet gun.

In another illustrative embodiment, the invention is an anvil for forming a rivet head on a rivet shank, said anvil comprising: a housing having portions defining a cavity, a cap portion at one end of said cavity and a cylinder stem protrudes from the cap into said cavity; a plunger that is slidably mounted in said cavity, said plunger comprising a plunger stem that is slidable relative to said cylinder stem; a resilient loading device acting between said housing and said plunger to urge said plunger away from the cap portions of said housing; a hammer that is mounted within said plunger, said hammer having a hammer stem connected to the cap portion of said housing, and an anvil face carried by said hammer stem opposite the location, that the hammer stem is attached to said housing. In another embodiment, the anvil further comprises: an adjustable position sensor to sense the position of said plunger, said position sensor being held in position relative to said anvil face by a micro-adjustable assembly; a state sensor coordinating with said micro-adjustable assembly, said state sensor operative to change its state when the position of said plunger relative to said state sensor indicates that a desired set rivet head height has been achieved. In another embodiment, the anvil further comprises a bucking bar having an anvil for forming the rivet head on the rivet in a work piece, said bucking bar comprising: a key or axially-positioned tab located in cavity of said housing; a first switch that is in said housing; said plunger further comprising: a plunger stem that has exterior threads, a proximal shoulder, a collar, and a shroud; a traveling nut that has interior threads that are operative to engage with said exterior threads on said plunger, said traveling nut having a longitudinal groove that is operative to engage with said key or axially-positioned tab to achieve axial slidable movement of said traveling nut along said plunger; a switch housing collar that is mounted within said cavity; a second switch that is attached to at least one of said switch housing collar, said housing, and said cap; and a resilient loading device disposed within said cavity further comprising: a first end that rests on said switch housing collar or on said cap and a second end that rests on said proximal shoulder; wherein said first embedded switch is operative to toggle switch state when said collar of said plunger moves axially upward relative to said housing, thereby operably indicating when bucking bar operator is ready to begin bucking; and wherein said second switch is operative to toggle switch state when the position of said traveling nut relative to said switch indicates that a desired set rivet head height has been achieved. In another embodiment, the anvil further comprises: a microprocessor; a first conducting path providing electrical communication from said microprocessor to said anvil face; a second conducting path providing electrical communication from said microprocessor to a work piece; a visual indicator attached to said housing; a loop circuit sensor for detecting when said anvil face is in contact with a rivet shank or for detecting when said anvil face is not in contact with a rivet shank; and a third conductor path that connects said visual indicator to a ground and to a power source; said microprocessor controlling the operation of said visual indicator to communicate to a rivet gun user or a bucking bar user the driving stage of the rivet setting process; wherein said visual indicator is operative to become illuminated in a first fashion when the rivet gun user is ready to commence riveting and in a second fashion when a rivet gun operator and a bucking bar user are both ready to commence riveting. In another embodiment said plunger further comprises a shroud that surrounds said rivet head when said anvil is in use; said shroud encircling said anvil face. In another embodiment, said plunger further comprises a spindles feet located at the distal end of said plunger that nominally extend beyond the plane of said anvil face to rest on a work surface.

In a further illustrative embodiment, the invention is a method for controlling a system for setting a rivet in a work piece with a rivet gun and a bucking bar, said method comprising initializing the system; waiting to receive a first signal from a first sensor that indicates that a rivet gun operator is ready to commence riveting; when said first signal is received, activating in a first fashion a rivet gun operator ready indicator; waiting to receive a second signal from a second sensor that indicates that a bucking bar operator is ready to commence riveting; when said second signal is received, activating in a second fashion a bucking bar operator ready indicator; optionally, starting a first user selectable time delay; enabling the operation of the rivet gun by actuating a switch coupling the rivet gun to a power supply source; beginning a rivet setting operation; sensing that the rivet setting operation has begun and then optionally determining the number of impact blows from the rivet gun and waiting to receive a rivet head height threshold detection signal; when the rivet head height threshold detection signal is received, stopping the rivet gun by decoupling the rivet gun from the power supply source and optionally stopping the timer or starting a second user selectable time delay. In another embodiment, the method further comprises determining the strength of the rivet; displaying a recommended rivet gun power level setting and/or adjusting a rivet gun power level setting; and optionally storing in a data memory device a set rivet head height and/or rivet set strength.

In another illustrative embodiment, the invention is a method for controlling a system for setting a rivet in a work piece with a rivet gun that is operated by a rivet gun operator and a bucking bar that is operated by a bucking bar operator, said method comprising initializing system components and disabling the rivet gun; conducting system tests, comprising detecting whether the rivet gun operator is ready to begin riveting, detecting whether the bucking bar operator is ready to begin bucking and monitoring the system for system errors; activating a plurality of system visual indicators in a first fashion, including activating a bucking bar operator's visual indicator to indicate to the bucking bar operator that the rivet gun operator is ready to begin riveting and/or activating a rivet gun operator's visual indicator to notify to the rivet gun operator that a signal has been sent to the bucking bar operator that the rivet gun operator is ready to begin riveting; detecting that the bucking bar operator is ready to begin bucking, enabling the rivet gun and activating a plurality of system visual indicators in a second fashion to notify both operators that the bucking bar operator is ready to begin bucking; continuing to monitor the system for said system errors and for requests to calibrate system components and disabling the rivet gun when the desired set rivet head height has been achieved; if one of said system errors is detected, ceasing riveting and informing the operators of the error condition; if a calibration request is received, allowing at least one of said operators to calibrate the system; and resetting the system. In another embodiment, said conducting system tests step further comprises at least one of: detecting whether a rivet head height detection sensor is working; determining whether the rivet gun operator has set up on a rivet and then disengaged; determining whether the bucking bar operator has removed the bucking bar from the rivet; detecting whether a calibration mode has been requested by one of the operators or alternately by the system; and detecting when a system reset is requested by at least one of the operators or by the system following the end of a rivet driving cycle. In another embodiment, the method further comprises counting the number of rivets set and invoking an automatic calibration after the system is used to set a predetermined number of rivets. In another embodiment, the method further comprises counting the number of impacts it takes to set a rivet and/or measuring each rivet setting time duration.

In another illustrative embodiment the invention is a method for setting a rivet in a work piece, said method comprising: attaching a sensor pad having a thickness equal to a desired rivet head height one of the work piece or a bucking bar anvil face; driving a rivet having a rivet manufactured head and a rivet shank by forcing the rivet shank against the bucking bar anvil face with a rivet gun to produce the driven rivet head having a height; determining whether the height is substantially equal to a desired set rivet head height; and ceasing driving the rivet when the height is equal to the desired rivet head height; whereby the sensor pad actuates a switch when said height is substantially equal to a desired set rivet head height. In another embodiment, the bucking bar is being held by a bucker and the rivet gun is being held by a rivet gun operator, and said method further comprises prior to said driving step, transmitting a rivet gun operator ready signal to the bucker when the rivet gun contacts the rivet manufactured head, thereby indicating to the bucker that the rivet gun operator is ready; and transmitting a bucker ready signal to the rivet gun operator after sensing when the bucking bar contacts the rivet shank, thereby indicating to the rivet gun operator that the bucker is ready.

In yet another illustrative embodiment, the invention is a system for setting a rivet in a work piece, said system comprising: means for sensing when a rivet set tool has been placed on a rivet manufactured head or a shank end and indicating to a bucking bar operator that a rivet gun operator is ready to commence riveting; means for sensing when an anvil has been placed on the shank end and indicating to the rivet gun operator that the bucking bar operator is ready to commence riveting; means for driving a rivet having the rivet manufactured head and a rivet shank having the shank end by forcing the rivet shank end against the anvil with a rivet gun to produce a driven rivet head having a height; means for determining whether the height is substantially equal to a desired set rivet head height; and means for ceasing driving said rivet when the height is equal to the desired rivet head height.

In another illustrative embodiment, the invention is a method for setting a rivet in a work piece, the rivet having a rivet manufactured head and a shank having a shank end, said method having steps comprising sensing when a rivet set tool of a rivet driver has engaged the rivet manufactured head or the shank end of the rivet and indicating that the rivet set tool is ready; sensing when a bucking bar has engaged the rivet manufactured head or the shank end of the rivet and indicating that the bucking bar is ready; driving the rivet by forcing the shank against the bucking bar with the rivet set tool to form a driven rivet head or by forcing the rivet manufactured head against the bucking bar with the rivet set tool to form a driven rivet head; determining when the height of the driven rivet head is substantially equal to a desired set rivet head height; and ceasing driving the rivet. In another embodiment, said sensing steps and/or said determining step comprises closing electrical circuits. In another embodiment, said indicating steps comprise one or more of activating a visual indicator, deactivating a visual indicator, and continually and sequentially activating and deactivating a visual indicator. In another embodiment, said determining step further comprises disabling the rivet driver. In another embodiment, said disabling comprises actuating a valve to decouple the rivet driver from a power source. In another embodiment, said driving step comprises forcing an anvil face against the shank and simultaneously pushing a plunger and a base against the work piece, thereby causing the anvil face to move toward the base as the driven rivet head is formed. In another embodiment, one or more of said indicating steps comprises a radio frequency communication. In another embodiment, the method further comprises monitoring contact between the bucking bar and the rivet shank and counting the number of hammer blows during the driving step. In another embodiment, the method further comprises upon said ceasing step, transmitting an end of riveting cycle signal to disable the rivet gun. In another embodiment, said forcing comprises urging the plunger base against the work piece to compress a resilient member when the anvil face is forced against the shank. In another embodiment, said determining step comprises sensing when the plunger is displaced away from a plane containing at least a portion of said anvil face a selected distance.

In a further illustrative embodiment, the invention is a system for setting a rivet in a work piece, the rivet having a rivet manufactured head and a shank having a shank end, said system comprising: means for sensing when a rivet set tool of a rivet driver has engaged the rivet manufactured head or the shank end of the rivet and indicating that the rivet set tool is ready; means for sensing when a bucking bar has engaged the rivet manufactured head or the shank end of the rivet and indicating that the bucking bar is ready; means for driving the rivet by forcing the shank against the bucking bar with the rivet set tool to form a driven rivet head or means for driving the rivet by forcing the rivet manufactured head against the bucking bar with the rivet set tool to form the driven rivet head; means for determining when the height of the driven rivet head is substantially equal to a desired set rivet head height; and means for ceasing driving the rivet.

In another illustrative embodiment, the invention is a system for determining when a rivet gun set tool having a first anvil face contacts a rivet and when a bucking bar having a second anvil face contacts a rivet shank, said system comprising: means for determining when the first anvil face contacts the manufactured head or when the second anvil face contacts the rivet that are incorporated into the rivet gun set tool or into the bucking bar tool; and means for informing an operator when the rivet gun set tool contacts the rivet or when the second anvil face contacts the rivet shank. In another embodiment, the system is also for setting a rivet in a work piece, the rivet having a rivet manufactured head and a rivet shank, said system further comprising: a rivet gun having a rivet set tool that is energized by a pressurized fluid that must pass through a valve, said valve having a first port through which said pressurized fluid enters said valve and a second port through which said pressurized fluid must pass to reach said rivet gun; an augmented bucking bar having a contact; a first source of electrical current that is disposed in a first normally open electrical circuit that also includes a first work piece, a first visual indicator and said rivet set tool connected in series, said first source of direct current being operative to activate said first visual indicator when said rivet set tool is placed in contact with said rivet manufactured head; a second source of electrical current that is disposed in a second normally open electrical circuit that also includes a second work piece, a second visual indicator and said augmented bucking bar connected in series, said second normally open electrical circuit also being connected to a relay, said second source of electrical current being operative to activate said second visual indicator when said augmented bucking bar is placed in contact with said rivet shank; a third source of electrical current that is disposed in a third normally open electrical circuit that also includes said second work piece, said relay and said contact connected in series, said third source of electrical current being operative to actuate said relay when said contact is brought in contact with said second work piece during a riveting cycle; and a fourth source of electrical current that is disposed in a fourth normally open electrical circuit that also includes said relay and said valve, said fourth source of electrical current being operative to close said first port of said valve when said relay is actuated.

In another illustrative embodiment, the invention is a method for setting a rivet in a work piece, with a rivet gun having a rivet set tool having a first anvil face and a power source; and with a bucking bar having a second anvil face; and with at least one circuit subassembly having an electrical power source and being capable of at least one of: monitoring, indicating, communicating, sequencing, and controlling a rivet driving process; the rivet having a rivet manufactured head and a shank having a shank end that is deformable into a driven rivet head when the rivet is set, said method comprising: using the rivet gun, the bucking bar, and the at least one circuit subassembly to set the rivet; sensing when a rivet gun operator commences rivet setting with the rivet gun having the rivet set tool and indicating to a bucking bar operator that the rivet gun operator is ready to commence riveting; sensing when the bucking bar operator commences rivet setting with the bucking bar and indicating to the rivet gun operator that the bucking bar operator is ready to commence riveting; and whereby when the commencement of a rivet setting cycle is sensed, communication between the rivet gun operator and the bucking bar operator is established. In another embodiment, the method further comprises: driving the rivet by forcing the shank end against either the first anvil face or the second anvil face causing the shank end to deform; and sensing when the driven rivet head height is substantially equal to a desired set rivet head height and indicating to a rivet gun operator or a bucking bar operator that the desired set rivet head height has been achieved or ceasing driving the rivet when said driven rivet head height is substantially equal to the desired set rivet head height. In another embodiment, the method further comprises: adjusting a sensor actuating threshold positioned on the rivet set tool or on the bucking bar to match a desired rivet head height; actuating a valve with the circuit subassembly to operatively decouple the rivet gun from a power supply source and stop riveting when the sensor actuating threshold is detected; and whereby when the rivet is set, a desired rivet head height approximately matches a driven rivet head height and the rivet is set with tolerance control. In another embodiment, the method further comprises: sensing a rivet setting stage; and enabling the rivet gun during the rivet setting stage and otherwise disabling the rivet gun by decoupling the rivet gun from a power source, thereby preventing damage to the rivet and/or the work piece caused by an incorrect tool operation. In another embodiment, the method further comprises: sensing and determining a rivet gun hammer cycle period or frequency; sensing disengagement of the first anvil face or of the second anvil face from a surface of the rivet surface during a rivet deforming stage and before sensing that a desired rivet head height has been achieved; and disabling the rivet gun by decoupling it from the power source, thereby preventing damage to the rivet and the work piece caused by an incorrect rivet driving operation. In another embodiment, the method further comprises: assessing a rivet deforming process and determining if the power level to the rivet gun should be increased or decreased to correspondingly increase or decrease a rivet gun hammering force; and communicating a recommended power level adjustment to an operator or otherwise automatically adjusting the power level, thereby controlling a rivet set strength and a rivet set tolerance. In another embodiment, the method further comprises: sending and or receiving rivet driving process information between a plurality of circuit subassemblies to achieve at least one of: controlling a rivet tool equipment during the sequence of steps of a rivet setting cycle; indicating a rivet driving stage to an operator; preventing damage to the rivet or to the work piece; controlling a plurality of rivet set tolerances; adjusting or recommending to an operator an adjustment to a power supply setting; recording a plurality of rivet set data; and repeating a plurality communication signals to avoid blocking of said communication signals by a work piece material. In another embodiment, the method further comprises providing a loaded plunger having spindles feet on a backriveting system or on a bucking bar system wherein said feet contact the work piece approximately during a rivet deforming stage; sensing and determining approximate orthogonal alignment between the work piece and either the backriveting system of the rivet gun or the bucking bar system; stopping a rivet deforming activity by decoupling the rivet gun from its power source when determination of the approximate orthogonal alignment is approximately wrong or so informing the bucking bar operator and/or the rivet gun operator of status of the approximate orthogonal alignment; and whereby aiding tool operators maintain approximate orthogonal alignment of the systems relative to the work piece and establishing a capability to prevent operators from forming misshapen rivets or damaging the work piece when a rivet set tool or a bucking bar is misaligned. In another embodiment, the method further comprises: sensing when a rivet gun operator approximately engages the rivet with the rivet gun having the first anvil face to first commence a rivet setting cycle and indicating to a bucking bar operator that the rivet gun operator is ready to commence riveting, or sensing when the bucking bar operator approximately engages the rivet with the bucking bar having the second anvil face to commence a second rivet setting cycle and indicating to the rivet gun operator that the bucking bar operator is ready to commence riveting; first actuating a valve to couple a power supply to rivet gun enabling rivet gun; driving the rivet to cause the shank end of said rivet to deform; sensing when the height of the driven rivet head is substantially equal to a desired set rivet head height and indicating to both the bucking bar operator and the rivet gun operator that the desired set rivet head height has been achieved, or ceasing driving the rivet when the height of the driven rivet head is substantially equal to the desired set rivet head height by second actuating solenoid valve to decouple the power supply from the rivet gun.

In another illustrative embodiment, the invention is a system for setting a rivet in a work piece, said rivet having a rivet manufactured head and a shank having a shank end that is deformable into a driven rivet head having a driven rivet head height when the rivet is set and said driven rivet head height substantially matches a desired rivet head height, said system comprising: a bucking bar system or a rivet gun having a backriveting system, wherein said bucking bar system or said backriveting system are made entirely or in part of items selected from the group consisting of: a plunger, a load source, an electric power supply, a circuit subassembly, a controller subsystem, a sensor, an indicator, and a valve. In another embodiment, the system further comprises: means for sensing when a rivet gun operator commences rivet setting with said rivet gun having a backriveting system and indicating to a bucking bar operator that the rivet gun operator is ready to commence riveting; or means for sensing when the bucking bar operator commences rivet setting with the bucking bar system and indicating to the rivet gun operator that the bucking bar operator is ready to commence riveting.

In a further illustrative embodiment, the invention is a system for setting a rivet in a work piece, said rivet having a rivet manufactured head and a shank having a shank end that is deformable into a driven rivet head having a driven rivet head height, said system comprising: one of the group consisting of: (a) a rivet gun having a power source and a backriveting system, said backriveting system having a first circuit subassembly being powered by a power source, and a bucking bar operator ready indicator and/or a desired rivet height sensor; or (b) a bucking bar system, said bucking bar system having a bucking bar and a rivet gun operator ready indicator and/or a desired rivet height sensor. In another embodiment, the system further comprises means for sensing when the bucking bar operator commences rivet setting with said bucking bar system and indicating to the rivet gun operator that the bucking bar operator is ready to commence riveting. In another embodiment, said backriveting system further comprises one or more parts selected from a group consisting of a first sensor that is capable of detecting when said driven rivet head height substantially matches a desired set rivet head height; and a second sensor that is capable of detecting when a set tool system operator first engages or otherwise contacts the rivet manufactured head or the shank end of the rivet. In another embodiment, said bucking bar system further comprises one or more sensors selected from a group consisting of a first sensor that is capable of detecting when said driven rivet head height substantially matches a desired set rivet head height; and a second sensor that is capable of detecting when the bucking bar operator first engages or otherwise contacts the rivet manufactured head or the shank end of the rivet. In another embodiment, said bucking bar system further comprises one or more parts selected from a group consisting of a first sensor that is capable of detecting when the driven rivet head height substantially matches a desired set rivet head height; a second circuit subassembly being powered by another power source; a second sensor that is capable of detecting when a bucking bar system first engages or otherwise contacts the rivet manufactured head or the shank end of the rivet. In another embodiment, said backriveting system or said bucking bar comprises a microprocessor for acquiring a plurality of sensor array subsystem data, said microprocessor having a power subsystem and said microprocessor being operative to process said plurality of sensor array subsystem data to determine at least one of the following: when a rivet gun contacts a surface of the rivet and to further determine a rivet driving stage and then to operate at least one of indicator to indicate said rivet driving stage to the rivet gun operator or to the bucking bar operator; when the rivet gun or the bucking bar incorrectly disengages from the surface of the rivet during a rivet deforming activity and before the driven rivet head height matches a desired rivet head height and then to stop the rivet gun; and when the driven rivet head becomes deformed to approximately match the desired rivet head height and then to stop the rivet gun. In another embodiment, the system further comprises means for driving the rivet by forcing the shank end either against an anvil face of said backriveting system or against an anvil face of said bucking bar system and causing the shank end to deform into the driven rivet head; means for sensing when the driven rivet head is substantially equal to a desired set rivet head height; and means for ceasing driving the rivet when the driven rivet head height is substantially equal to the desired set rivet head height. In another embodiment, the system further comprises means for adjusting a sensor having a sensor actuating threshold located on the backriveting system or on the bucking bar system to match an approximate measurement of a desired rivet head height; and a second circuit subassembly means to actuate a valve to operatively decouple the rivet gun from a power supply source and stop riveting when the sensor actuating threshold is detected. In another embodiment, the system further comprises: means for sensing a rivet deforming stage; and means for enabling the rivet gun during the rivet deforming stage while otherwise disabling the rivet gun by decoupling it from its power source. In another embodiment, the system further comprises means for sensing and determining a rivet gun impact period or frequency; means for sensing disengagement of an anvil face from a rivet surface during a rivet deforming stage and before sensing that a desired rivet head height has been achieved thereby determining an incorrect operator action; and means for disabling the rivet gun by decoupling it from its power source. In another embodiment, the system further comprises means for assessing a rivet deforming process and determining if the power level to the rivet gun should be increased or decreased to correspondingly increase or decrease the hammering force of the rivet gun; and means for communicating a recommended power level to the rivet gun operator or automatically adjusting the power level. In another embodiment, the system further comprises: means for sending and or receiving rivet driving process information among a plurality of circuits to achieve at least one of the following: a determination of a rivet driving stage; an indication of a rivet driving stage; prevention of damage to said rivet or said work piece; control of rivet set tolerances; adjusting or recommending an adjustment to power level setting; recording rivet set data; and repeating communication signals.

In yet another illustrative embodiment, the invention is a set rivet produced in accordance with a method for fastening a rivet having a shank and a shank end in a work piece having a work surface with a system comprising a rivet driver, a controller that is operative to enable and disable said rivet driver, a microprocessor that is operative to control said controller, a plunger having a contact point, a load source that is operative to urge said contact point to maintain contact with the work surface, an anvil having an anvil face, and a first sensor that is operative to sense the distance between the work surface and the anvil face, said method comprising: placing the plunger on the work surface; advancing the plunger to activate the load source until the anvil face contacts the shank end; driving the rivet with the rivet driver; with the first sensor, sensing the distance between the work surface and the anvil face and generating an input signal; and with the microprocessor, receiving said input signal from the first sensor, determining when said distance is approximately equal to a desired rivet head height, and then actuating the controller, thereby disabling the rivet driver. In another illustrative embodiment, the invention is a plurality of set rivets, each of said set rivets being produced in accordance with a method for fastening a rivet having a shank and a shank end in a work piece having a work surface with a system comprising a rivet driver, a controller that is operative to enable and disable the rivet driver, a microprocessor that is operative to control the controller, a plunger having a contact point, a load source that is operative to urge the contact point to maintain contact with the work surface, an anvil having an anvil face, a first sensor that is operative to sense a distance between the work surface and the anvil face, and a second sensor, said method comprising: placing the plunger on the work surface and applying a force to the plunger that is operative to load the load source until the anvil face contacts the shank end; driving the rivet with the rivet driver; with the first sensor, sensing the distance between the work surface and the anvil face and generating an input signal; with the second sensor, generating a second signal when the anvil face first contacts the shank end; with the microprocessor, receiving the first and second input signals from the first sensor and the second sensor, determining a rivet size, and determining when said distance is approximately equal to a desired rivet head height, and then actuating the controller, thereby disabling the rivet driver. In another embodiment, the system further comprises a second sensor and said method further comprises: with the second sensor, generating a second signal when the anvil face first contacts the shank end; with the microprocessor, receiving said second input signal and generating a second output signal that indicates to a user that said anvil face is in first contact with the shank end.

In another illustrative embodiment, the invention is a non-transitory computer-readable medium including computer-executable instructions which, when loaded onto a computer performs a method comprising: during said rivet driving stage, monitoring the rivet to determine when a measured rivet set height is approximately equal to a desired rivet head height; and when said measured rivet set height is approximately equal to the desired rivet head height, ceasing riveting, thereby terminating the rivet driving stage. In another embodiment, the method further comprises: monitoring the rivet to determine if the anvil face becomes decoupled from the rivet shank end; and if said anvil face becomes decoupled from the rivet shank end, ceasing riveting, and indicating an error condition to an operator.

In another illustrative embodiment, the invention is a non-transitory computer-readable medium including computer-executable instructions which, when loaded onto a computer performs a method comprising: detecting when a first anvil face first contacts a rivet manufactured head and indicating that the first anvil face operator is ready; detecting when a second anvil face first contacts said rivet shank end, storing a protruding length of the rivet shank in a memory; and determining and storing in the memory a desired rivet head height, and indicating that the second anvil face operator is ready; optionally enabling a rivet driver by actuating a controller, thereby initiating a rivet driving stage; during the rivet driving stage, monitoring the rivet to determine when a measured rivet set height is approximately equal to said desired rivet head height; and when the measured rivet set height is approximately equal to said desired rivet head height, ceasing riveting, thereby terminating the rivet driving stage. In another embodiment, said method further comprises: during the rivet driving stage, monitoring the rivet to determine if the first anvil face becomes decoupled from the rivet manufactured head; during the rivet driving stage, monitoring the rivet to determine if the second anvil face becomes decoupled from rivet shank end; if the first anvil face becomes decoupled from the rivet manufactured head or the second anvil face becomes decoupled from the rivet shank end, ceasing riveting, and indicating an error condition to an operator.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6A is an exploded perspective view of the major mechanical components of a bucking bar in accordance with a more preferred embodiment of the invention.

FIG. 6B is an assembled perspective view of the bucking bar presented in FIG. 6A.

FIGS. 29A and 29B are a schematic flow diagram for software instructions in accordance with preferred embodiments of the invention. FIG. 29B is a continuation of FIG. 29A.

Figure 1A:
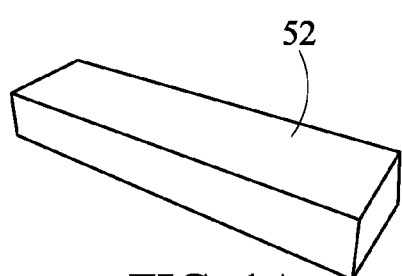
FIGS. 1A through 1D present perspective views of conventional bucking bars used in the prior art.
Figure 1B:
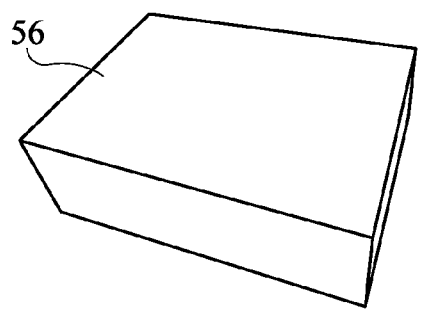
Figure 1C:
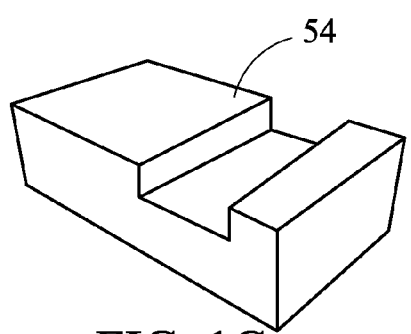
Figure 1D:
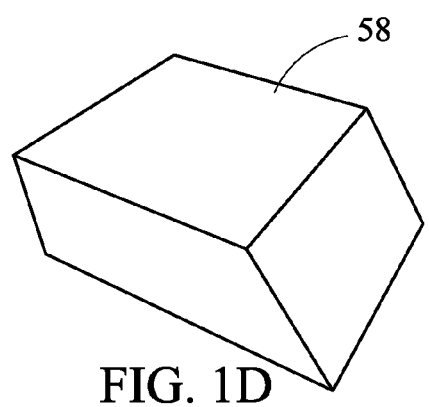

The following reference numerals are used to indicate the parts and environment of the invention on the drawings:

52 first common bucking bar
52' augmented bucking bar
54 second common bucking bar
56 third common bucking bar
58 fourth common bucking bar
62 manufactured common rivet head, manufactured universal rivet head, manufactured rivet head, and rivet head
63 semicircular cut, mar, smiley damage to rivet manufactured head
63' semicircular cut, mar, dent, smiley damage to work piece
64 counter-sunk rivet head, flush rivet head, manufactured rivet head, rive head
66 rivet manufactured head, manufactured head
68 rivet shank
70 end of rivet shank, rivet shank end
72 first work piece
74 second work piece
74 first facing surface, work piece sheathing surface nearest rivet manufactured head, first work surface
76 second facing surface, work piece sheathing surface nearest rivet shank end, second work surface
78 work thickness
80 distance
82 rivet head width
84 desired set rivet head height
84a low side rivet head height
84b high side rivet head height
84c overdriven rivet head height
84d underdriven rivet head height
86 rivet head, button
96 air gap
98 bulge
100 rivet fastening system
102 pneumatic rivet gun, rivet gun, rivet driver
104 rivet set tool, set tool 106 positive low voltage DC power supply, power supply source
108 first conducting wire
110 air hose
112 electro-mechanical solenoid valve, solenoid valve, valve
114 first LED indicator light
116 second conducting wire
118 ground
124 second LED indicator light
126 third conducting wire
128 sensor pad
130 electrically-conductive contacting surface, contact
134 fourth conducting wire
136 third LED indicator light
138 fourth LED indicator light
212 rivet gun operator control circuit board, first circuit board
212' bucker control circuit board, second circuit board
212'' RF repeater circuit board, third circuit board
212''' data acquisition system, fourth circuit board
212'''' solenoid control circuit board, fifth circuit board
212''''' air regulator control circuit board, sixth circuit board
214 mounted LED indicator light, first indicator light
216 mounted LED indicator light bar
218 user selectable position switches
220 first conducting lead wire
226 second conducting lead wire
232 first multi-conductor cable
236 second multi-conductor cable
237 third multi-conductor cable
238 bucking bar
240 bucking bar indicator LED light, second indicator light
240'' second indicating LED
250 cap bolt fastener
252 micro-adjustable jackscrew, jackscrew
254 cap
256 conducting post
257 longitudinal axis
258 e-spring clip, clip
260 housing
262 housing bolt fasteners
264 traveling nut
266 load source, compression spring
268 plunger
270 hammer
300 anvil face
302 interior cylinder stem, cylinder stem
304 distal shoulder
306 plunger stem
308 plunger shoulder
310 proximal shoulder
312 spindles feet, lip
312' first contact point
312'' second contact point
313''' third contact point
314 first distance, gap height, distance between the anvil face and the spindles feet, distance between the work surface and anvil face
316 second distance, translated first distance 314
318 proximal surface
320 housing and plunger surfaces
322 hammer and plunger surfaces
323 cylinder stem and plunger stem surfaces
325 hammer stem, hammer shaft
326 hammer stem and plunger surfaces
327 hammer base
350 microswitch, switch
352 switch lever arm
354 jack-plug assembly
358 momentary push-button switch and indicator LED light assembly
360 first internal wire
362 third internal wires
364 second internal wires
366 housing and traveling nut surfaces
368 plunger stem and traveling nut surfaces
371 first switch chatter signature
371' second switch chatter signature
373 first contact bounce signature
373' second contact bounce signature
375 first falling edge hammer signature
375' second hammer signature
377 time interval
500 digital logic device, microcomputer, microcontroller, microprocessor, computer, controller, control subsystem
502 processor(s)
504 random access memory, RAM, memory
506 read only memory, ROM
508 bus
510 storage device
512 input/output device(s)
514 sensor interface
520 bucking bar control system, rivet set tool control system, control system
522 computer, microcomputer
524 power subsystem
526 sensor array subsystem
528 control and communication subsystem
530 rechargeable battery, battery
532 power regulator, regulator
534 external power supply, power supply
540 pneumatic solenoid, pneumatic solenoid valve, solenoid valve, valve
542 communication indicators
544 communication port
546 graphic user interface
548 keypad, interface
550 initialize step
552 detect "AG Ready" step
554 gun ready conditional step
556 turn LEDs on step
558 detect "BB Ready" step
560 bucker ready conditional step
562 initiate riveting step
564 detect start rivet step
566 rivet start conditional step
568 start timer/count impacts step
570 detect height threshold conditional step
572 end riveting cycle step
574 first interrupt service request step
576 second interrupt service request step
578 forced recalibration step
580 conduct calibration, calibration mode
582 stop rivet gun IRQ from "detect if user disengaged work during driving cycle" in block 568
600 cap screw
602 access port
605 slot type photointerrupter switch
606 strain relief device
611 housing shoulder 640 set tool assembly
650 external collar
652 external setscrew
654 internal collar
656 internal setscrew
702 threaded traveling nut
704 key, axially-positioned tab, tab
706 switch housing collar
708 first embedded switch
710 second embedded switch
712 shoulder of collar
713 shoulder of housing
802 first battery
804 second battery
806 third battery
808 relay
810 fourth battery
902 NPN type transistor
904 relay, field effect transistor, transistor, solenoid driver, valve driver, driver, valve controller, controller
906 user activated switch
908 calibration mode LED
950 start step
952 initialize system step
954 main program step
956 rivet gun operator ready step, bucker ready block
958 bucker ready step, bucker ready block
960 error detection step, fault management step, error detection block
962 calibration step, calibration block
964 system reset step, system reset block
990 pressure regulator, flow regulator, air regulator
992 radio frequency signals
994 management computer, central computer
1002 spring coupling recess, recess
1004 first raised cylinder diameter
1006 second raised cylinder diameter
1008 spring clip recess, recess
1010 internal spring clip, clip
1012 hole
1014 spiral roll pin, roll pin, pin
1016 pin slots, slots
1018 lid
1020 sub-assembly circuit board
1022 multi-conductor jack plug, plug
1023 spring loaded electrical contacting pin
1024 light source, LED, lamp, user indicator, indicator
1026 hole in lid, hole
1027 light from LED light source, light
1030 alternative set tool assembly
1032 alternative housing
1034 LED indicator light, light
1040 master circuit board, circuit board
1042 slave circuit board, circuit board subassembly, circuit board
1044 alternating to direct current power converter and supply, power supply
1046 2-conductor power port jack plug, power jack plug
1048 direct current supply voltage regulator, voltage regulator
1050 constant current supply regulator, current regulator
1054 controller block
1056 LED control block
1058 signal control block
1060 contact sensor block
1062 loop circuit sensor block
1063 indicator block, user communication for tool alignment aid
1064 momentary pushbutton microprocessor mode selection input device, pushbutton, user interface
1066 first electrical conductive attachment mechanism, first alligator clip
1068 second electrical conductive attachment mechanism, second alligator clip
1100 alternate set tool, sensor head assembly
1104 first spring electrical contact, commutation lever, commutator
1106 first electrical conducting pin
1108 second electrical conducting pin
1120 detector, sensor
1121 target detected by sensor, detected target, target
1124 viewport, unobstructed visual sight-path
1150 firmware schematic drawing, schematic drawing
1152 power supply block, power conditioning, voltage and current regulators, power supply
1154 valve control block, control block
1156 LED illumination and communication control circuit, light control circuit
1158 power supply to spindle feet control, first loop circuit formation, signal output
1160 contact detection of spindles feet or anvil face, second loop circuit formation, contact detection

DETAILED DESCRIPTION

While illustrative embodiments have been illustrated and described, it will be appreciated that various changes can be made therein without departing from the spirit and scope of the invention.

The following description of the preferred embodiments of the invention is merely exemplary in nature and is in no way intended to limit the invention, its application, or uses. In preferred embodiments, the rivet fastening system disclosed herein is configured to control the rivet setting process and the resultant rivet set.

Referring to FIGS. 1A through 1 D, prior art examples of common conventional bucking bars are illustrated. Conventional bucking bars are used to back up rivets during the fastening process and comprise a metal mass typically having a hardened material and a polished anvil face for impacting the rivets. Conventional bars come in numerous bar shapes, illustrated here by first common bucking bar 52, second common bucking bar 54, third common bucking bar 56 and fourth common bucking bar 58.

Figure 2A:
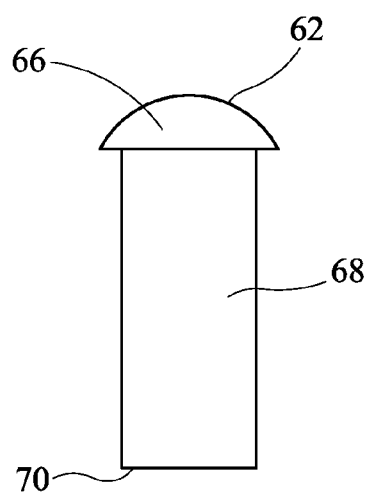
FIGS. 2A and 2B present elevation views of two types of prior art rivet fasteners.
Figure 2B:
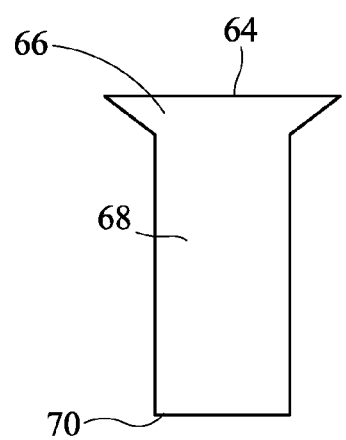

Referring to FIGS. 2A and 2B, examples of two typical prior art solid-core rivets are presented. Both rivets have manufactured heads 66, a rivet shank 68 and a rivet shank end 70. FIG. 2A depicts a first type of said solid core rivet having a dome shaped, common or universal rivet head 62. FIG. 2B depicts a second type of said solid core rivet having a counter-sunk or flush rivet head 64.

Figure 3:
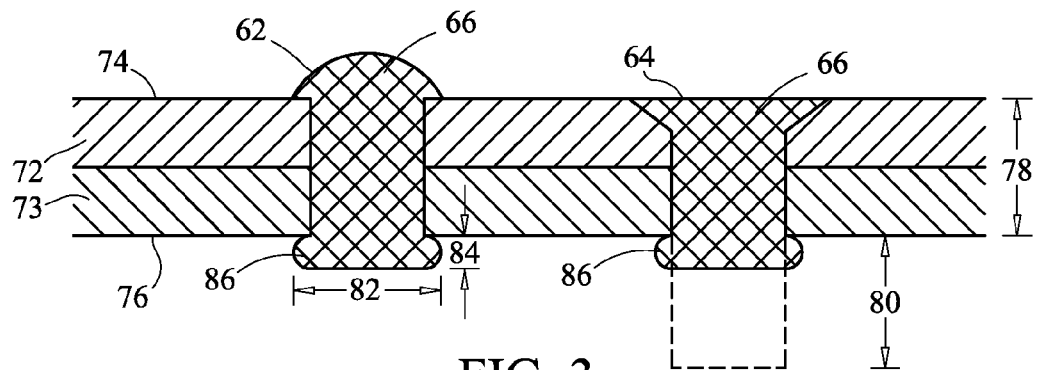
FIG. 3 is an elevation view illustrating properly set rivets of the types shown in FIGS. 2A and 2B.

Referring to FIG. 3, examples of properly set prior art rivets are illustrated. The rivets are used to fasten a plurality of work pieces 72, 73 having combined work thickness 78 together. Manufactured head 66 secures first work piece 72 having first facing surface 74 while the driven rivet head 86 secures second work piece 73 having second facing surface 76. Facing surfaces 74 and 76 are also work surfaces. Typically, when undriven, rivet shank 68 initially protrudes beyond surface 76 a distance 80 of about 1½ times work thickness 78. When set, rivet head 86 typically has a rivet head width 82 of about 1½ times the diameter of rivet shank 68 and has a desired set rivet head height 84 of about ½ of the diameter of rivet shank 68. Thus, when properly sizing rivets to work thickness 78, typically a rivet width 82 is a directly proportional function of rivet height 84 and vice versa. Rivet setting specifications are further outlined in United States of America Military Specification MIL-R-47196A (MI). Preferred embodiments of this invention provide configurations to achieve measurement of the rivet head height in real-time or near real time using preferred sensing technologies coupled with the teachings (presented later) best suited for this measurement. However, a person having ordinary skill in the art would understand that should other sensing technologies be developed or identified to measure rivet head width 82 in real-time or near real time, these sensors could be incorporated into this invention without changing the intent or concept of this invention. It is also realized that other sensing technologies for measurement of the rivet head height in real-time or near real time may be developed or may be identified to further improve this invention. Incorporation of such sensors is also considered not to alter the intent or concept of this invention.

Figure 4A:
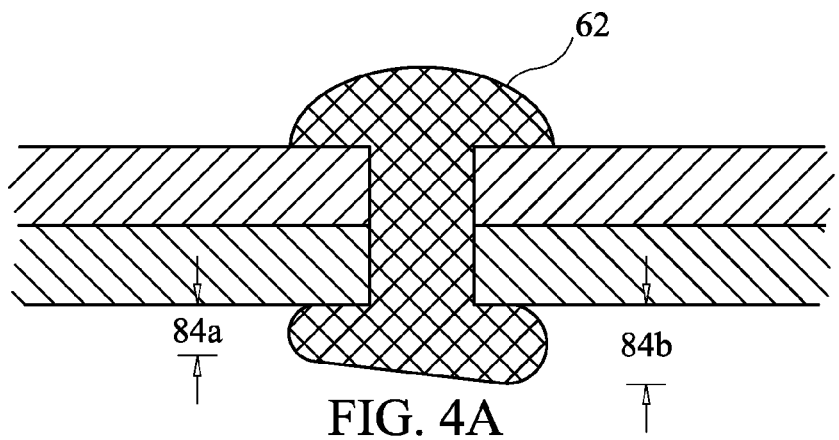
FIG. 4A is an elevation view of an improperly set prior art rivet of the type shown in FIG. 2A.

Referring to FIG. 4A, an illustration of an improperly set prior art universal rivet is presented. Set low side rivet head height 84a is less than minimum allowed height tolerance and/or set high side rivet head height 84b is greater than maximum allowed height tolerance. This illustration depicts a misshapen rivet head resulting from tool misalignment (by not holding the bucking bar orthogonal to the work surface).

Figure 4B:
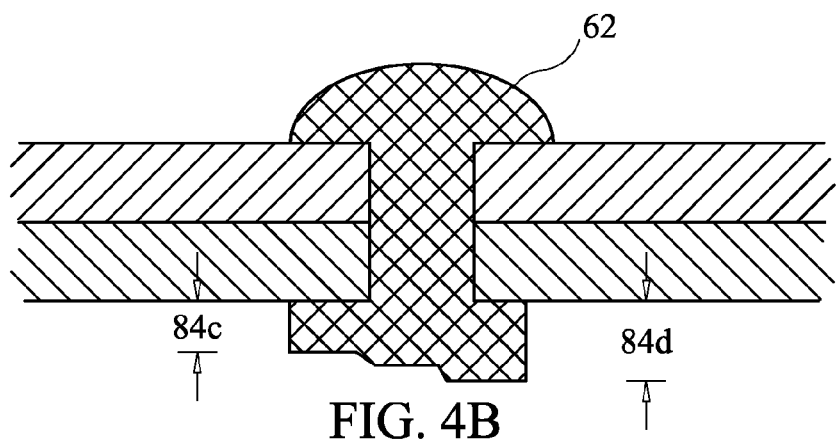
FIG. 4B is an elevation view of an improperly set prior art rivet of the type shown in FIG. 2A.

Referring to FIG. 4B, an illustration of an improperly set prior art universal rivet is presented. Set overdriven rivet head height 84c is less than minimum allowed height tolerance and/or set underdriven rivet head height 84d is greater than maximum allowed height tolerance. This illustration depicts a misshaped rivet head resulting from the anvil face slipping off the rivet head during the rivet fastening process.

Figure 4C:
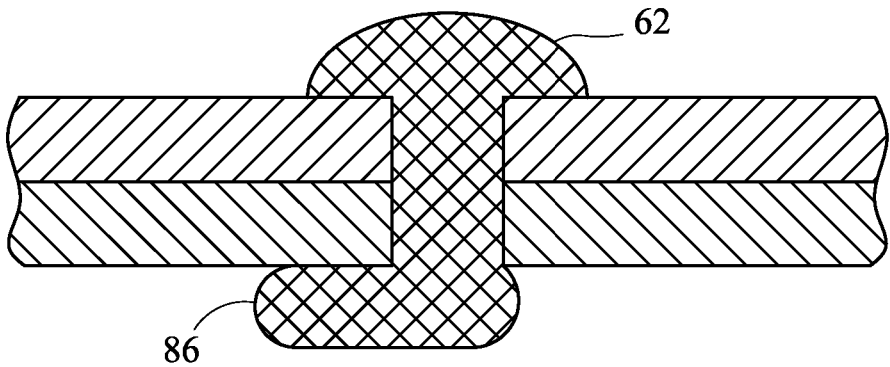
FIG. 4C is an elevation view of an improperly set prior art rivet of the type shown in FIG. 2A.

Referring to FIG. 4C, an illustration of another improperly set prior art universal rivet presented. In this instance, set rivet head 86 is not centered on the longitudinal axis of rivet shank 68. This set rivet shape results from side-loads being applied to the rivet during the rivet driving stage and such an improperly set rivet does not adequately secure the work pieces together.

Figure 4D:
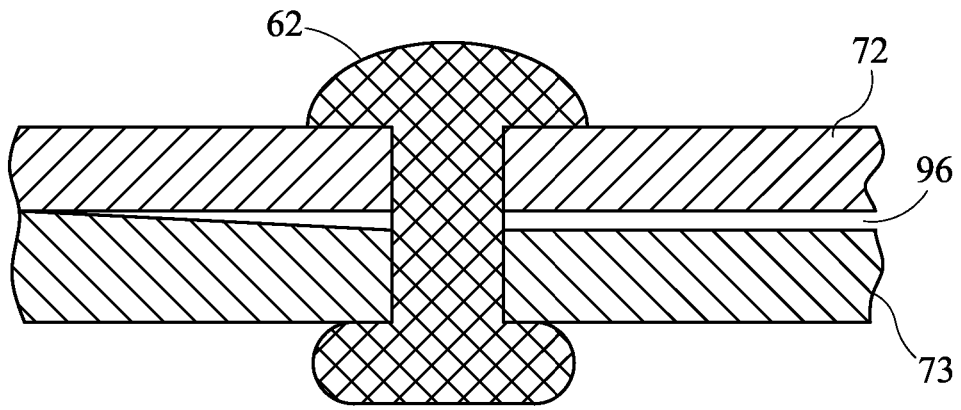
FIG. 4D is an elevation view of an improperly set prior art rivet of the type shown in FIG. 2A.

Referring to FIG. 4D, an illustration of another improperly set prior art universal rivet is presented. In this instance, rivet 62 is set in a manner that allows a first type of air gap 96 to be formed between work pieces 72 and 73. Again, this results in a set rivet that does not adequately secure the work pieces together.

Figure 4E:
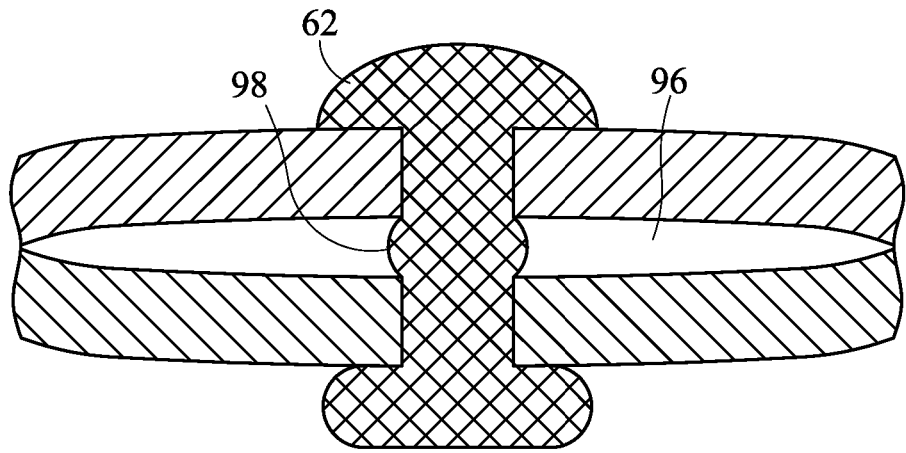
FIG. 4E is an elevation view of an improperly set prior art rivet of the type shown in FIG. 2A.

Referring to FIG. 4E, an illustration of another improperly set prior art universal rivet is presented. In this instance, rivet 62 is set in a manner that allows a second type of air gap 96 to be formed between work pieces 72 and 73. This also results in a set rivet that does not adequately secure the work pieces together. Furthermore, in this instance, rivet shank 68 expands during the rivet setting process forming bulge 98, which prevents the work pieces from coming together flush and renders the rivet difficult to remove for rework. The situations depicted in FIGS. 4D and 4E show improperly set rivets resulting from the work pieces not being adequately pressed together during the riveting process. FIGS. 4A-4E illustrate out of tolerance set rivets that do not adequately secure the work pieces together and require removal and rework resulting in extensive lost labor time and potential damage to the work surfaces or subsurfaces.

Figure 4F:
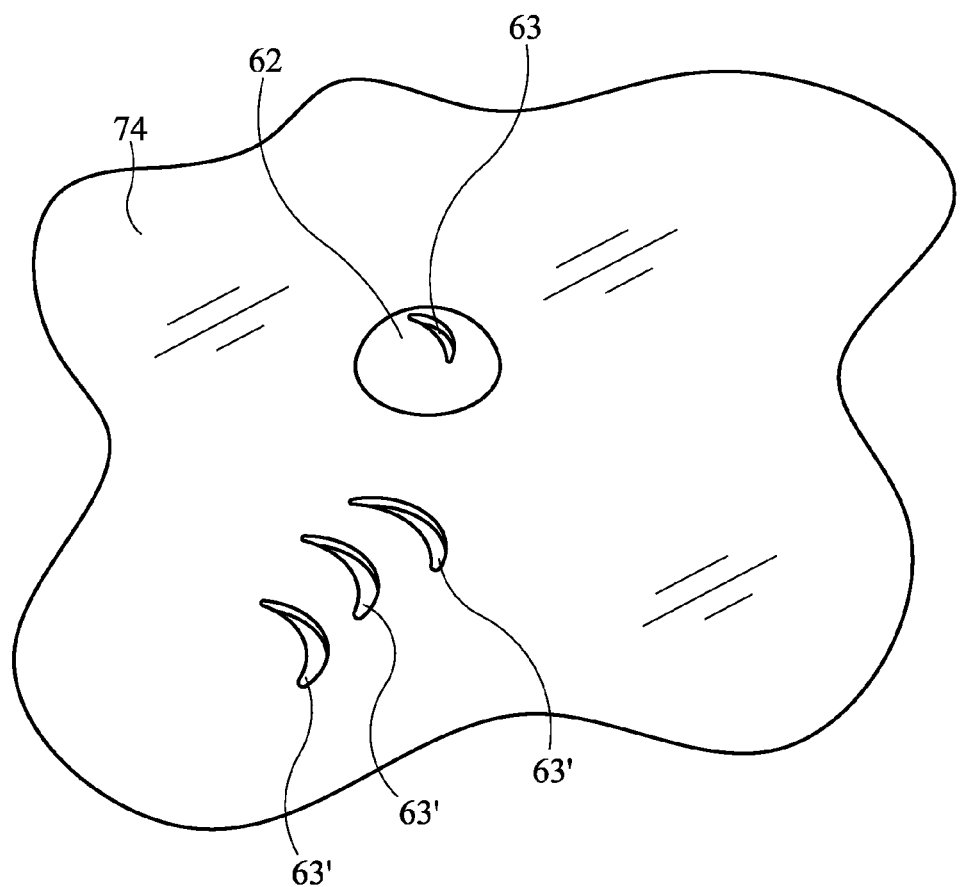
FIG. 4F is an elevation view of an improperly set prior art rivet of the type shown in FIG. 2A.

Referring to FIG. 4F, an illustration of another improperly set prior art universal rivet is presented. This type of rivet is commonly driven using use a concave or cup-shaped anvil faced set tool that matches said rivet head 62 shape. If a rivet gun impact event occurs when the set tool anvil face is improperly positioned or aligned over said rivet head 62, a semicircular cut, mar, or indentation commonly termed a "smile" or a "smiley" can result as another instance of an improperly set rivet. FIG. 4F shows damage to said rivet head 62 illustrated by smiley 63 and shows damage to work piece sheathing surface 74 illustrated by smiley damage 63'. Smiley damage requires rework.

Figure 5A:
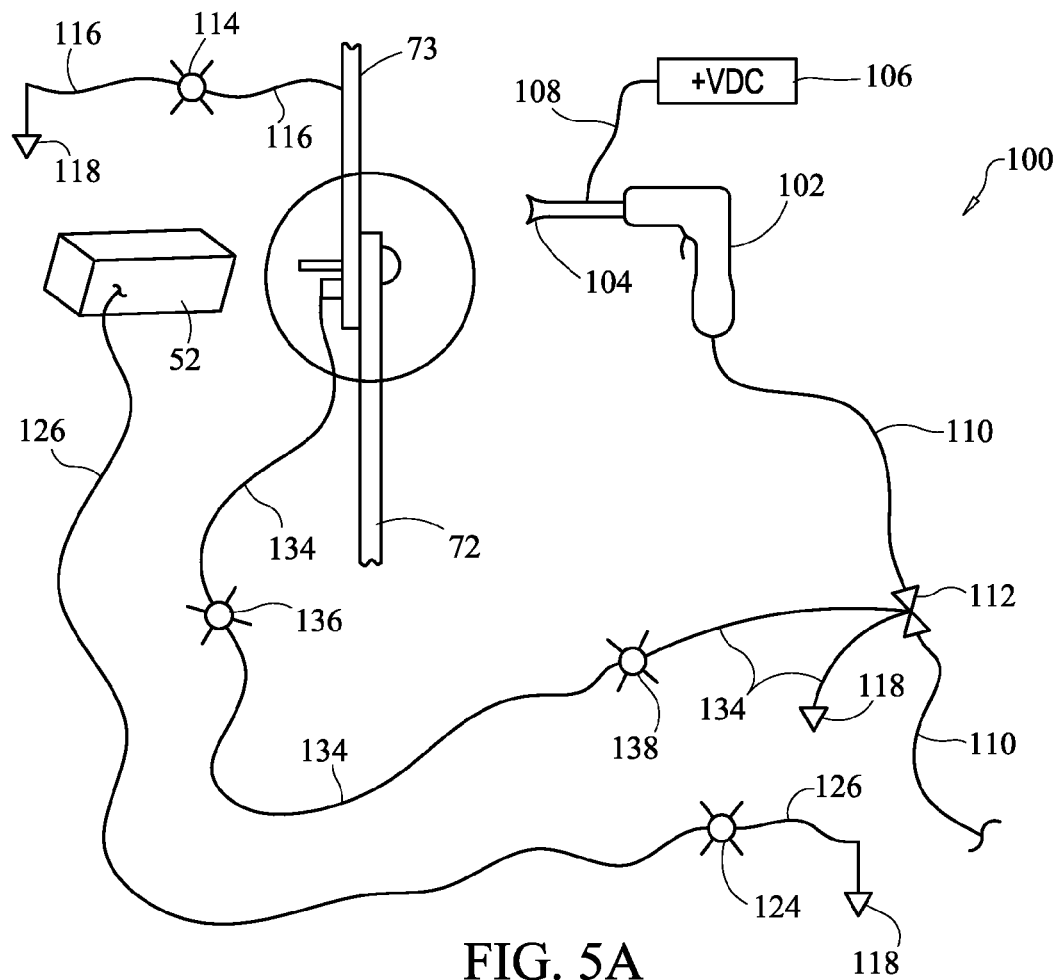
FIG. 5A is a schematic diagram of a preferred embodiment of the invention.
Figure 5B:
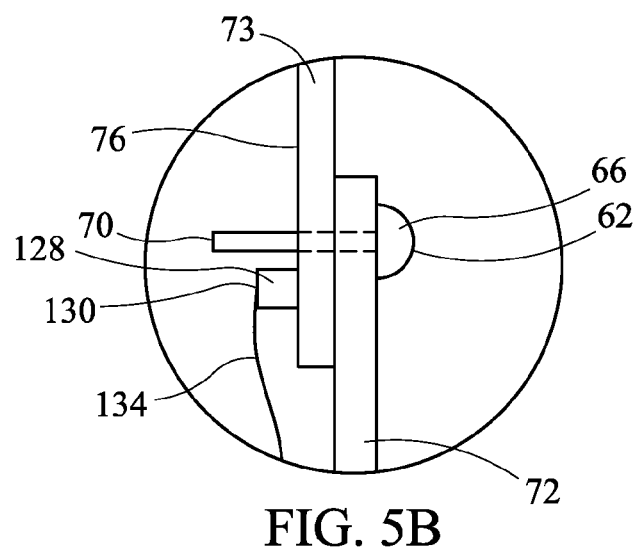
FIG. 5B is an elevation view of an aspect of the preferred embodiment of the invention illustrated in FIG. 5A

Referring to FIGS. 5A and 5B, a simplified embodiment of the invention is illustrated to simplify and teach the invention. In this embodiment, rivet fastening system 100 comprises pneumatic rivet gun 102 equipped with rivet set tool 104. Rivet gun 102 may also be a rivet driver and a rivet driver can also be any device that departs energy to upset a rivet; not all rivet drivers are necessarily rivet guns. Set tool 104 is preferably connected to positive low voltage direct current (DC) power supply 106 by first conducting wire 108. Rivet gun 102 is preferably connected to an air reservoir (not shown) via air hose 110 with electro-mechanical solenoid valve 112 being located in-line with (in series with) air hose 110 between rivet gun 102 and the air reservoir.

In this embodiment, second conducting wire 116 is coupled to work piece 73 that is connected in series with first LED indicator light 114 to ground 118. Thus, when set tool 104 contacts rivet manufactured head 66 and/or work piece 72 or 73, a first loop circuit (forming a second sensor) is closed from power supply source 106 through rivet manufactured head 66 and/or work piece 72 or 73 and second conducting wire 116 to illuminate first LED indicator light 114 and thereby indicate to the bucker (bucker bar operator) that the rivet gun operator is "ready" to begin the rivet cycle.

In this embodiment, third conducting wire 126 is coupled to first common bucking bar 52 which is connected in series with second LED indicator light 124 to ground 118. Thus, when common bucking bar 52 contacts rivet shank end 70, a second loop circuit (forming another second sensor) is closed from power supply source 106, first wire 108, through set tool 104 and rivet 62 to common bucking bar 52 and third conducting wire 126 to illuminate second LED indicator light 124 to indicate to the rivet gun operator that the bucker is also "ready" to begin the rivet cycle.

Finally, referring to FIG. 5B, in this embodiment, sensor pad 128 is adhesively affixed to second facing surface 76 adjacent to rivet shank 68. Sensor pad 128 is preferably comprised of an adhesive pad (not shown) on a first side and an electrically-conductive contacting surface 130 on a second (opposite) side which is coupled to fourth conducting wire 134. Sensor pad 128 is preferably comprised of a compressible material such as memory foam that returns to its original height after compression force(s) are removed. Sensor pad 128 preferably has a height (measured between the described adhesive surface and conductive contacting surface 130) that matches desired set rivet head height 84.

Again referring to FIG. 5A, fourth conducting wire 134 is coupled in series to third LED light 136 and fourth LED light 138 and solenoid valve 112 between contacting surface 130 and ground 118. Thus, when bucking bar 52 contacts sensor pad 128 contacting surface 130 (this occurs when the driven rivet head 86 achieves desired set height 84), a third loop circuit (forming a first sensor) is closed from source 106, first wire 108, through set tool 104, rivet 62, bucking bar 52, contacting surface 130 to illuminate third LED indicator light 136 and fourth LED indicator light 138 and close solenoid valve 112 to indicate to both operators that the rivet setting cycle is at an end. Solenoid valve 112 closes, disabling rivet gun 102 when rivet 62 has been set, thereby automatically stopping the riveting process.

Referring to FIG. 6A, an exploded view of a preferred embodiment of bucking bar 238 is presented. In this embodiment, bucking bar 238 is comprised of cap bolt fastener 250, micro-adjustable jack screw 252, cap 254, conducting post 256, e-spring clip 258, housing 260, housing bolt fasteners 262, traveling nut 264, load source or compression spring 266, plunger 268 and hammer 270. During assembly of bucking bar 238, jackscrew 252 is affixed to cap 254 by means of e-spring clip 258 (jack screw 252 is not threadedly engaged with cap 254 or with clip 258). Then, housing bolt fasteners 262 affix housing 260 to cap 254. Next, traveling nut 264 is threadedly engaged with jackscrew 252 forming a micro-adjustable traveling-nut-positioning jackscrew assembly. Next, compression spring 266 and plunger 268 are installed, guided by the shaft of hammer 270. The assembly process is completed by affixing the end of the shaft of hammer 270 to cap 254 with cap bolt fastener 250. Cap bolt fastener 250 is threadedly engaged with the end of the shaft of hammer 270. FIG. 6B shows a perspective view of assembled bucking bar 238.

Figure 7A:
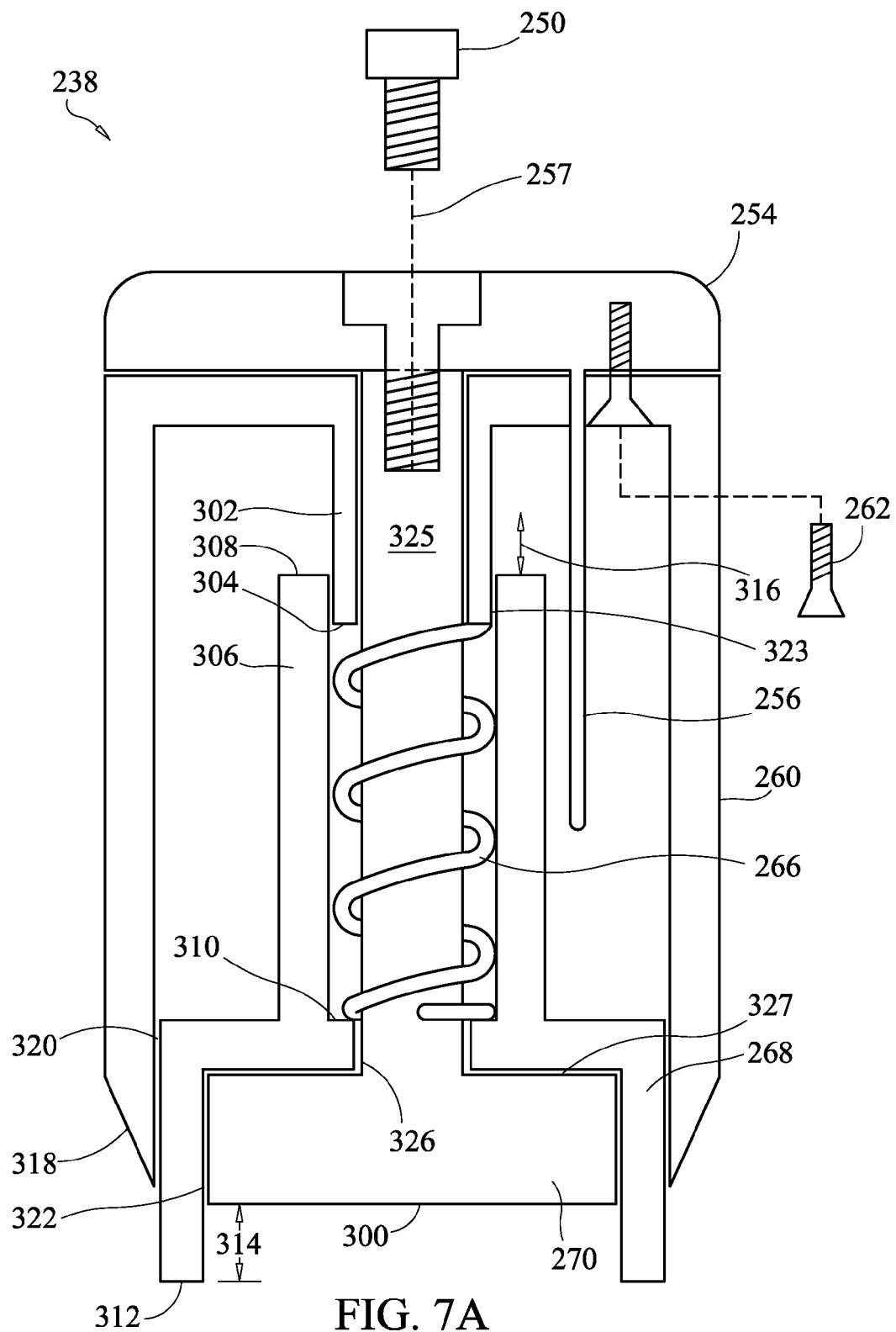
FIG. 7A is a partial cross-sectional view of the bucking bar presented in FIG. 6B (for purposes of clarity, only selected components are presented).

Referring to FIG. 7A, a cross-sectional view of a preferred embodiment bucking bar 238 is presented. In this embodiment, cap bolt fastener 250 is threadedly engaged with end of the shaft of hammer 270 and serves to affix hammer 270 to cap 254. Optionally, this engagement may be augmented with a key (not shown in FIG. 7A) interfacing between the threaded end of the shaft of hammer 270 with cap, serving to allow user to secure fastener 250 without rotating the shaft of hammer 270. A plurality of housing fasteners 262 attach housing 260 to cap 254. Compression spring 266 applies opposing force to distal shoulder 304, located at end of interior cylinder stem 302 of housing 260, and to proximal shoulder 310 of plunger 268.

Movement of plunger 268 is preferably guided by machine slide tolerances at housing and plunger surfaces 320, bounded as shown by housing 260 and plunger 268. Movement of plunger 268 is preferably further guided by machine slide tolerances at hammer and plunger surfaces 322, bounded as shown by the base of hammer 270 and plunger 268. Movement of plunger 268 is preferably further guided by machine slide tolerances at housing cylinder stem and plunger stem at surfaces 323; bounded by cylinder stem 302 and plunger stem 306. Movement of plunger 268 is preferably still further guided by machine slide tolerances at hammer stem 325 and plunger surfaces 326; bounded as shown by hammer stem 325 and plunger 268. In this embodiment, plunger 268 can thus only move parallel to longitudinal axis 257.

Proximal surface 318 of housing 260 is preferably beveled as shown to reduce potential bucker finger pinch-point injuries. In this embodiment, conducting post 256 provides an electrically conductive loop circuit path from the cavity in housing 260 to the anvil face 300 through cap 254 and hammer 270 (which conductive path is discussed later).

In this embodiment, anvil face 300 becomes orthogonally aligned to work piece 73 and rivet shank end 70 by flush-contact between second facing surface 76 and lip or spindles feet 312 surface, located at the base of plunger 268. Unless a force greater than that exerted by compression spring 266 is axially applied to spindles feet 312, compression spring 266 forces plunger 268 to remain against hammer base 327. When downward force is applied to bucking bar 238 (with spindles feet 312 resting against second facing surface 76), preferably any possible air gap 96 between work pieces 72 and 73 is eliminated by the force exerted by compression spring 266 on second facing work surface 76 through spindles feet 312 of plunger 268.

In this configuration, any axial motion of plunger 268 deflects compression spring 266. However, while spindles feet 312 are in contact with second facing surface 76, a first distance 314 between second facing surface 76 and anvil face 300 is directly transferred to a second distance 316 by displacement of plunger shoulder 308. When enough downward force is applied to the bucking bar 238, anvil face 300 comes in contact with the rivet shank end 70, from this moment forward first distance 314 represents the height of the forming rivet head and is sometimes termed the "gap height" or distance between anvil face and spindles feet or distance between the work surface and anvil face. First distance 314 and second distance 316 are always equal because first distance 314 is translated through plunger 268 body to second distance 316.

Figure 7B:
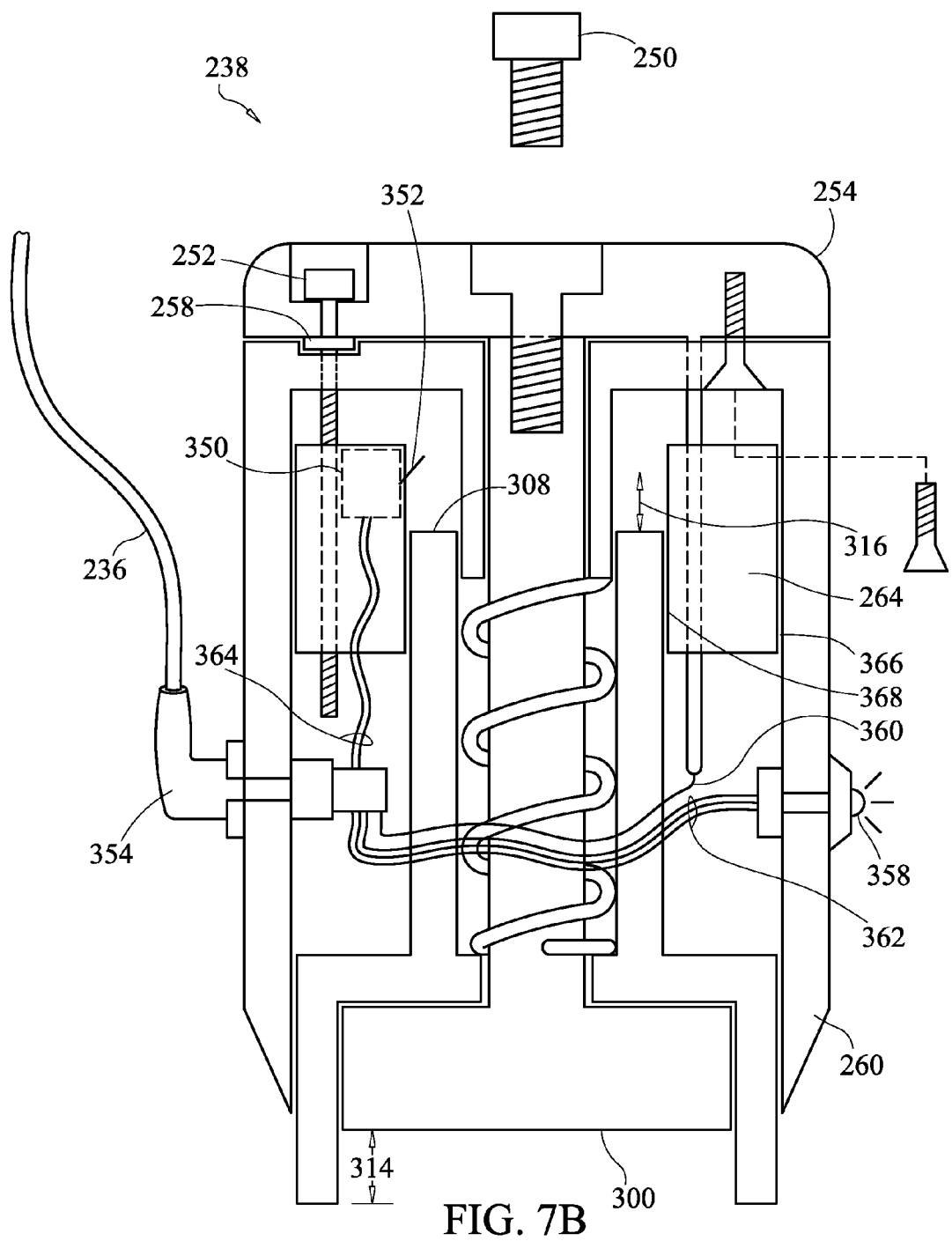
FIG. 7B is a detailed cross-sectional view of the bucking bar presented in FIG. 6B (including parts shown in FIG. 7A).

Referring to FIG. 7B, a partial cross-sectional view of a preferred embodiment bucking bar 238 of FIG. 7A is presented that provides additional detail. In this embodiment, bucking bar 238 comprises a micro-adjustable jackscrew assembly that includes jackscrew 252 coupled to cap 254 by means of e-spring clip 258. Jackscrew 252 preferably has a small slot in its shaft to accept clip 258 and likewise housing 260 preferably also has a small slot to provide clearance for clip 258. Jackscrew 252 extends through cap 254 and housing 260 and is threadedly engaged with traveling nut 264. First sensor switch 350 is affixed to traveling nut 264 such that switch lever arm 352 may contact shoulder 308 as second distance 316 is translated from first distance 314. Jackscrew 252 is not however threadedly engaged with cap 254, clip 258 or housing 260. This restricts the motion of jackscrew 252 motion to clockwise or counter-clockwise rotational movement which movement is operative to axially position traveling nut 264 and cause switch 350 to trip switch lever 352 on plunger shoulder 308 when desired set rivet head height 84 is achieved.

In this embodiment, movement of traveling nut 264 is preferably guided by machine slide tolerances at housing and traveling nut surfaces 366 and at plunger and traveling nut surfaces 368; bounded as shown by housing 260 and traveling nut 264 and by plunger stem 306 and traveling nut 264, respectively. In an alternate embodiment, traveling nut 264 may be guided by other bodies, for example, by conducting post 256 or a grooved slot in the body of housing 260.

The micro-adjustable jackscrew assembly is preferably calibrated by placing a disk or other body having height matching a desired set rivet head height 84 on second facing surface 76 (or another surface that is equivalent to second facing surface 76); then, bucking bar 238 is placed over the disk and compressed until anvil face 300 is flush against the disk and spindles feet 312 are against second facing surface 76. Next, the rivet gun operator contacts set tool 104 against the rivet manufactured head 66 to cause bucking bar indicator LED light 240 to illuminate; finally, the bucking bar operator adjusts jackscrew 252 until the bucking bar indicator LED light 240 begins to continuously flash on and off. This is a simple one-point calibration. Some sensors require that the user be cognizant of switch behavior such as pre-travel, otherwise known as the movement of the actuator prior to closing the circuit, sometimes referred to as "Travel to Make." Another switch behavior is hysteresis described here as a "Travel to Break." Thus the switch make and switch break positions do not always coincide. Those skilled in the art will recognize that employing a second switch in bucking bar 238 having switch lever axially offset from the first rivet set threshold (height 86 tolerance detection) switch can also be used to overcome these problems; provided that the offset distance is sufficient for the second switch to make after the first switch breaks. Other calibration methods may be used without out deviation from concept of this invention. A user operated switch can optionally invoke the calibration process (presented later).

Bucking bar 238 preferably further comprises second multi-conductor cable 236 having a jack-plug assembly 354. From jack-plug assembly 354, first internal wire 360 is coupled to conducting post 256. Also from jack-plug assembly 354, second internal wires 364 connect to switch 350 and third internal wires 362 connect to combination momentary push-button switch and indicator LED light assembly 358. Optionally, conducting post 256 may be replaced by any electrically conductive path coupling a circuit board to an anvil face. In application, the described micro-adjustable mechanism is operative to allow a user to position said first sensor so that said switching threshold toggles when distance between anvil face and work surface is substantially equal to said desired rivet head height.

In this embodiment, bucking bar indicator LED light 240 shown in other embodiments is intentionally replaced by a combination comprising momentary push-button switch and indicator LED light assembly 358. Momentary push-button switch and indicator LED light assembly 358 provides the bucker with the option of manually indicating (second sensor) when he is "ready" to begin bucking. This feature is considered an alternate embodiment because, in some cases, rivets are coated with a non-conductive material. This alternate embodiment also includes a momentary push-button switch (not shown) on circuit board 212 (shown in other embodiments) that also provides the rivet gun operator with the option of manually indicating when he is "ready" to begin riveting.

Figure 8:
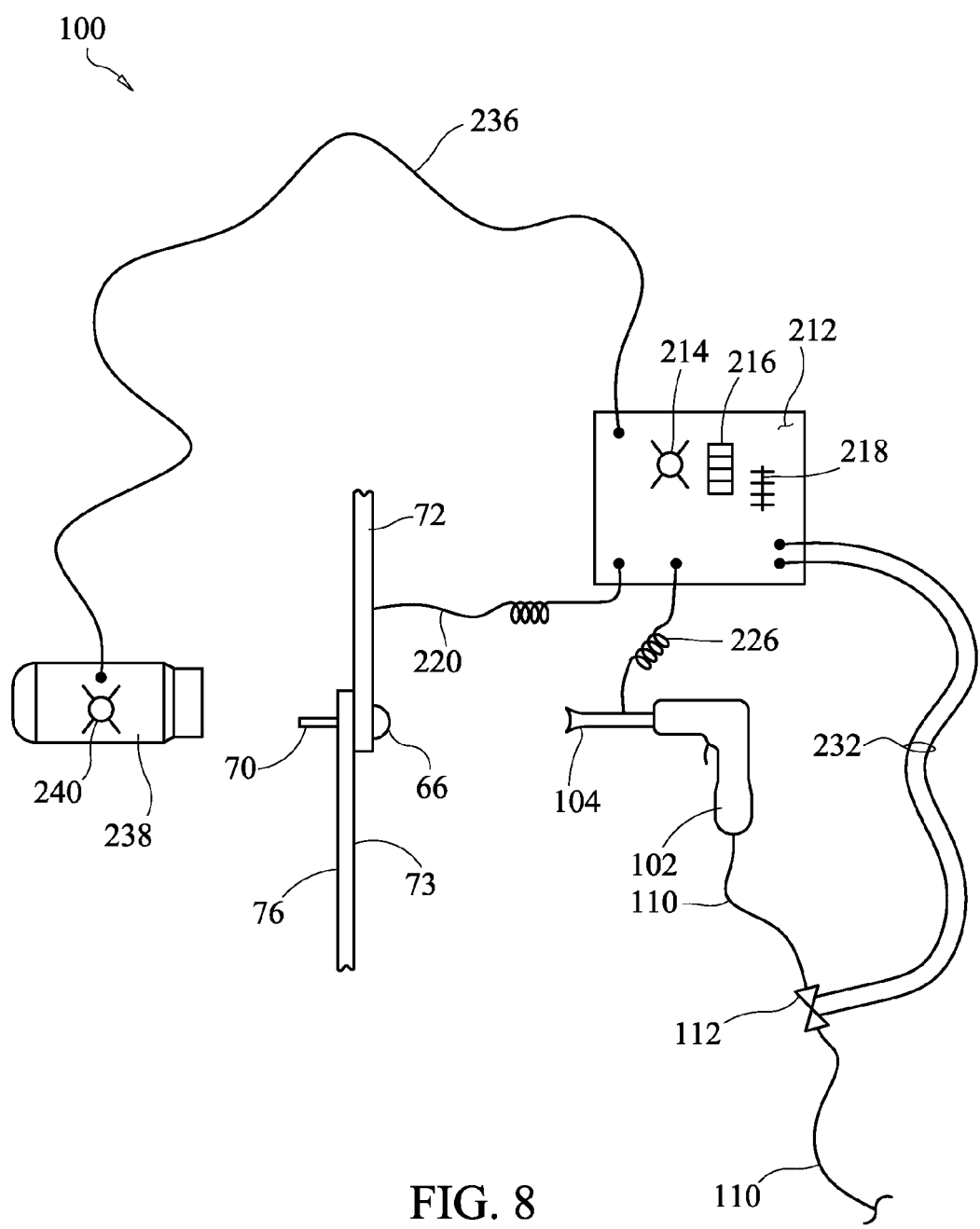
FIG. 8 is a schematic diagram of a more preferred embodiment of the invention, exhibiting general components and their relationships.

Referring to FIG. 8, a preferred embodiment of the invention is presented that preferably incorporates bucking bar 238. In this embodiment, rivet fastening system 100 is comprised of pneumatic rivet gun 102 that is equipped with rivet set tool 104 and circuit board 212. Circuit board 212 preferably comprises mounted LED indicator light 214, mounted LED indicator light bar 216, a set of user selectable position switches 218, first conducting lead wire 220 and second conducting lead wire 226, first multi-conductor cable 232 and second multi-conductor cable 236 and various electronic components such as a circuit isolating photocoupler, a microprocessor, a battery and/or an external power supply, a power regulator, and a communication port (with these electronic components not being shown in FIG. 8 for purposes of clarity). Second multi-conductor cable 236 preferably couples circuit board 212 to the bucking bar 238. The equipment shown in FIG. 8 not only accommodates the functionality described earlier with respect to equipment shown in FIGS. 5A and 5B, but also allows for additional capabilities to be presented later.

Contacting set tool 104 with rivet manufactured head 66 and/or first work piece 72 closes a first loop circuit (second sensor) formed by first conducting lead wire 220 and second conducting lead wire 226. Upon detection of this first completed circuit, the microprocessor illuminates mounted LED indicator light 214 and bucking bar indicator LED light 240 located on circuit board 212 and bucking bar 238, respectively; this indicates to both operators that the rivet gun operator is "ready" to begin riveting. In an alternate embodiment, another sensor technology is used to replace first conducting lead wire 220. For example, a touch capacitance sensor mounted on circuit board 212 that is coupled to second conducting lead wire 226 to sense contact between set tool 104 and manufactured head 66.

When bucking bar indicator LED light 240 illuminates, the bucker then backs up rivet shank end 70 with bucking bar 238. This action compresses plunger 268 which applies force to second work piece 73 to eliminate any air gap 96. Plunger 268 is further compressed until anvil face 300 of bucking bar 238 contacts rivet shank end 70 forming a second loop circuit through a first path (second conducting lead wire 226, set tool 104, manufactured head 66 and/or first work piece 72, the bucking bar anvil, and second multi-conductor cable 236) or alternately through a second path (first conducting lead wire 220, first work piece 72, common rivet 62, the bucking bar anvil, and cable 236). Upon detecting this second loop circuit (another second sensor) the microprocessor continuously flashes indicator LED lights 214 and 240 on-and-off to indicate to both operators that the bucker is also "ready" to begin riveting. Furthermore, the microprocessor also then operates controller 904 to open solenoid valve 112 to enable operation of rivet gun 102.

While common rivet 62 is being driven, rivet head 86 forms until it meets the desired rivet head height 84. Also, while common rivet 62 is being driven, plunger 268, acting against second facing surface 76 is further compressed. Upon achieving the desired head height 84, a switch is toggled by the axial motion of plunger 268; this forms a third loop circuit (first sensor) using at least two conductor wires in second multi-conductor cable 236. When this third circuit is detected, the microprocessor preferably turns off mounted LED indicator light 214 and bucking bar indicator LED light 240 and then closes solenoid valve 112 (using controller 904) to disable rivet gun 102, thereby stopping rivet gun 102. Mounted LED indicator light 214 and bucking bar indicator LED light 240 being turned off or rivet gun 102 being disabled, serves to indicate to both operators that the rivet has been set. A timing delay is then started by the microprocessor before enabling a new riveting cycle. In this way, the microprocessor sequentially controls each stage of the rivet setting cycle. This sequencing prevents, for example, the bucker from indicating the he is "ready" until after the rivet gun operator has indicated that he is "ready."

In an alternative embodiment, detection of a closed loop circuit when set tool 104 contacts rivet head 66 may be achieved by detecting a loop circuit formed by first conducting lead wire 220 and second conducting lead wire 226 at circuit board 212. Similarly, a loop circuit is completed at circuit board 212 when both (1) set tool 104 contacts rivet manufactured head 66 and (2) anvil face 300 contacts rivet shank end 70 forming a contact circuit through second conducting lead wire 226 and second multi-conductor cable 236. Detection of these loop circuits may be achieved by any means including measuring conductivity or electrical resistance in the loop to determine if the loop circuit of interest is open or closed, and/or detecting an applied voltage from one side of the loop circuit with a microprocessor.

In an alternate embodiment, second multi-conductor cable 236 is replaced by radio frequency (RF), infrared or by other wireless communication. In this embodiment, bucking bar 238 is provided with a separate circuit board, with both the circuit board 212 and the separate circuit board being equipped with RF transceivers for purposes of wireless communication. In this alternate embodiment, another conducting lead wire may extend from bucking bar 238 to work piece 72 or 73 that would be closed when anvil face 300 contacts rivet shank end 70. In still another alternate embodiment, first conducting lead wire 220 and the other conducting lead wire described above may be eliminated by using sensors from other sensing technologies such as capacitance sensors at circuit board 212 and at the separate circuit board described above for detecting contact of set tool 104 or anvil face 300 with rivet 62. Any other contact detector method or sensing technology may be incorporated into the invention without deviation from the inventive concept.

In an alternate embodiment, first conducting lead wire 220 can be eliminated by including at least one detecting loop circuit (not shown in FIG. 8) on circuit board 212. In this embodiment, work pieces 72 and 73 are coupled to the same electrical ground potential as the power supply to circuit board 212. Here a detecting loop circuit on circuit board 212 detects when components are electrically sourcing a small amount of current directly to ground potential. A first detecting circuit (second sensor) identifies when set tool 104 contacts rivet head 66 by detecting sourcing current to ground via second conducting lead wire 226, set tool 104, rivet head 66, and work pieces 72 or 73 to ground (not shown). Likewise a second detecting circuit (another second sensor) identifies when bucking bar 238 anvil face 300 contacts rivet shank end 70 by detecting sourcing current to ground via second multi-conductor cable 236, first internal wire 360, conducting post 256, anvil face 300, rivet shank end 70, and work piece 72 or 73 to ground (not shown). Also, optionally a third detecting circuit identifies when spindles feet 312 (discussed later) of plunger 268 contact surface 76.

Figure 9:
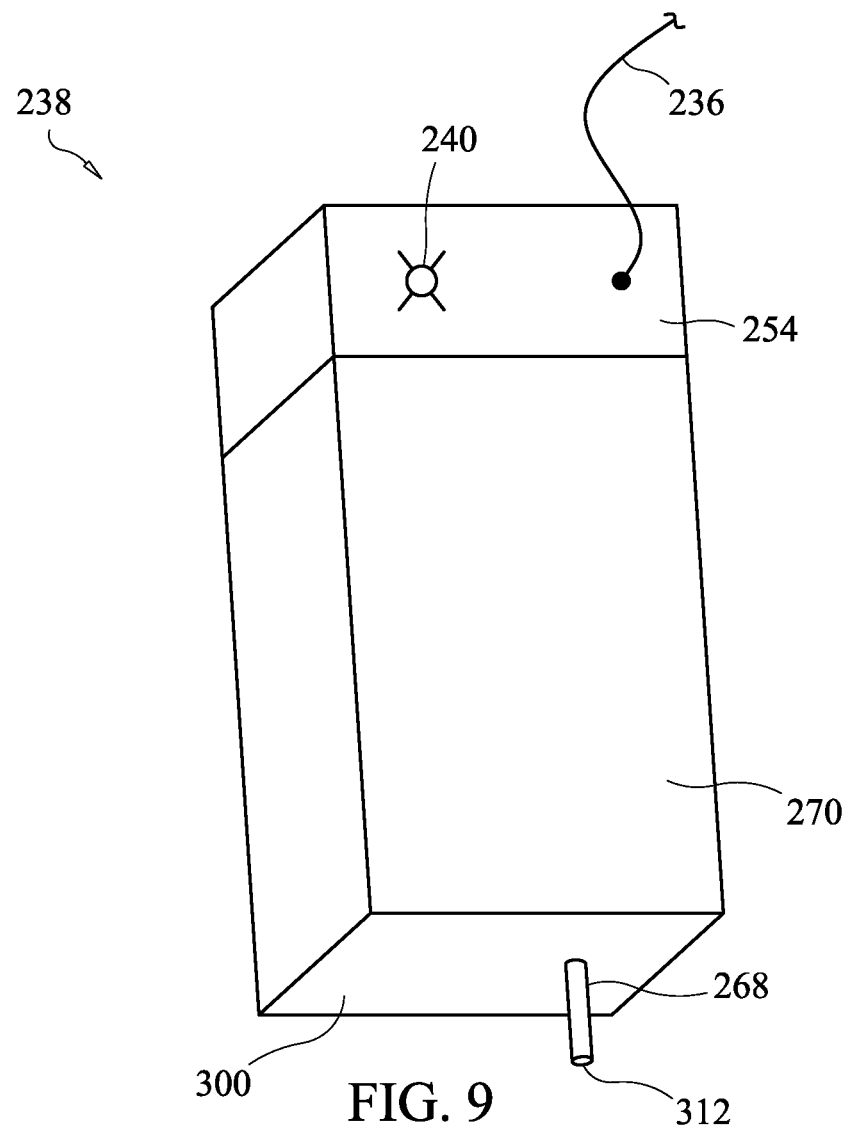
FIG. 9 is a perspective view of an alternate embodiment of the bucking bar of the invention.

Referring to FIG. 9, a perspective view of an alternate embodiment of bucking bar 238 is presented. A person having ordinary skill in the art will understand that the configuration presented in FIG. 7B may be modified in any way to adapt the described bucking bar 238 to specific riveting applications (this is the reason for multiple configurations of conventional bucking bars shown in FIGS. 1A-1D). However, it is acknowledged that, in some cases, riveting in extremely congested areas may limit the use of a preferred embodiment bucking bar 238. In these cases, use of the alternate embodiment of bucking bar 238 shown in FIG. 9 may be appropriate. The alternative embodiment of bucking bar 238 of FIG. 9 differs from the preferred embodiment of bucking bar 238 of FIG. 7B in that plunger 268 preferably comprises a stem (spindles feet 312) that extends through bucking hammer 270 and beyond anvil face 300. In this embodiment, cap 254 houses all other components previously described and those skilled in the art would appreciate design considerations needed for construction of the alternative embodiment, given the teachings of this disclosure. The alternative embodiment of bucking bar 238 shown in FIG. 9 is preferably functionally the same as the preferred embodiment of bucking bar 238 shown in FIG. 7B except that spindles feet 312 in the alternative embodiment do not shroud the rivet head, preventing bucking bar 238 from slipping off a forming rivet head. Alternately, FIG. 9 exhibits the end of a LVDT sensor protruding beyond the anvil face 300 of bucking bar 238. Use of a LVDT sensor demonstrates an alternative sensor technology that may be better suited for congested spaces and provides an analogue output signal that can be configured to detect the desired rivet head height for a plurality of rivet sizes. Those skilled in the art will understand that analogue sensors provide continuous measurement of distance or displacement between the work surface and the anvil face; also an analogue sensor serves as a first sensor when said distance is substantially equal to a desired rivet head height and also serves as a third sensor to measure a protruding shank length for determination of rivet size and corresponding desired rivet head height (this is discussed later).

Figure 10:
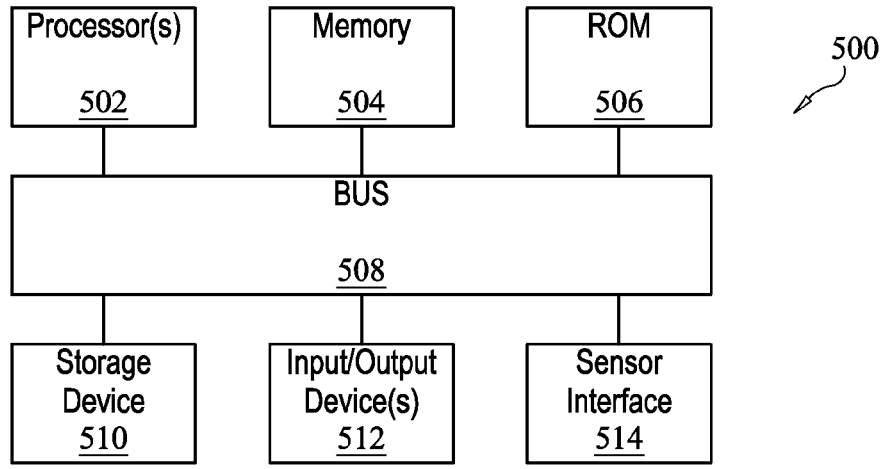
FIG. 10 is a schematic block diagram of a microprocessor in accordance with a preferred embodiment of the invention.

Referring to FIG. 10, a block diagram of a preferred embodiment of microprocessor 500 is presented. In this embodiment, microprocessor 500 comprises bus 508 or another communication device to communicate information, and processor 502 coupled to bus 508 to process information. While microprocessor 500 is illustrated in FIG. 10 as having a single processor, microprocessor 500 may include multiple processors and/or co-processors. Microprocessor 500 preferably further comprises random access memory (RAM) 504 and/or another dynamic storage device 510 (also referred to herein as memory 510), coupled to bus 508 to store information or instructions to be executed by processor 502. Random access memory 504 may also be provided to store temporary variables or other intermediate information during execution of instructions by processor 502.

Microprocessor 500 may also comprise read only memory 506 (ROM) and/or another static storage device coupled to bus 508 to store static information and instructions for processor 502. Data storage device 510 is preferably coupled to bus 508 to store information and instructions. Input/output device(s) 512 may include any device known in the art to provide input data to a microprocessor 500 system and/or receive output data from microprocessor 500 system.

In preferred embodiments, instructions are provided to memory 504 from a conventional storage device 510, such as a magnetic disk, Electrically Erasable Program Memory (EEPROM), read-only memory (ROM) 506 integrated circuit, CD-ROM, DVD, via a remote connection that is either wired or wireless, providing access to one or more electronically-accessible media, etc. In alternative embodiments, hard-wired circuitry can be used in place of or in combination with software instructions. Thus, means for execution of sequences of instructions in accordance with the invention are not limited to any specific combination of hardware circuitry and software instructions.

In a preferred embodiment, sensor interface 514 allows microprocessor 500 to communicate with one or more sensors within rivet fastening system 100. For example, sensor interface 514 may be configured to receive output signals from one or more switches that detect switch states of the components of rivet fastening system 100 as described herein. Sensor interface 514 may be, for example, an analog-to-digital converter that converts an analog voltage signal generated by a LVDT sensor to a multi-bit digital signal for use by processor 502.

In a preferred embodiment, processor 502 analyzes sensor input data and transmits signal to indicator lights, graphical user interfaces (GUIs) such as LCDs through input/output device(s) 512 to allow communication between operators or to allow operator calibration of bucking bar 238. Additionally, in an alternate embodiment, second multi-conductor cable 236 is replaced by wireless signals such as radio frequency or infrared. In this configuration, each of at least two microprocessors 500 may be coupled wirelessly such as with to radio frequency transceivers to communicate signals characterizing the state of the rivet driving process between the rivet gun operator and the bucker as described in this disclosure. Alternately other wireless communication means such as infrared may be used.

Processor(s) 502 may also cause system components to take other actions in response to signals from the sensors. For example, processor(s) 502 may use controller 904 to cause solenoid valve 112 to open or close thus enabling or disabling rivet gun 102. Microprocessor 500 may also be a microcomputer, a microcontroller, a computer, or logic circuits such as Transistor Transistor Logic (TTL) or Field Gate Programmable Array (FGPA).

Figure 11:
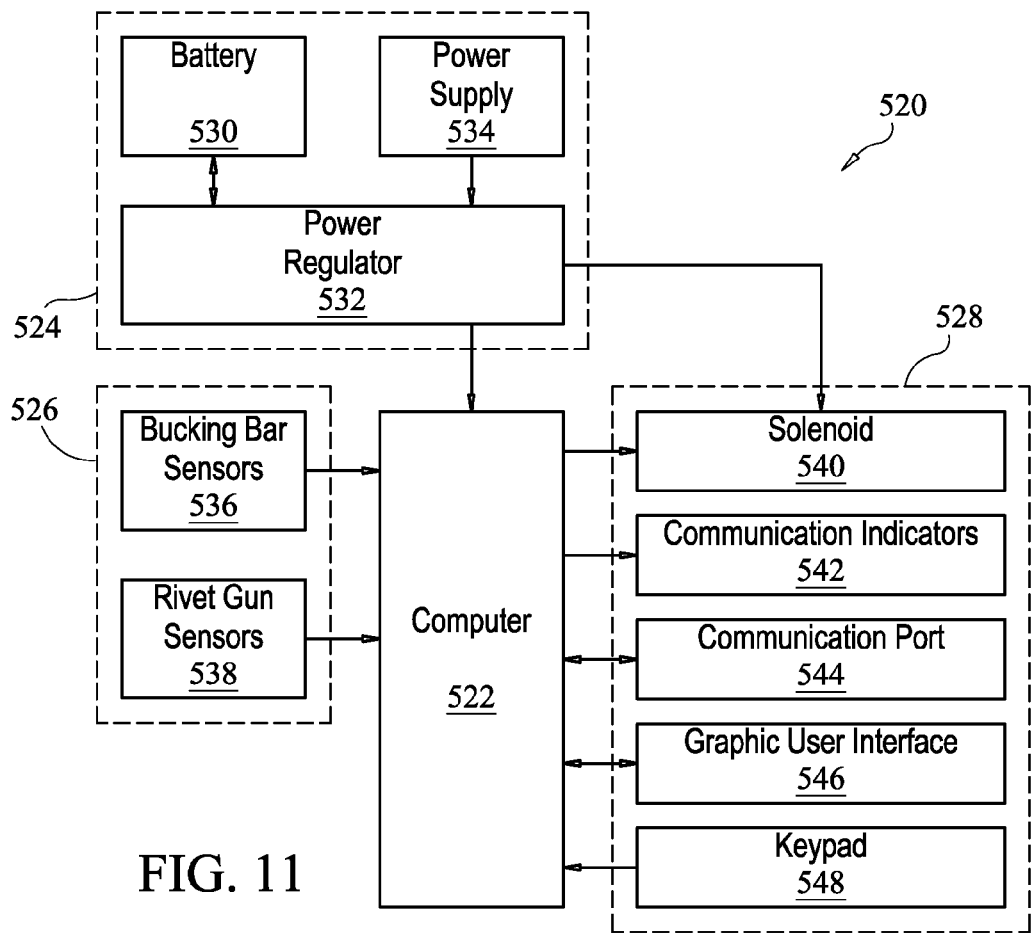
FIG. 11 is a schematic block diagram of a control system in accordance with a preferred embodiment of the invention comprising the microprocessor illustrated in FIG. 10 interconnected with microprocessor peripherals.

Referring to FIG. 11, a schematic block diagram of control system is presented. In this embodiment, control system 520 comprises microprocessor 500 or computer 522 as another representation of a microprocessor 500 for acquiring and processing data relating to the rivet driving cycle or process. In this alternate representation, additional equipment is provided although those skilled in the art will recognize functional equivalences of equipment portrayed in FIG. 10 and FIG. 11 to achieve a useful working system. Preferably, control system 520 includes power subsystem 524, sensor array subsystem 526, and control and communication subsystem 528. Power subsystem 524 preferably includes rechargeable battery 530 for powering control system 520, and power regulator 532 for power control and recharging battery 530. External power supply 534 may be used to supply charging power or optionally to replace the battery 530. Power from regulator 532 is supplied to microprocessor 500 and (optionally) to solenoid 540 and (optionally) may facilitate supplying power to other components of control system 520. Controller 904 (not shown) preferably lies between microprocessor 500 and solenoid 540; however by definition if microprocessor can source enough current to drive valve directly then controller 904 is considered to be part of microprocessor.

In this embodiment, sensor array subsystem 526 includes bucking bar sensors 536 and rivet gun sensors 538. Control and communication subsystem 528 preferably includes a pneumatic solenoid 540 also having a driver relay or controller, communication indicator(s) 542, such as LEDs and or LED light-bars, communication port 544 for down loading data logged recordings of set rivet head heights for process quality assurance/quality control purposes (which may optionally include at least one of radio frequency (RF) transmitter, receiver and transceiver), graphical user interface (GUI) 546 for operator interfacing with control system 520 and keypad 548 also for operator interfacing with control system 520.

In operation of preferred embodiments of the invention, data generated by each of the components of sensor array subsystem 526 are transmitted to microprocessor 500 where the data are processed and stored. Bucking bar system control commands are preferably then transmitted to control and communication subsystem 528 where solenoid operation is determined, communication of rivet cycle stage is indicated, user interface is achieved and data-logged rivet head setting data are transmitted to other media via a transceiver or by other means. Control system 520 is depicted with a microprocessor 500 although those skilled in the art will know that a microprocessor may be a microcontroller, a computer, or any arrangement of other digital logic equipment to achieve described system control.

Figure 12:
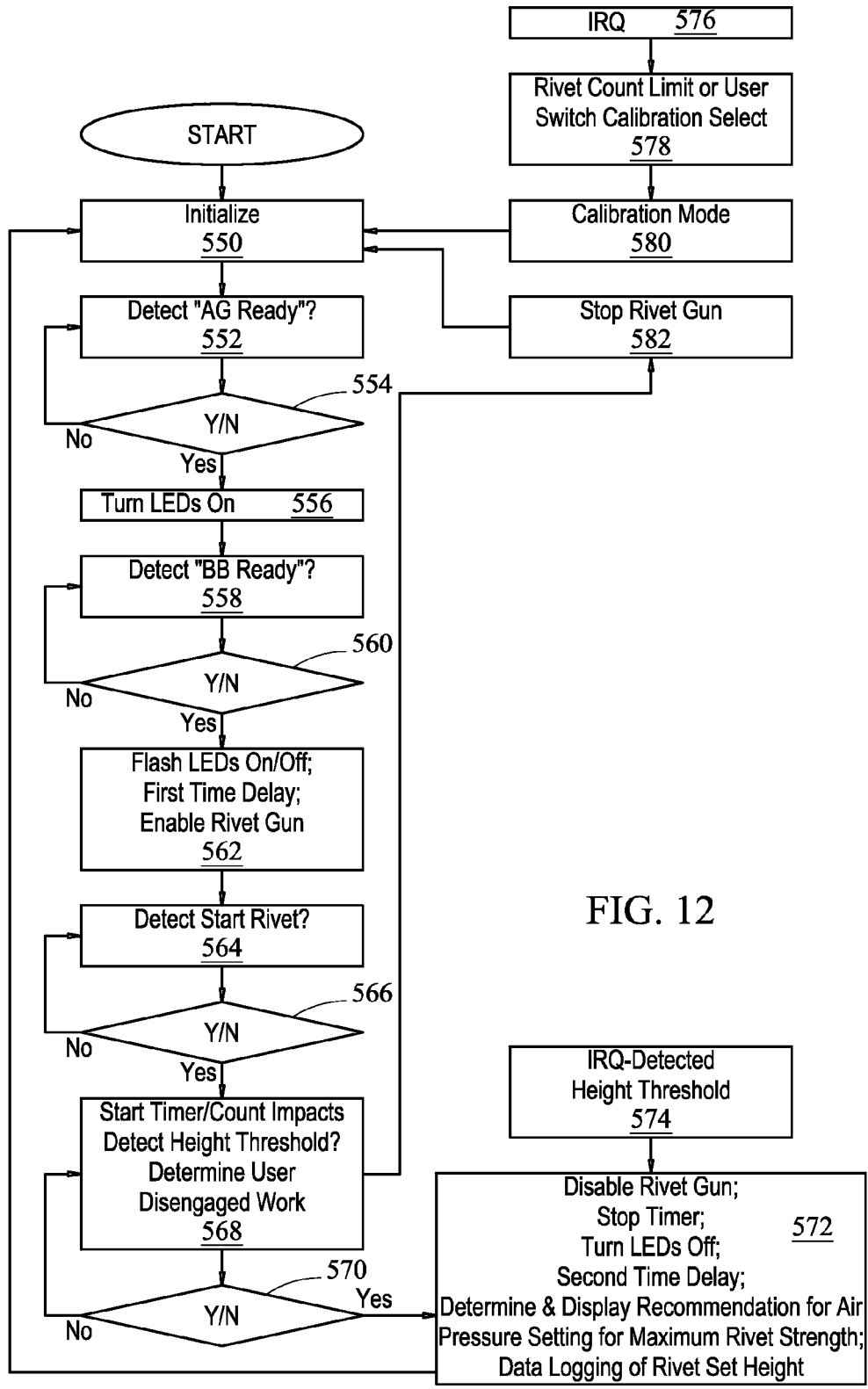
FIG. 12 is a schematic process flow diagram for a microprocessor program or software listing in accordance with a preferred embodiment of the invention.

Referring to FIG. 12, a schematic flow diagram of a preferred embodiment of bucking bar software instructions is presented. In this embodiment, because microprocessor 500 governs sequential riveting steps, when rivet fastening system 100 is started, microprocessor 500 immediately initializes system components in initialize step 550 by setting variables, inputs and outputs, and setting the solenoid to disable the rivet gun.

Next, in this embodiment, microprocessor 500 preferably waits for a received sensor signal to indicate that the rivet-gun operator is "ready" in detect "AG Ready" step 552; in gun ready conditional step 554 forces the sequencing process. Next, a rivet driving cycle is begun when microprocessor 500 detects an affirmative signal from gun ready conditional step 554; microprocessor 500 then responds by illuminating rivet gun operator and bucker indicator lights to turn LEDs on in step 556 to indicate to both operators that the rivet gun operator is ready to begin riveting.

Next, in this embodiment, microprocessor 500 waits for a received sensor signal to indicate that the bucker is "ready" in detect "BB Ready" step 558; bucker ready conditional step 560 forces the sequencing process. When microprocessor 500 detects an affirmative signal from bucker ready conditional step 560, it continuously flashes both indicator lights on-and-off, preferably starts an optional first time delay to provide the operators a final moment before riveting begins and then enables the rivet gun to initiate riveting step 562. The flashing lights indicate to both operators that the bucker is "ready" to begin riveting. In an alternate embodiment, microprocessor 500 may automatically start the rivet gun to eliminate the need for the rivet-gun operator to depress the rivet-gun trigger.

Next, in this embodiment, microprocessor 500 waits to receive a sensor signal to indicate that the riveting has begun in detect start rivet step 564; rivet start conditional step 566 forces the sequencing process. When an affirmative signal is detected in rivet start conditional step 566, microprocessor 500 starts a timer and counts the number of impact blows from rivet gun 102 while simultaneously waiting to receive a rivet head height threshold detection in start timer/count impacts step 568; detect height threshold conditional step 570 forces the sequencing process. A limit threshold sensor is preferably used to detect when the height of the rivet's desired set rivet head height 84 is reached in the driving process. Thus, while waiting for an affirmative detection signal in detect height threshold conditional step 570, microprocessor 500 counts the number of rivet-gun impacts by the number of toggled switch states of the bucking bar anvil face 300 contacting rivet shank end (upon each impact the bucking bar anvil face 300 is bounced off the rivet head forming a switching cycle; and in preferred embodiments microprocessor 500 "debounces" the signal to match the rivet-gun operating frequency). Debounced signals comprise a form of an impact sensor. Alternately, to detect rivet gun blows or impacts, an accelerometer may be used as another form of impact sensor.

Also incorporated in step 568 is an interrupt service request (IRQ) that activates if either the bucker or the rivet gun operator disengages the work during the rivet driving stage. The IRQ in step 568 stops the rivet gun in step 582 conducts a time delay, indicates an error via a LED signal and returns control to step 550. This is particularly important because if the bucker were to disengage the bucking bar from the rivet during the rivet driving stage, a damage event condition would be produced; in this case additional hammer blows from the rivet gun would then damage the work. The described bucker "ready" detection sensor is preferably used to detect bucking bar disengagement during the driving stage and preferably stop the rivet gun immediately to prevent any hammer blows to work that is not backed by the bucking bar. [More details of this feature are presented later].

In this embodiment, after detecting an affirmative signal in detect height threshold conditional step 570, then in step 572 microprocessor 500 disables rivet gun 102: stopping rivet gun 102, stops the timer started in start timer/count impacts step 568, turns off the indicator lights and starts a second user selectable time delay. The second time delay allows the rivet gun operator to remove rivet gun 102 from the work prior to start the next rivet cycle. Meanwhile to improve set rivet property, microprocessor 500 then preferably determines rivet strength according to set tolerance level and a material stress-strain curve using the previous setting time and/or number of hammer blows measured in start timer/count impacts step 568 and then displays recommended rivet gun air regulator setting modifications to the rivet gun operator who may then adjust the impacting force (regulated air pressure setting) supplied to rivet gun 102. In an alternate embodiment, microprocessor 500 makes rivet-gun air regulator setting changes automatically through feedback control of an electro-mechanical air regulator (not shown).

Finally, after the completion of the time delay set in end riveting step 572, the rivet driving cycle is completed and microprocessor 500 returns to initialize step 550, although display results generated in end riveting cycle step 572 are not cleared from the display until an affirmative signal is detected at ready gun conditional step 554 in the next rivet setting cycle. This allows the rivet gun operator additional time between rivet cycles to adjust rivet gun air regulator pressure settings. If at any time the desired set rivet head height threshold is detected, an interrupt service request in first interrupt service request step 574 forces operation to reset to end riveting cycle step 572. IRQ in step 574 serves as software redundancy to rivet head height detection in step 568.

Referring again to FIG. 12, still another interrupt service request (IRQ) is preferably provided in second interrupt service request step 576 upon detection of the user's toggling a switch to manually enter a calibration mode or, optionally, if the total number of rivets exceeds a predetermined number since the last time a calibration was conducted, a forced calibration is initiated in step 578 (control system 500 preferably counts the number of rivets driven by counting the number of rivet cycles in step 572). In calibration mode step 580, the user calibrates the bucking bar to set the rivet head height detection threshold to achieve setting rivets to a desired optimal tolerance. After calibration mode in step 580, operation is returned to step 550.

During the rivet driving stage, the loop circuit detecting contact between anvil face 300 and rivet shank end 70 exhibits a significant amount of switch chatter 371 (rapid opening and closing of contacts) indicative of extreme vibration and/or shock. However by coupling at least one of a hardware and a software low-pass filter to "debounce" the signal for this circuit, the rivet gun hammering cycle can be identified. This information may be then used to automatically determine if the bucker inadvertently disengaged bucking bar 238 anvil face 300 from rivet shank 70 during the rivet driving stage and would then produce a software interrupt service request to immediately stop the rivet gun. Bucking bar removal from work during the rivet driving stage can be detected automatically regardless of the many variables presented earlier (such as variations in bucking bar mass, rivet gun mass, applied user forces, air regulator settings, etc.). The benefit of detecting bar disengagement during the driving stage is protection to the work from hammering on work that is not backed by a bucking bar. In this case bucking bar disengagement or removal is defined as removing the bucking bar anvil face 300 from rivet shank 70 to stop backing the rivet; it is not a result of anvil face 300 being momentarily "bucked" off the shank 70 as a result of the normal rivet driving stage cycle.

Furthermore, while adding a dampener to the rivet plunger system was considered by the applicant as a way to further stabilize the bucking bar, users prefer a bucking bar that allows them to "feel" the work. However, adding a dampener in an alternate embodiment is envisioned by the applicant.

In summary, a low pass filter can be used to "debounce" signals to accommodate for mechanical and/or electrical bouncing of the bucking bar anvil face 300 on the forming rivet head. These data may be used to prevent inadvertent damage to the work by hammering on unbacked work by disabling the rivet gun, if either operator disengages their tool from the work during the rivet driving stage. Premature tool disengagement during a rivet driving stage is a damage event condition. Optionally, by determining the hammer period and identifying each falling-edge-signal, system 100 may determine that the anvil face 300 is in contact with rivet shank end 70 just before the rivet gun "hammers" again (or just before a few milliseconds more than it takes to disengage the rivet gun before the next "hammer" commences).

Figure 13:
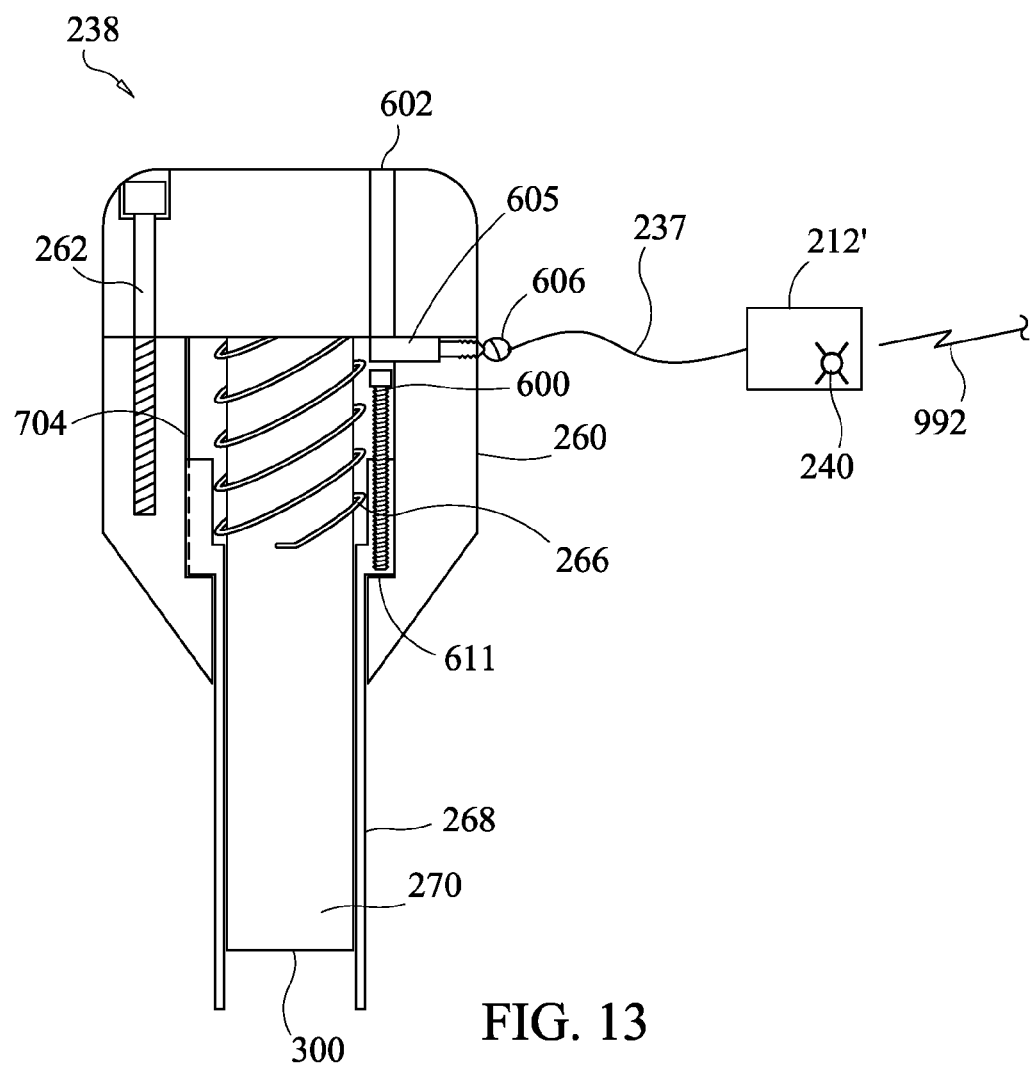
FIG. 13 is a cross-sectional view of yet another alternate embodiment of a bucking bar in accordance with the invention.

Referring to FIG. 13, a partial cross-sectional view of still another alternate embodiment of bucking bar 238 is presented to further illustrate another possible configuration. This embodiment combines a cap portion and an anvil portion to form hammer 270 having a reduced diameter anvil face 300. Compression spring 266 applies force to plunger 268 which is retained by housing 260 at housing shoulder 611. Plunger 268 is guided by a groove, key or axially-positioned tab 704 in housing 260 restricting plunger motion to axial travel. Housing 260 is secured to hammer 270 by a plurality of housing bolt fasteners 262.

In this embodiment, a slotted photo switch 605 is a first sensor and is preferably retained in a cavity in housing 260 by the shape of said cavity or by adhesive. Cap screw 600 is threadedly engaged with threaded plunger 268 as shown to allow axial micro-positioning and adjustment of photo switch 605 operation during calibration process by adjusting cap screw 600 (discussed later). Photo switch 605 toggles switch state when interrupted by the head of cap screw 600. Thus cap screw 600 serves as a mechanical flag to interrupt photo switch 605. Access port 602 allows the user to adjust by rotation of cap screw 600 either clockwise or counter-clockwise to axially position cap screw 600 to a desired location.

Upon assembly of this embodiment of bucking bar 238, slotted photo switch 605 is secured to housing 260 with photo switch 605 connected to multi-conductor cable 237 with cable being secured by strain relief device 606 which is preferably threadedly attached with body of housing 260 to support multi-conductor cable 237. Next, compression spring 266, plunger 268 (with pre-installed cap screw 600) and housing 260 are sequentially installed. These components are all held by housing 260 and housing 260 is then affixed to cap end of hammer 270 by housing bolt fasteners 262. A plurality of bolt fasteners 262 are threadedly engaged with the body of housing 260. Multi-conductor cable 237 is coupled to bucker control circuit board 212' upon which is mounted bucking bar indicator LED light 240. Bucker control circuit board 212' preferably communicates with rivet gun control circuit board 212 via radio frequency signals 992. Bucker control circuit board 212' may be affixed to the bucker's wrist by means of a Velcro® fastener, affixed to bucking bar 238 or integrated into bucking bar 238.

In operation, the bucker calibrates bucker bar 238 by setting plunger 268 spindles feet to desired set rivet head height 84 relative to anvil face 300 and then adjusting cap screw 600 until photo switch 605 toggles; a successful calibration is indicated by threshold illumination of bucking bar indicator LED light 240. It is noted in this configuration that during calibration a cap screw adjustment tool (not shown in FIG. 13) will give a false detection indication at LED 240 and therefore the adjustment tool must be repeatedly removed from slot 602 after having made fine adjustments to the cap screw 600 axial position until the desired set rivet head height 84 is detected by the interruption of photo switch 605 by head of cap screw 600.

Figure 14:
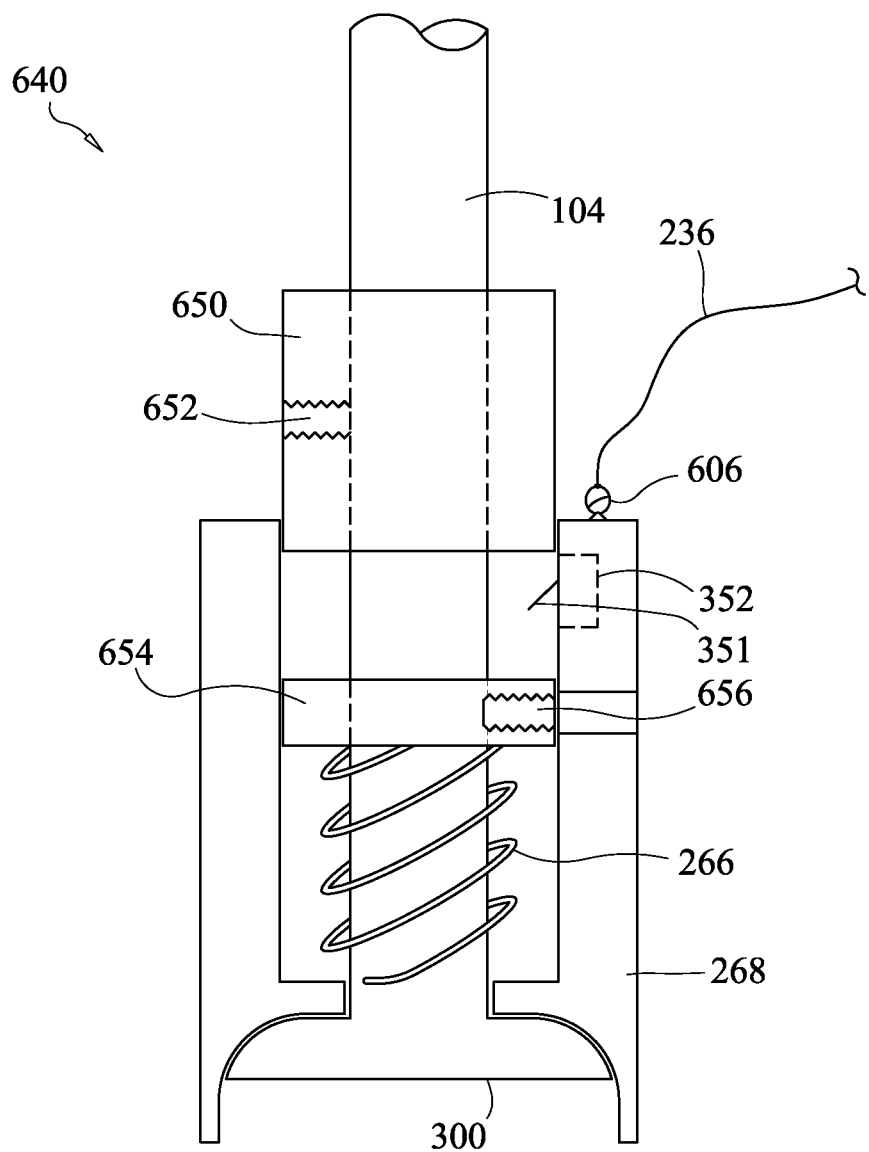
FIG. 14 is a cross-sectional view of yet another alternate embodiment of the invention by applying the electromechanical components previously illustrated in FIGS. 7A and 7B.

Referring to FIG. 14, a partial cross-sectional view of still another alternate embodiment of the invention is presented. In this alternate embodiment, the teachings of this invention are applied to the rivet set tool for use in backriveting. Those skilled in the art will recognize that the provided teachings of both bucking bar and rivet set tool systems are similar in functional design and operational practice to produce the same desired results. There is no functional difference between a rivet that has been forward set vs. a rivet that has been backset; in some cases it is the operator's choice to select the rivet-setting tool used based on working-space restrictions and in other cases it only user preference. Consequently, means and method of operation for the set tool in FIG. 14 is similar to bucking bar tools and vice versa. Backriveting system 640 is preferably used in situations where a conventional bucking bar is placed over the manufactured head of flush rivet 64 or of universal head rivet 62 (preferably with a concave cup shape ground into the anvil face of the bucking bar to accommodate the universal head rivet 62 shape) and the rivet gun set tool is used to form driven rivet head 86.

In this embodiment, backriveting system 640 comprises rivet set tool 104 having anvil face 300. Compression spring 266 is retained by internal collar 654 and setscrew 656. Compression spring 266 applies force to plunger 268. An access port through plunger 268 allows setscrew 656 to be tightened into a recess in set tool 104. Set screw 656 is threadedly engaged with collar 654. Embedded in plunger 268 is first sensor microswitch 352 having switch lever arm 351 which actuates on the shoulder of external collar 650 which is secured to set tool 104 by external setscrew 652. Set screw 652 is threadedly engaged with collar 650.

During assembly, plunger 268, compression spring 266 and collars 654 and 650 are slid onto set tool 104. External collar 650 is used to position internal collar 654 and compress spring 266 until internal setscrew 656 is fastened. This secures plunger 268 on set tool 104. Next, plunger 268 is positioned to desired set rivet head height 84 and external collar 650 is then positioned such that it just toggles switch lever arm 351 when external collar 650 is secured to set tool 104 with external setscrew 652. Actuation of microswitch 351 is indicated by illumination of an LED and/or solenoid closure that is not shown on FIG. 14 when gap height 314 or the distance between spindles feet (resting on work surface) and anvil face 300 achieve a desired driven rivet head height 84. It is further noted that although a small timing delay may be preferred, system 640 may alternately be used in wireless (RF) applications as a detector for detecting when the set tool contacts a manufactured head to detect (by toggling switch 351 with a small motion of plunger 268) when the rivet gun operator is "ready" to begin riveting. (This is another example of how one could eliminate the need for conducting wires 220 and 226 shown in FIG. 8; more examples will be shown later).

Figure 15:
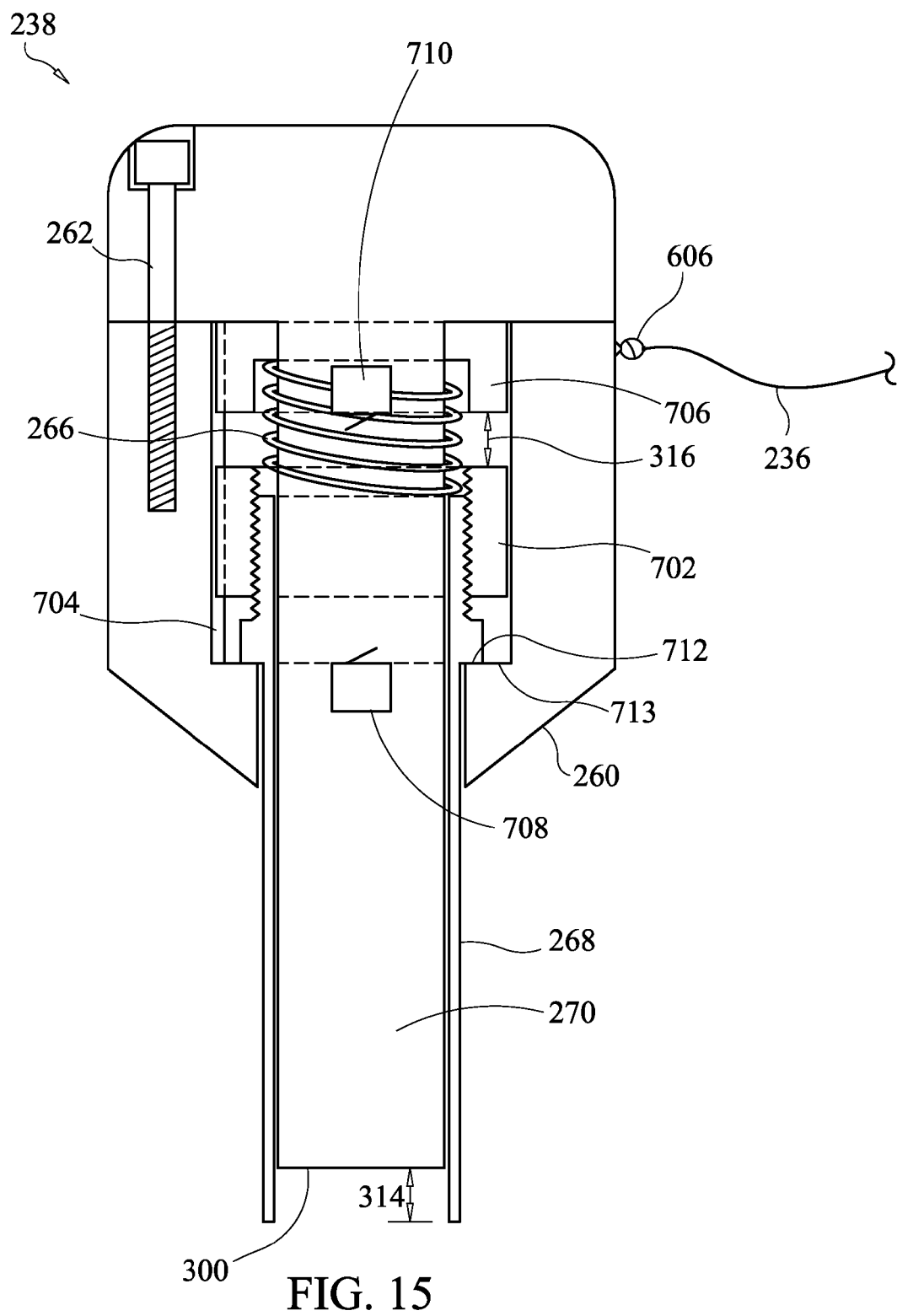
FIG. 15 is a cross-sectional view of still another alternate embodiment of the bucking bar illustrated in FIGS. 7A and 7B.

Referring to FIG. 15, a partial cross-sectional view of still another alternate embodiment of the invention is presented. In this embodiment, bucking bar 238 comprises a micro adjustable system (operated by manual rotation of plunger 268) and further comprises first switch 708 to detect the initial motion of plunger 268 for the purpose of detecting when the bucker is ready. This embodiment is particularly useful in a wireless system such as RF (which could replace multi-conductor cable 236) in which circuit closure cannot be detected by means of a circuit on the rivet gun side. It should be noted that the embodiment in FIG. 15 could be further simplified by removing collar 706 and embedding second switch 710 (a first sensor) into sidewall of housing 260 or embedding second switch 710 into cap end of hammer while maintaining the same functionality.

Similar to the embodiment shown in FIG. 13, the embodiment of bucking bar 238 shown in FIG. 15 combines the cap and anvil to form hammer 270 having a reduced-diameter anvil face 300. Compression spring 266 applies force to plunger 268 which is retained by housing 260. Housing 260 is secured to hammer 270 by a plurality of housing bolt fasteners 262. Compression spring 266 may be any type of load source.

In this embodiment, plunger 268 is preferably retained in housing 260 by the shoulder of plunger collar 712 on shoulder of housing 713 while plunger 268 is threadedly engaged with threaded traveling nut 702. Threaded traveling nut 702 is preferably guided by a groove, key or axially-positioned tab 704 in housing 260. Tab 704 thus prevents rotational motion of threaded traveling nut 702, thereby restricting traveling nut 702 to axial movements. This configuration allows the user to rotate plunger 268 clockwise or counterclockwise relative to housing 260 by grasping it at its exposed end (near anvil face 300), to position threaded traveling nut 702 within housing 260 cavity. The threaded engagement between plunger 268 and threaded traveling nut 702 provides sufficient friction to prevent inadvertent rotation of plunger 268 and guide marks (not shown) on the outside of plunger 268 may be aligned with similar guide marks (also not shown) on the outside of housing 260 for position referencing of threaded traveling nut 702. (All threaded engagements described in this disclosure are preferably provided with sufficient friction to prevention inadvertent or unintended movement or rotation.)

In this embodiment, first embedded switch 708 is embedded in housing 260 and when plunger 268 is not deflected by first distance 314, the shoulder of plunger collar 712 holds the switch actuation lever down due to the force exerted by compression spring 266. Thus, with only a slight axial movement of plunger 268, a switch state change is detected at first embedded switch 708 as collar 712 of plunger 268 moves off of the switch actuation lever. This detection feature, combined with a small timing delay in a microprocessor, may be used to detect when the bucker has indicated that he is "ready" to begin bucking. Also as previously indicated when discussing FIG. 8, an alternate embodiment for detecting when the bucker has indicated that he is "ready" to begin bucking by detecting a sourced current from power supply of circuit board 212 to electrical ground via bucking bar anvil face 300 contacts the rivet shank end 70, rivet 68, a first or a second work piece (72 or 73) to a ground (not shown in FIG. 15) sharing the same electrical ground potential as the power supply. Although not limiting, those skilled in the art will recognize an optical photo coupler integrated circuit provides an example means to detect a sourced current to ground and may be used to detect any anvil face contact with a rivet or any spindles foot contact with a work surface (described later). The purpose of demonstrating use of alternate embodiment from FIG. 8 in FIG. 15 is to further demonstrate that the teachings of the invention can be modified in a number of respects by a person skilled in the art to produce a multiplicity of embodiments of the invention, all without departing from the concept. In this embodiment, second embedded switch 710 is embedded into cylindrically-shaped switch housing collar 706. Compression spring 266 fits into a recess in switch housing collar 706 and securely maintains switch housing collar 706 firmly against the cap of hammer 270. Collar 706 is also engaged with tab 704 to prevent collar 706 rotation relative to hammer 270 shaft. Second switch 710 is also located near the outside diameter of switch housing collar 706. In this configuration, displacement of plunger 268 by distance 314 is translated into distance 316 by the shoulder of threaded traveling nut 702, but threaded traveling nut 702 is limited in travel by contact with switch housing collar 706. However, slightly before threaded traveling nut 702 abuts the shoulder of switch housing collar 706, the shoulder threaded traveling nut 702 actuates the switch lever of second embedded switch 710, resulting in a switch state change. This switch state change is detected at second embedded switch 710 and indicates that the desired set rivet head height 84 has been achieved.

It is noted that a second compression spring (not shown) could be affixed to second embedded switch 710 to allow plunger 268 to move distance 314, causing the end of traveling nut 702 to press against second switch 710 and thereby causing the state of switch 710 to toggle. Should traveling nut 702 rapidly impact against second switch 710, the second compression spring would then compress allowing second switch 710 to recess into a receiving slot in switch housing collar 706, thereby protecting second switch 710. Furthermore, plunger travel 314 is allowed to travel until flush with (and preferably slightly beyond) anvil face 300 before limiting the travel of the shoulder of threaded traveling nut 702 at switch housing collar 706. This embodiment would serve to protect the spindles feet end of plunger 268 from damage if the tool were to be accidentally dropped, and to protect damage to the engaged threads of plunger 268 and traveling nut 702 and to protect second switch 710 from possible crushing damage from the traveling nut 702. Wires extending from first and switches 708 and 710; respectively, to second multi-conductor cable 236 are not shown in FIG. 15 for the purposes of clarity. Furthermore, from these teachings, it should be understood that second switch 710 could also be embedded into the cavity sidewall of housing 260 while still being operative by traveling nut 702, thereby simplifying the design.

Figure 16:
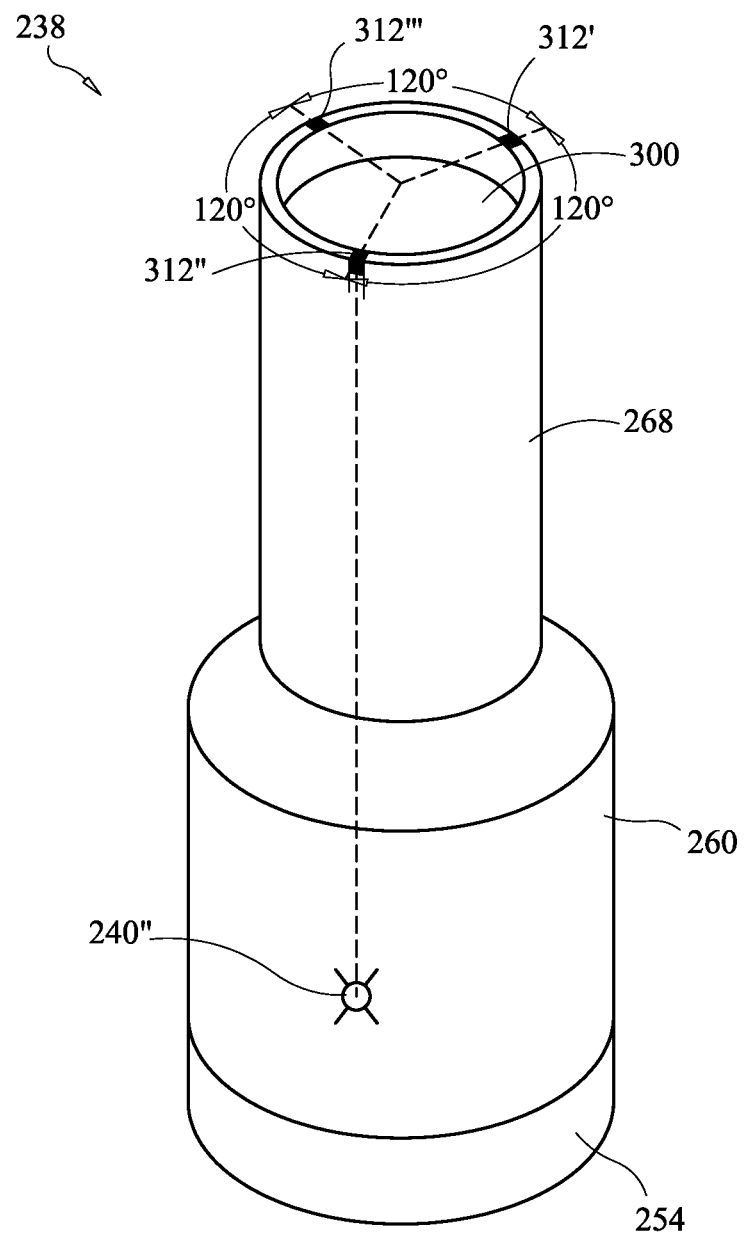
FIG. 16 is a perspective view of still another embodiment of the bucking bar illustrated in FIGS. 7A and 7B and serves to illustrate electrical contact points on the spindles feet.

Referring to FIG. 16, a perspective view of still another alternate embodiment of bucking bar 238 is presented. In this view, spindles feet 312 and anvil face 300 are shown. In this alternate embodiment, spindles feet electrical conducting contact points (first contact point 312', second contact point 312" and third contact point 312''') are located as shown 120-degrees apart. When bucking bar 238 is oriented orthogonal to second work piece 73, said contact points communicate with second facing surface 76 (work surface). To ensure positive communicative contact with work, contact points 312', 312", and 312''' become the spindles feet 312 and may be slightly raised or protrude above the spindles feet 312 surface (cylinder plane formed by end of plunger 268). Each contact point is wired to a second microprocessor (conducting wires and second microprocessor are not shown in FIG. 16 for purposes of clarity). Coupled with microprocessor software, the contact points 312', 312", and 312''' constitute at least one loop circuit and form at least one fourth sensor to detect when spindles feet 312 is in planar contact or near planar contact with second facing surface 76 (i.e., when bucking bar 238 is orthogonal or nearly orthogonal to second facing surface 76; second facing surface 76 is a work surface). By definition, the distal end of plunger 268 may be spindles feet 312 or any contact point, e.g., first contact point 312'.

In a first configuration, operation of the bucking bar embodiment of FIG. 16 is understood by referring back to FIG. 8: When used in bucking bar system 100, using multi-conductor cable 236, at least one of said contact points is wired to an input channel of a microprocessor on circuit board 212 and at least one of said contact points is wired to an output channel of a microprocessor on circuit board 212. When bucking bar 238 is orthogonally or about orthogonally positioned with spindles feet 312 and said contact points rest against second facing surface 76, at least one additional loop circuits (fourth sensor) are formed. Those skilled in the art will recognize a plurality of possible circuit paths for sensing spindles feet contact with work surface. One circuit path is from circuit board 212 to work surface via wire 220 or 226 and then to spindles feet via work surface. Another circuit path is from to one of the spindles feet and conducted across work surface to at least one of the other spindles feet. Still another circuit path is from an anvil face to a spindles feet via a rivet and work surface.

In a second configuration, the bucking bar embodiment of FIG. 16 is used in a wireless application. In a wireless application, a second circuit board 212' (not shown) is located on or near bucking bar 238 and preferably having RF transceiver for communication with a first circuit board 212 (also not shown). Each of contact points 312', 312", and 312''' is each independently wired to its own input channel to the second microprocessor. In this second configuration, the correct orthogonal position of bucking bar 238 is detected by testing continuity loops formed between contact points 312', 312", and 312''' using contact with second facing surface 76 to close the loop circuits. In a first example, continuity is tested between contact points 312' and 312", and then in near-real-time tested between contact points 312" and 312'''. This forms a three-point plane test to determine if orthogonal positioning has been achieved. In a second example, power is supplied from the second circuit board to contact point 312' and is detected through the work at contacts 312" and 312''' to determine if orthogonal positioning has been achieved. (Note: Both first and second configuration examples may also be used to replace switch 708 in FIG. 15 to detect when the bucker is "ready" since power supplied at any of the contact points 312', 312", or 312''' may be used to form a circuit path by contacting anvil face 300 with rivet shank end 70 via a wire affixed to conducting post 256, for example. Another way is to detect continuity across at least two of said contact points as a test condition for rivet tool operation. Furthermore, failure of this condition could automatically cease rivet driving and produce a tool alignment error indicated to operators by a unique LED flashing pattern).

This alternate embodiment may optionally also include three indicating LEDs [first indicating LED (not shown), second indicating LED 240" and third indicating LED (not shown)] similarly located 120-degrees about housing 260 or cap 254. This is illustrated in FIG. 16 by LED 240" located in the same axial plane as second contact point 312". Thus, depending on whether the first or second configuration described above is used, the second microprocessor can identify during the rivet driving stage which contact point(s) are not in communication with second facing surface 76 and illuminate at least one LED to indicate to the bucker a suggested appropriate bucking bar 238 positioning corrective action. This provides a user with a tool alignment aid. For example, if contact points 312' and 312''' are detected but contact point 312" is not detected, the microprocessor illuminates or flashes second indicating LED 240″ to indicate to the bucker to tip bucking bar 238 towards illuminated second indicating LED 240″. Then, after the bucker has made the appropriate bar 238 positioning correction, the microprocessor stops illumination of second indicating LED 240″. It is understood that the indicating LEDs may also be used to illuminate the work while still serving to indicate bar 238 alignment corrections to the bucker. In such a case, turning the indicating LED lights off or flashing lights may be used as a tool alignment aid to indicate to the bucker a direction of bucking bar 238 correction movement to achieve orthogonal alignment.

A person having ordinary skill in the art would understood that although in the illustrated embodiments three contact points are used to detect tool alignment (in that three-points define a plane), due to the geometry of spindles feet 312, two points and potentially only one point may also be used to achieve the same result. Also, more than said three contact points may also be used to achieve the same result.

A person having ordinary skill in the art would also understand that although electrical contact points are illustrated, any contact detection sensor, device or devices, such as a plurality of switches appropriately positioned about the spindles feet 312 could also be used without deviating from the concept of this alternate embodiment. In another example, using these teachings, three or more LVDT sensors may be used to determine alignment of anvil face 300 plane to the work surface plane, allowing the microprocessor to provide LED indication to the bucker to make small tool alignment corrections to the position of bar 238 to achieve acceptable orthogonal alignment or to allow the microprocessor to momentarily disable the rivet gun if bucking bar 238 alignment is outside an acceptable range (this is another form of damage event condition). LVDT sensors may be incorporated into spindles feet 312 or extend through anvil face 300 as shown in FIG. 9. A person having ordinary skill in the art would also understand that the teaching of this alternate embodiment may be applied to the spindles feet of any embodiment of this invention such as spindles feet on plunger 268 shown in FIG. 14.

To summarize FIG. 16, in this embodiment, means are provided for achieving and maintaining parallel planar alignment of anvil face 300 with the work to ensure that rivet shank 68 is driven axially. Additionally, alternate means for detecting when the bucker is "ready" are also provided. Furthermore, means for correcting tool misalignment relative to work surface (via LED light indication) during the rivet driving stage is provided or, optionally, to prevent prior art misshaped set rivets the rivet driving stage may be interrupted by momentarily disabling the rivet gun when unacceptable tool misalignment is detected. Finally, those skilled in the art will recognize that any time a rivet driving stage begins, but ends prematurely, and not as a result of achieving a desired rivet head height, a fault event is created and users are so notified via LED indicators. A fault event is usually a damage event condition but could also result from a rivet gun operator prematurely disengaging the gun trigger before the rivet is fully set (as detected by a first sensor and automatically ceasing riveting). A fault event indicator informs the users to return the unfinished rivet and recommence a rivet driving stage until a first sensor detects that the driven rivet head height substantially matches a desired rivet head height.

Figure 17:
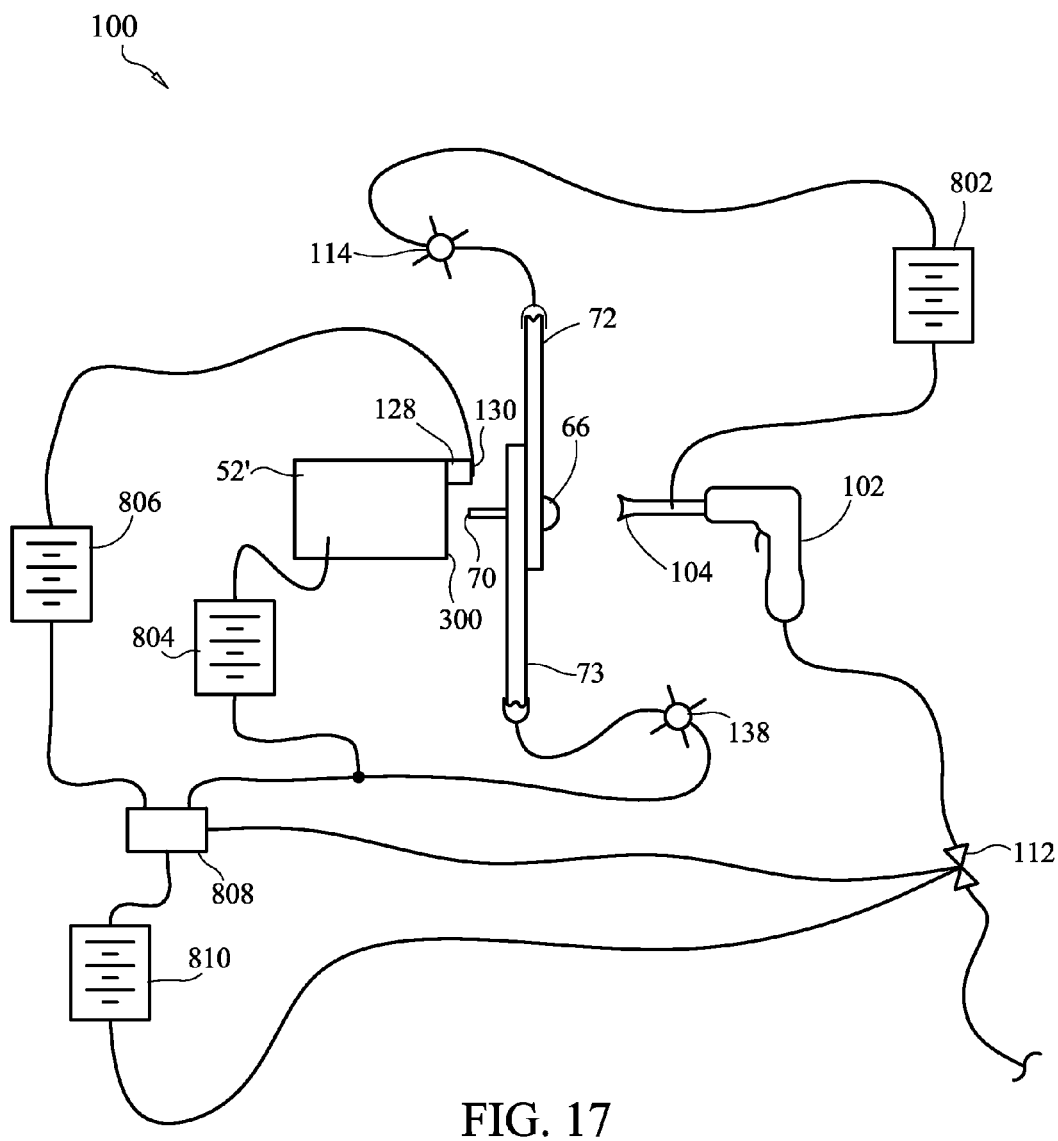
FIG. 17 is a schematic block diagram of yet another simplified embodiment of rivet system illustrated in FIG. 5.

Referring to FIG. 17, a schematic diagram of another relatively simple embodiment of the invention (similar to that shown previously in FIG. 5A) is presented. Although the embodiment illustrated in FIG. 17 is not the most preferred embodiment of the invention, it is used to simplify and teach the invention. In this embodiment, bucking bar system 100 comprises first battery 802 which is coupled to rivet set tool 104 of rivet gun 102. When the rivet gun operator contacts rivet tool 104 against rivet manufactured head 66, a first loop circuit (forming a second sensor) is made via first LED indicating light 114 (which may also be a work illuminating LED) to indicate to the bucker that the rivet gun operator is ready to start riveting.

Second battery 804 is also coupled to augmented bucking bar 52' at a first end and to second work piece 73 at a second end with fourth LED indicator light 138 disposed inline. When the bucker contacts augmented bucking bar 52' against rivet shank end 70, a second loop circuit (forming another second sensor) is made through second work piece 73, illuminating fourth LED indicator light 138 to indicate to the rivet gun operator that the bucker is ready to start riveting. Seeing fourth LED indicator light 138 illuminate, the rivet gun operator then begins riveting.

Next, similar to the situation described in FIG. 5A, when the desired set rivet head height 84 is obtained, a third loop circuit is formed from battery 806 through contact 130 (forming a first sensor) and work and relay 808, thereby actuating relay 808. When relay 808 is actuated, power from battery 810 is supplied to solenoid valve 112, momentarily disabling the rivet gun power source (air supply). This signals the rivet gun operator to discontinue riveting and both operators then move to then next rivet.

In the embodiment shown in FIG. 17, solenoid valve 112 comprises a two-port valve coupled inline between the air supply and rivet gun 102. In this embodiment, the first valve port is coupled to the air supply and the second valve port is coupled to rivet gun 102. In an alternate embodiment, solenoid valve 112 is a three-port valve likewise coupled between the air supply and rivet gun 102. The first valve port is coupled to the air supply and the second valve port is coupled to rivet gun 102. The third valve port is coupled to the ambient atmosphere. In operation, when rivet gun 102 is energized, the three-port valve allows air to pass from the air supply to rivet gun 102 (from the first port through to the second port) while the third valve port is closed. When rivet gun 102 is de-energized, the three-port valve disconnects the air supply while simultaneously allowing backpressure from rivet gun 102 to be exhausted to the ambient air (from the second port through to the third port). In this embodiment, the three-port valve serves to rapidly de-energize rivet gun 102 by venting backpressure to the atmosphere and to prevent residual rivet gun hammer blows when solenoid valve 112 decouples rivet gun 102 from the air supply.

Figure 18:
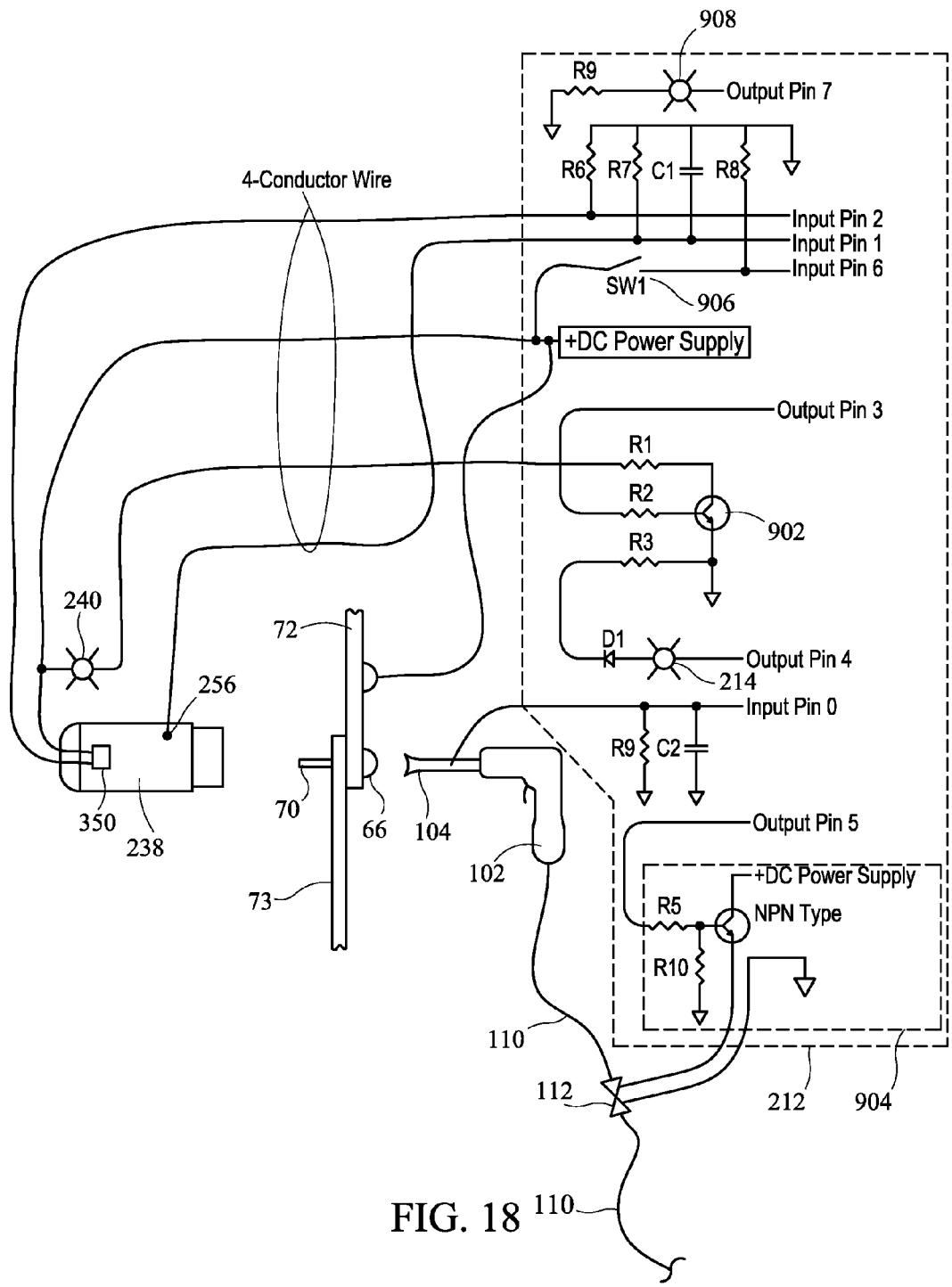
FIG. 18 is a simplified schematic block diagram of yet another simplified embodiment of rivet system.

Referring to FIG. 18, a wiring schematic diagram is presented that is consistent with software instructions in accordance with a preferred embodiment of the invention. These instructions were written and tested using a Basic Stamp 2 microprocessor; in a production embodiment, use of an Atmel tiny microprocessor with programming in the C language is preferred.

In this embodiment, circuit board 212 illustrates in schematic view a preferred wiring diagram for operation of rivet fastening system 100. Circuit board 212 supplies power to the work piece and to bucking bar 238 as shown. This allows contact detection at Input-Pin0 (second sensor) when rivet set tool 104 contacts first work piece 72 or rivet manufactured head 66. Similarly, contact of anvil face 300 (not shown in FIG. 18) of bucking bar 238 with rivet is detected at Input-Pin1 (another second sensor). In this schematic configuration switch 350 is Normally Open. Switch 350 is a first sensor and actuates when the rivet has been set; this is detected at Input-Pin2.

Further referring to FIG. 18, Output-Pin3 preferably controls the status of bucking bar indicator LED light 240 using a NPN type transistor 902. Output-Pin4 controls the status of mounted LED indicator light 214. Bucking bar indicator LED light 240 and mounted LED indicator light 214 serve to communicate the stage of rivet setting during each rivet setting cycle to bucker and rivet gun operator; respectively. Finally Output-Pin5 is used to control the on or off status of solenoid valve 112 via controller 904. Any type of solenoid driver, valve driver, driver or controller 904 may be used: examples include a relay, a Field Effect Transistor, a 555 Integrated Circuit, a NPN or PNP transistor, or the microprocessor 500. This equipment lists many types of controller examples and should not be considered limiting; a controller 904 is operative to enable and disable a rivet driver and said controller 904 is preferably operated by a microprocessor. Therefore a signal from microprocessor is sent to a controller 904 to cause actuation and enable or disable the rivet driver. Also, the solenoid may be driven directly by microprocessor OutputPin5. In this embodiment, the closing of user activated switch 906 is detected at Input-Pin6 to manually place the system into a calibration mode. Additionally, calibration mode LED 908 illuminates when system 100 is in the calibration mode via Output-Pin7 to so inform the users. Other Output Pins (not shown) may be used with other LEDs to direct the user to make clockwise or counterclockwise directional adjustments of positioning jackscrew 252 during calibration.

A person having ordinary skill in the art would understand that there are numerous alternative structural embodiments and alternative microprocessor instructions that could be used to achieve the teaching of this invention. Also, numerous components on circuit 212 have been omitted for purposes of clarity. Furthermore, it is also understood that if rivet fastening non-electrically-conductive work pieces such as plastic or carbon fiber is called for, schematic system 100, as well as its associated microprocessor listing, could be easily modified to maintain operator "ready" indicating status using teachings such as those presented in FIG. 14 (that shows how a switch system may be used to detect when set tool 104 contacts the work piece) as well as those presented in FIG. 15 (that shows how switch 708 may be used to detect when plunger 268 contacts the work piece).

Figure 19:
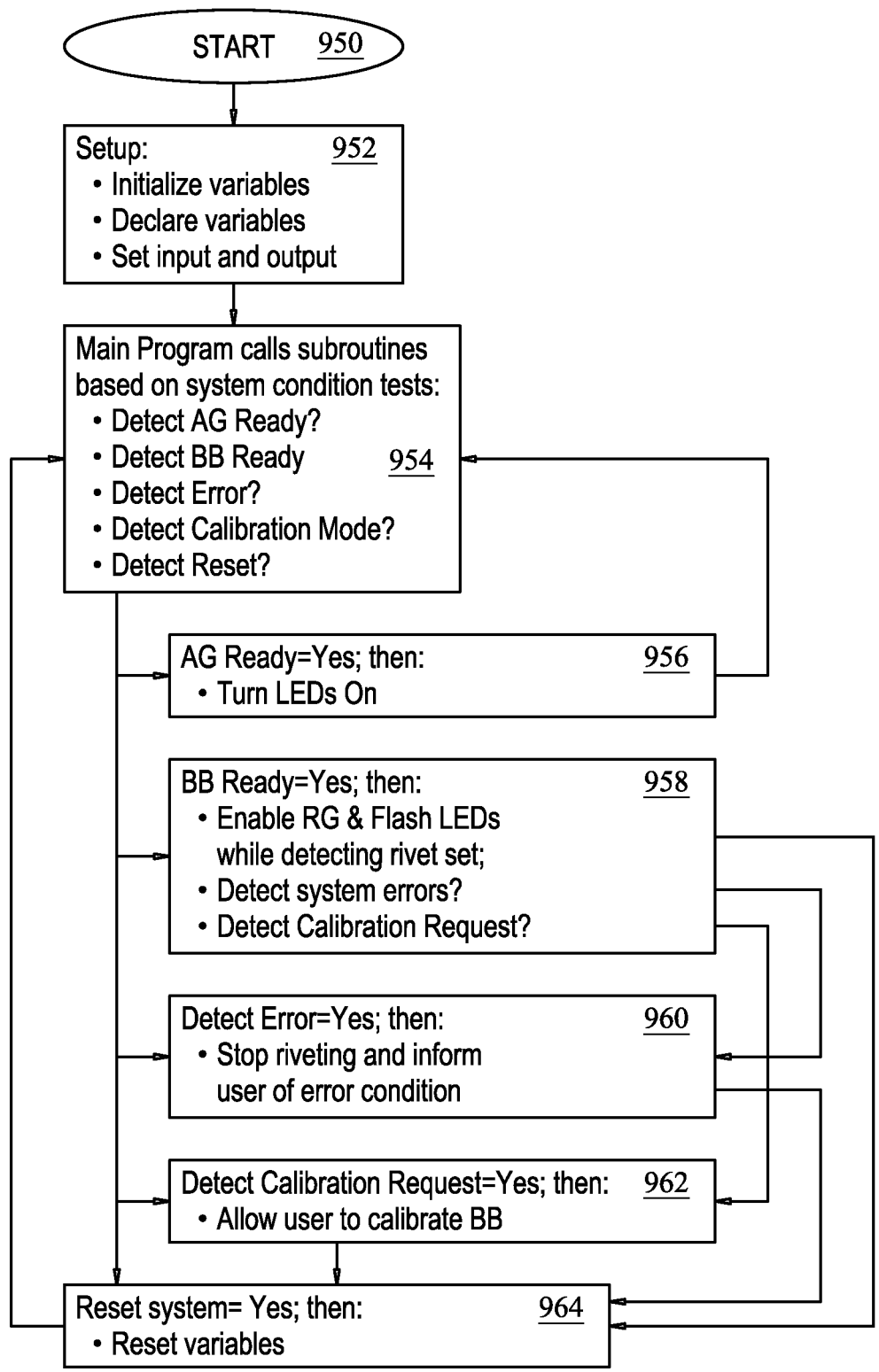
FIG. 19 is schematic flow diagram for software instructions in accordance with a preferred embodiment of the invention illustrated in FIG. 18.

Referring to FIG. 19, a schematic flow diagram is presented of a more preferred embodiment of software instructions for microprocessor 500. Since the operation of microprocessor 500 governs sequential riveting steps, when system 100 is started at start step 950, it immediately initializes system components in initialize system step 952, by declaring variables, setting variables, inputs and outputs, setting solenoid 112 to disable rivet gun 102, etc.

Next, in main program step 954, system tests are conducted by poling the status of input pins to determine which subroutine to call. Numerous tests are performed. Example tests include detecting whether the rivet gun operator is ready to begin riveting; detecting whether the bucking bar operator is ready to begin bucking; detecting whether there is a sequence or switch fault error (primarily for purposes of forcing the proper sequence of rivet cycle driving stages). Another error test is to detect whether the rivet head height detection sensor is working. Still another test is to determine whether the rivet gun operator has set up on a rivet and then disengaged (removed the rivet gun set tool from the work or rivet head). Still another error test is to determine whether the bucker has removed the bucking bar from the rivet during the rivet driving stage. This is an especially important test since it prevents the air gun operator from riveting against a rivet that is not being backed by the bucking bar; thus preventing damage to the work (a damage event condition).

Still further referring to the main program step 954 other tests are conducted. The main program step 954 also detects whether the calibration mode has been requested by the user (by switching system 100 into a calibration mode) or alternately by the system, e.g., requiring bucking bar recalibration after a predetermined number of rivets have been driven. Finally, in main program step 954, the system detects when a system reset is requested by at least one of the users (e.g., by pressing a reset button on circuit board 212) or by the system following the end of a rivet driving cycle, following operation of the error management subroutine, or following operation of the calibration management subroutine.

In rivet gun operator ready step 956, a subroutine is invoked when main program step 954 detects that the rivet gun operator is ready to start riveting. In this first subroutine, the LEDs are turned on to indicate the bucker that the rivet gun operator is ready to begin riveting; the rivet gun operator's LED is also turned on to verify the described communication to the bucker.

In bucker ready step 958, another subroutine is invoked when main program step 954 detects that the bucker is ready to begin bucking. In this second subroutine, rivet gun 102 is enabled and the LEDs are flashed on-and-off to indicate to both operators that the bucker is ready to begin bucking. Meanwhile, in bucker ready step 958, microprocessor 500 continuously monitors for system errors (to be described later) while also continuously monitoring for calibration requests (described earlier). Bucker ready step 958 is where the rivet driving cycle stage is conducted. If no interruptions, such as error faults or calibration requests are identified in bucker ready step 958, microprocessor 500 disables rivet gun 102 when desired set rivet head height 84 has been achieved and routes logical control to system reset step 964 (described later).

However, still referring to bucker ready step 958, if a system error is detected, rivet gun 102 is disabled and logical control is passed to the error detection block 960. Another possibility is that a calibration request is detected in bucker ready step 958; this would cause rivet gun 102 to be disabled and logical control to be passed to the calibration step 962.

Next, in error detection step 960, a third subroutine is invoked by main program step 954 or by bucker ready step 958 as a result of detecting a system error. There are numerous error possibilities. For example, errors can be a result of a rivet cycle sequencing fault, such as when the bucker attempts to indicate that he is ready to begin bucking before the rivet gun operator has first indicated that he is ready to begin riveting. In another example, if the bucker removes the bucking bar from the rivet during the riveting stage, an error is detected which stops the riveting process to prevent damage to the work resulting from the rivet gun hammering on a rivet that is not backed by the bucking bar. In still another example, an error results if a desired set rivet head height has been detected but the bucker has not indicated that he is ready. These examples illustrate some of the many possible fault detection schemes. After step 960, control is passed to step 964.

Next, in the calibration step 962, a fourth subroutine invoked by main program block 954 or by bucker ready step 958 as a result of detecting a request for system calibration.

Calibration step 962 allows the user to identify how many rivets have been driven since the last calibration was performed. This information coupled with total elapsed riveting time can be used by management to help determine worker performance. Additionally, since system 100 tracks the number of rivets driven, it can automatically force a calibration check after a predetermined number of rivets have been set or if the user sets a calibration switch. After step 962, control is passed to step 964.

Finally, system reset step 964 allows test parameters to be cleared or reset before the start of each rivet cycle. The main program step 954, as well as all described subroutines in steps 956, 958, 960, and 962 directly or indirectly invoke system reset block 964; the only exception is the rivet gun ready block 956 which passes control logic to the main program block 954. Those skilled in the art will recognize another form of indicating is actuation of solenoid valve either open to start a rivet driving cycle or closed to end a rivet driving cycle.

In preferred embodiments, system 100 ensures the tool does not fall out of calibration because it was not recalibrated on a timely basis. Therefore, the microprocessor uses a "debounced" signal to count the number of rivets driven and invokes an automatic calibration check after setting a predetermined number of rivets. Coupled with measuring total riveting time, the user (or management) is able to assess the rivet setting production performance for a work shift. In preferred embodiments, the number of impacts it takes to set a rivet and/or measuring the rivet setting time is performed by system 100 (this is useful for recommending and/or automatically adjusting air regulator settings to maximize rivet strength properties by minimizing work hardening of the rivet material). Alternately, assessing the hammer cycle frequency and/or "debounced" bucker contact signals, air regulator settings can also likewise be adjusted. Those skilled in the art will also recognize that after accommodating for the largest variables including user applied forces, tool alignment, air regulator settings, and tool equipment mass; a system might alternately accurately set rivets by only controlling the total number of impacts allowed before ceasing riveting, i.e., limiting the total impacts for each rivet driving stage. Total impacts can be obtained by directly counting impacts or timing the duration of a rivet driving stage based on the impact gun frequency. Total impacts may be adjusted according to rivet size (a user input) or by determining rivet size using a sensor (presented later). This approach is considered to be a less preferred alternate embodiment of the invention.

Figure 20:
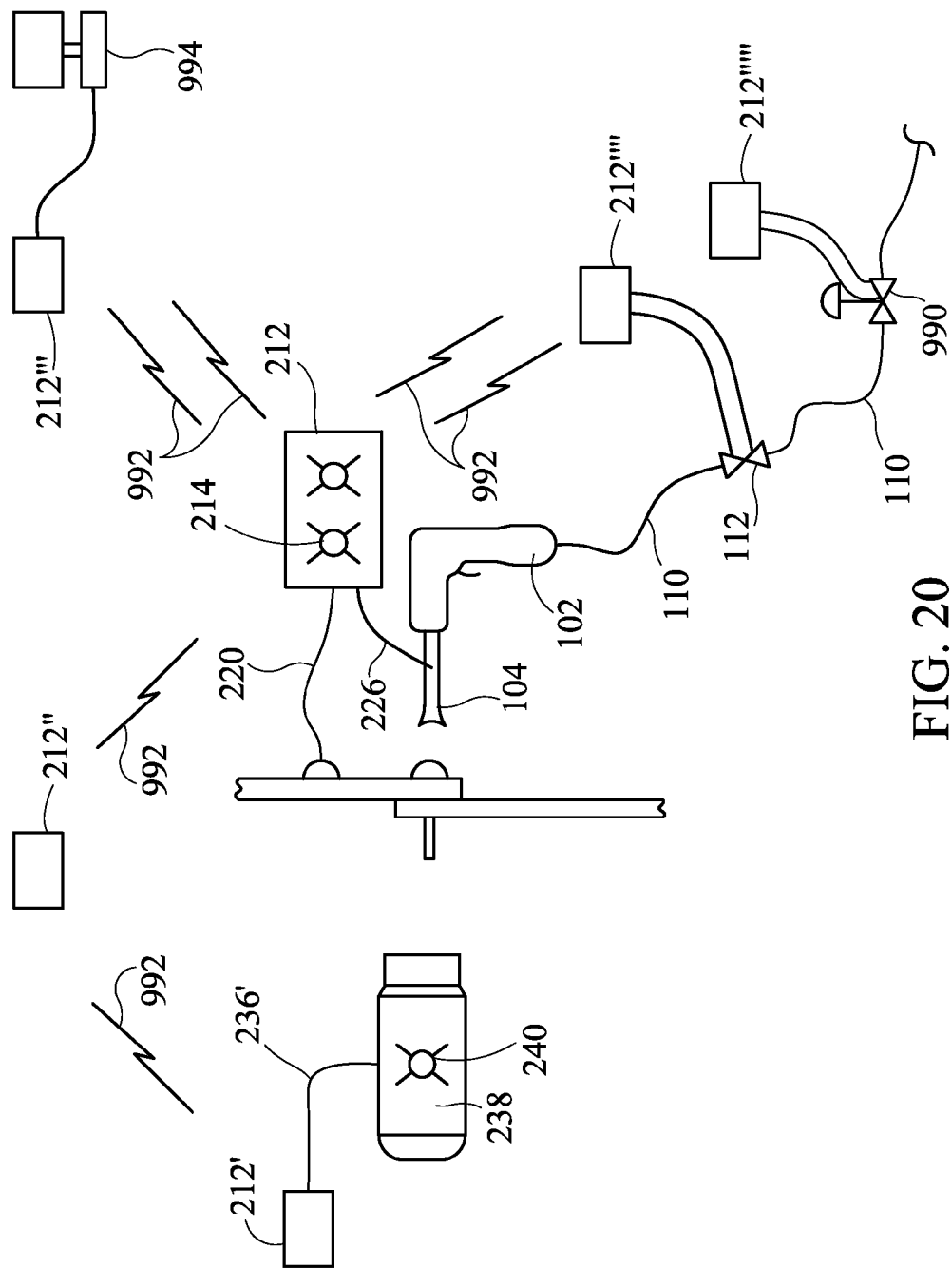
FIG. 20 is a schematic block diagram that illustrates the general relationships among the components of an alternate radio frequency embodiment of the invention.

Referring to FIG. 20, a schematic diagram is presented that depicts relationships among a plurality of microprocessor units located on distributed circuit boards for a "wireless", e.g., radio frequency (RF) embodiment of the invention. This diagram shows that rivet gun operator control circuit board 212 can communicate directly with second bucker control circuit board 212' using RF signals 992 or alternately communicate using RF signals 992 via a RF repeater circuit board depicted as third circuit board 212". FIG. 20 shows circuit board 212' disposed outside the housing of bucking bar 238; however, circuit board 212' may be incorporated into bucking bar 238.

In preferred embodiments, a RF communication scheme is used to datalog worker progress/productivity or other rivet setting data; when multiple workers are using this embodiment, each circuit board preferably has a unique RF "hand shake" address. By correlating tool RF addresses, data is preferably transmitted via RF from at least one of circuit board 212, 212', 212", 212''', and 212'''' to fourth circuit board 212''' which is coupled to central computer 994 for data logging and database purposes.

In a preferred embodiment, air solenoid valve 112 is operated by fifth circuit board 212'''' having preferably a RF transceiver or at least a RF receiver in communication with at least one of circuit board 212, second circuit board 212' and/or third circuit board 212". Finally, air regulator 990 is operated by sixth circuit board 212''''' having preferably a RF transceiver or at least a RF receiver to achieve RF communication via 992 signals with at least one of circuit board 212, second circuit board 212' and/or third circuit board 212". In this embodiment, communication between and among all circuit boards is achieved using RF signals 992, although the applicant alternately envisions substituting RF communication with communication wires (not shown in FIG. 20) for coupling communication between one or more circuit boards.

Finally, referring again to the preferred embodiment shown in FIG. 20, at least one of circuit board 212, 212', and 212" may communicate with the fourth circuit board 212''' which is coupled to a data logging central computer 994. Memory belonging to a central computer 994 is termed central memory. All six of the RF circuit boards (212, 212', 212", 212''', 212'''', 212''''') preferably have transceiver RF capability to allow communication handshaking between each other. It is understood that each circuit board has an RF address to prevent unintended cross-communication with other circuit boards belonging to other equipment not shown in FIG. 20. Those skilled in the art will appreciate that many combinations of communication between circuit boards are possible so the described communication combination is not to be limiting. Also given this teaching, it should be easily recognized that data from a plurality of users can be transmitted from any of the circuit boards 212, 212', 212", 212'''', or 212''''' to circuit board 212''' where data are stored on management central computer 994. A data set may comprise at least one of an equipment identification, a user identification, a time and date stamp, a rivet size, a desired rivet head height, a set rivet head height, a number of hammer blows, an air regulator setting, an offset distance, a time duration of rivet driving, a rivet gun hammering frequency. Furthermore, it is understood by a person having skill in the art that database information may be queried to determine or document tool performance or to aid manufacturers with production schedules or other purposes. In one example, if the RF address of each riveting tool in this invention is correlated or assigned to a user, user performance and production could be better assessed and managed. In a less preferred configuration of FIG. 20, data from a data set may be transferred to central computer 994 by other than wireless means.

Figure 21A:
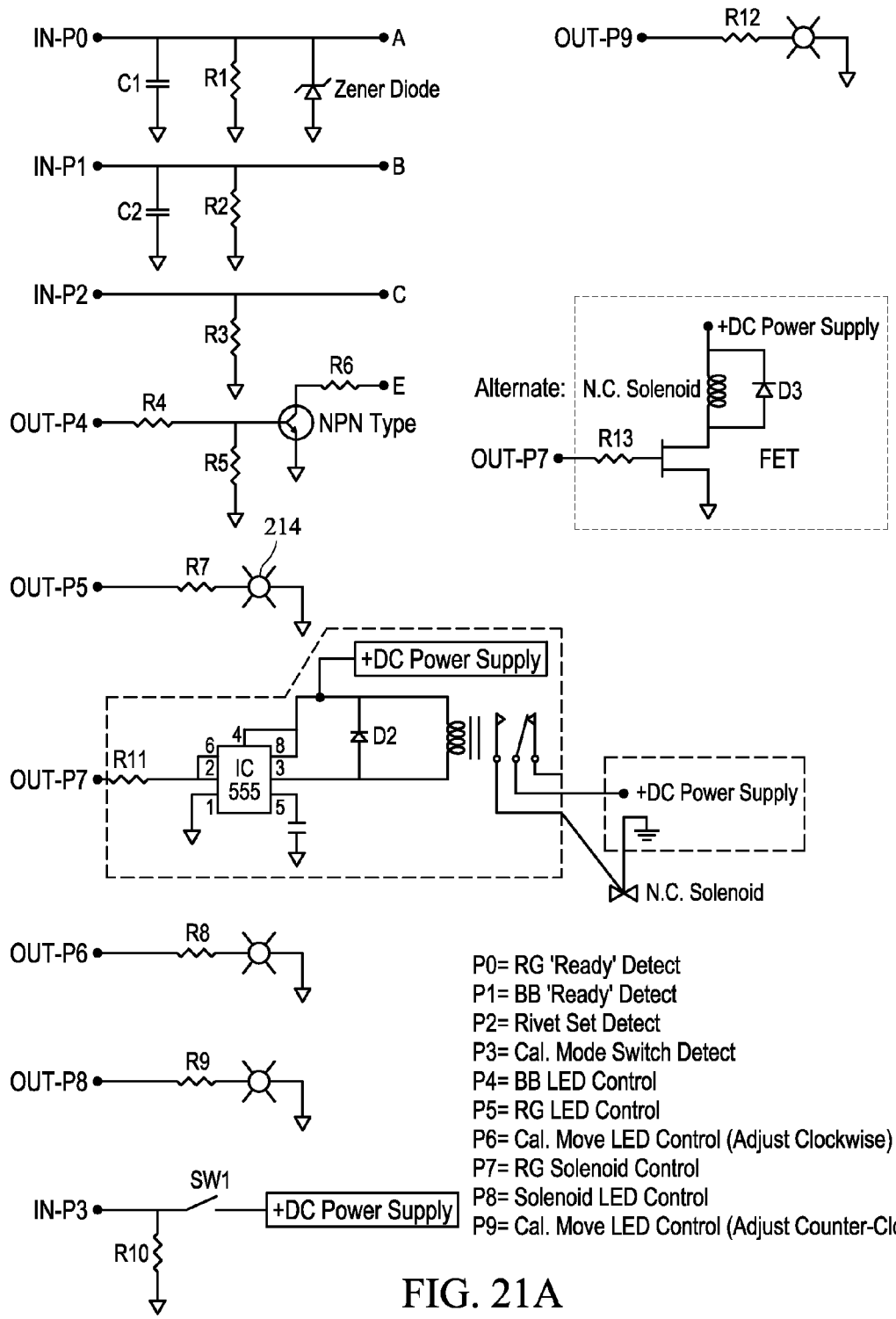
FIGS. 21A and 21B are schematic diagrams that illustrate a preferred embodiment of the invention.
Figure 21B:
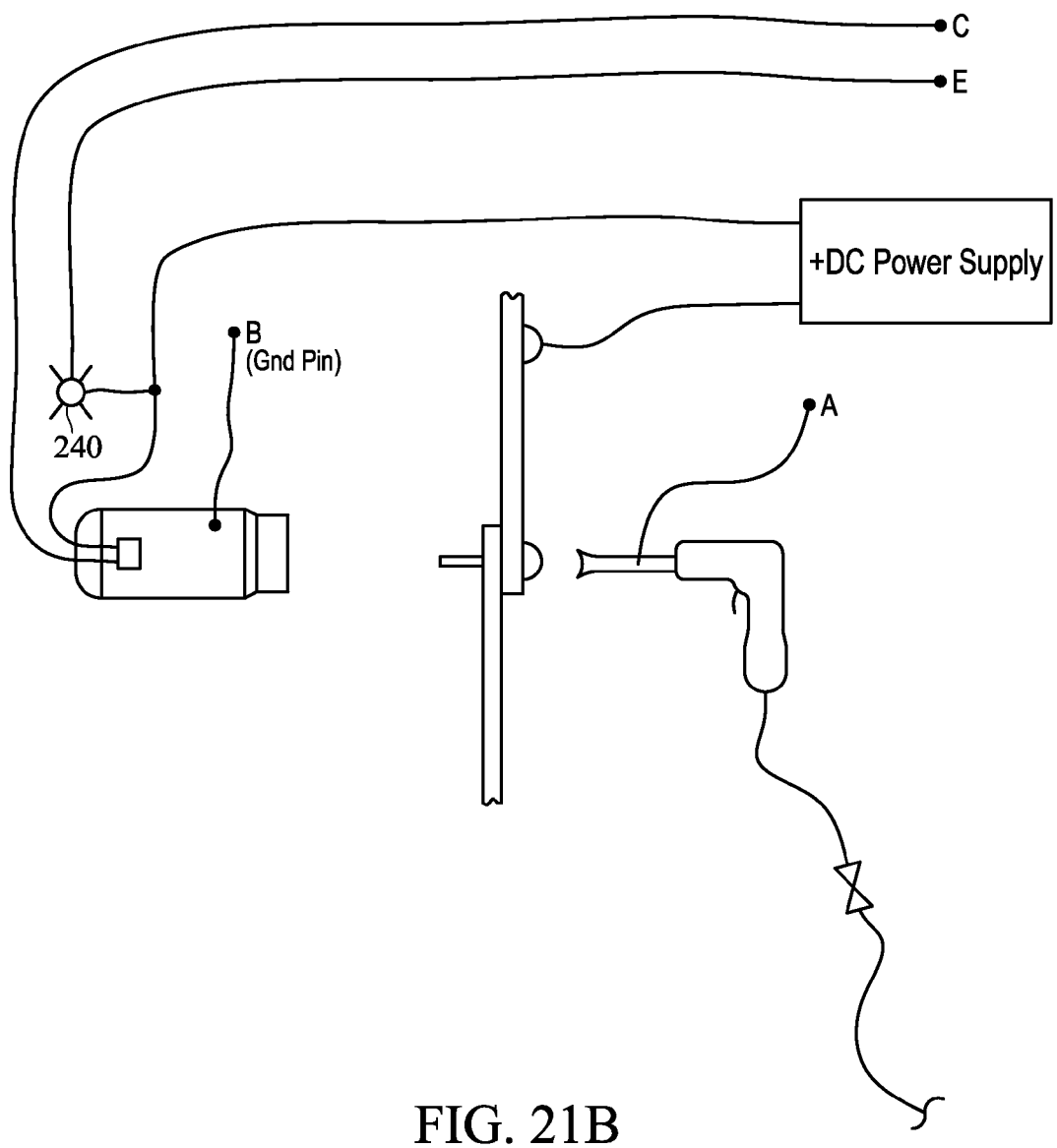

Referring to FIGS. 21A and 21B, more preferred embodiment of the invention is presented. The table shows preferred I/O Pin designations. Pin P3 represents a first sensor and pins P0 and P1 represent second sensors.

In preferred embodiments, the solenoid only enables rivet gun for rivet driving stage; this prevents damage to work from inadvertent rivet gun use (another form of damage event condition). In an alternative embodiment, the rivet gun is "hotwired" to eliminate need for rivet gun operator to use the rivet gun trigger (but, with this embodiment, a user adjustable timing delay prior to starting the rivet gun may be desired for user appeal).

FIG. 21A depicts a preferred controller 904 using a Field Effect Transistor (FET) which is faster acting that the 555 Integrated circuit. Parallel resistive and capacitive couplings to ground for inputs PIN0 and PIN1 serve to help eliminate false detections and a zener diode coupled to Input-Pin0 alternately adds additional protection. This arrangement also helps to filter switch chatter (described later).

Working Example

Figure 22:
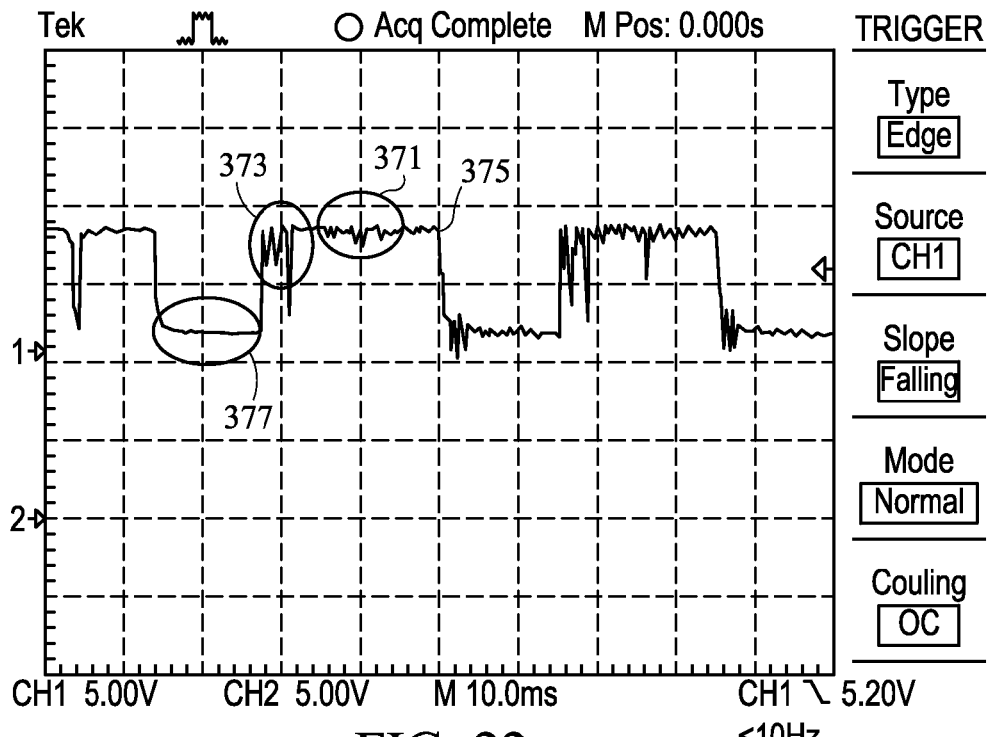
FIGS. 22 and 23 are screen shots of an oscilloscope monitoring the operation of a preferred embodiment of the invention.

Referring to FIG. 22, a digital recording of operation of a prototype of system 100 using an oscilloscope shows bucking bar tool-to-rivet contact signature using a preferred embodiment of bucking bar 238; the drawing represents bar 238 dynamic response to a rivet gun "hammer" cycle. Also, the recording shows clear signs of switch chatter 371 (rapid opening and closing of contacts) indicative of extreme vibration and/or shock between anvil face 300 and rivet shank end 70. Contact bounce or oscillation of movable contact upon closure of circuit was present as indicated by first contact bounce signature 373. The "switch" in this case was the make or break when the bucking bar was in contact or bounced off (not in contact) with the forming rivet head; respectively. When in contact, a voltage was detected and when not in contact, no voltage was detected. The rivet gun "hammer-blow" was indicated by first falling edge hammer signal 375. The time interval the anvil face 300 was "bucked-off" the rivet shank was shown by time interval 377. In general, there was a clear impact signature.

Referring to FIG. 22 a rivet gun hammer cycle period was approximately 37 milliseconds (ms) which is equivalent to about 27 Hertz. The time in contact was about 22 ms and the non-contact time was about 15 ms. The regulator air pressure was 90 pounds per square inch. It is important to note that the switch chatter and contact bounce signatures could be an artifact from the oscilloscope, switch (formed by mechanical bouncing of the anvil face against the rivet end) or a combination of these factors; however, signatures variances from oscilloscope measurement would be representatively equivalent in both FIGS. 22 and 23 and, therefore, for comparison purposes, variations from the oscilloscope measurement would be consistent.

Figure 23:
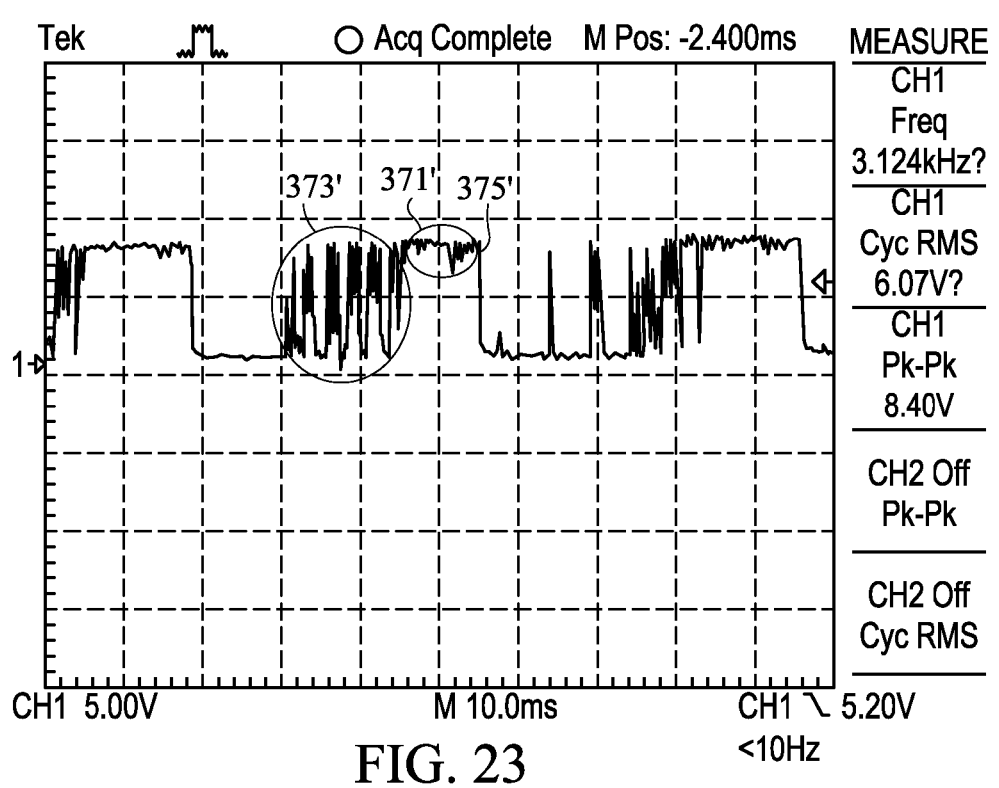

FIG. 23 shows a repeated test using a conventional bucking bar of similar mass. A significant increase in mechanical bouncing (anvil face on rivet head) before coming to rest was present; indicated by the contact bounce signature 373'. Switch chatter 371' was also present along with second falling edge hammer signal 375'. In general, the signature exhibited in FIG. 23 showed more vibration and was less clearly defined compared to the signature in FIG. 22.

In both cases, the anvil face was abutted against the rivet shank end when the rivet gun commenced a "hammer". Careful observation revealed approximately equivalent hammer frequencies. Results are presented in Table 1.

TABLE 1

| Item | Bucking bar 238 | Conventional bucking bar |
|---|---|---|
| Time "in-contact" | 22 ms | 18 ms |
| Time "non-contact" | ~15 ms | 20 ms |
| Mass | 1 lb 10.0 oz | 1 lb 7.2 oz |

The findings of this experiment were that, compared to the conventional bars, bucking bar 238 exhibited a much more well-defined characteristic train-wave signature. The difference between the waveform signatures of FIGS. 22 and 23 is mainly due to the plunger design of bar 238. The high frequency on and off signal in the test of the conventional bucking bar is mainly due to the working pieces resonance from the impulse after the rivet gun fires. The impact of the rivet gun firing causes the working pieces to vibrate at their natural frequencies. Depending on how the work pieces are fixed, their response due to impact could be large and the large displacement vibration could cause the rivet head and the bucking bar to be in intermittent contact (exhibited by 373 and in particular 373'). While using the improved bucking bar 238, the spring-back plunger is preferably always in contact with the working piece, on top of the bucking bar in contact with the rivet head. The additional contact between the plunger and the working piece can limit the working piece vibration after the rivet gun firing through at least one of three mechanisms: (1) added equivalent dampening of the working piece; (2) changed working piece boundary conditions; and (3) increased working piece equivalent stiffness. The natural frequency of both bucking bars is significantly higher than any waveform signature captured; however careful design of spring plunger system must be practiced to ensure that this system does not have a natural frequency near the rivet gun cycle frequency, which would cause the spring plunger system to resonance.

Consequently, dampening from the compression spring and plunger assembly results in: (1) increased bucking bar stability and consequently controllability (less bouncy), and (2) since bar 238 more quickly returns to an anvil face contacting rivet shank steady-state condition, an ability to increase rivet gun hammer rates, resulting in less work hardening of the rivet material and faster rivet driving. Depending on the rivet gun, increased air pressure settings can result in at least faster hammering frequencies and/or higher hammering amplitudes (such as increased hammer force magnitude). Shorter rivet driving stages could result in a better rivet set result because there is less time for manual tool misalignment motions.

The falling-edge signal occurring immediately after a rivet gun "hammer" appears to be the easiest and most consistent portion of the various waveforms to identify. By using a low pass Butterworth or ChevyChev or other filter, the switch chatter signature 371 and the contact bounce signature 373 could be removed or reduced to produce a "clean" (or debounced) impact signature. Hardware or software or a combination of hardware and software filtering are possible. Waveform detection software that serves as an impact sensor identifies hammer blow events during a hammering cycle and may also determine if the bucker disengaged from the rivet during a rivet driving cycle, resulting in an IRQ to stop the gun (reference FIG. 12, step 568).

In the embodiment tested, the solenoid took about 8 milliseconds to disable the rivet gun. Therefore, during a 37 millisecond hammering cycle, an optimized algorithm such as that described in the steps above could prevent an inadvertent hammer blow to the work 8 milliseconds prior to a next second "hammer blow". This provides protection for over 78 percent of a "hammer" period. Thus, by determining the hammer period and identifying the falling-edge-signal, system 100 could determine that anvil face 300 is in contact with rivet shank end 70 just before the rivet gun "hammers" again (or about 10 milliseconds before the next hammer strike). Alternately, another approach to prevent inadvertent hammer blows is to recognize that the rivet gun hammer cycle period is about 37 ms with the in-contact time being about 22 ms; while the solenoid closing speed is about 8 ms. In this approach, the microprocessor ensures that there is a sufficient in-contact time interval each hammer cycle (before each hammer blow).

This example also demonstrated that the bucking bar system described herein could be adapted to work with any conventional bucking bar to roughly set rivets by counting the number of impacts and limiting the driving stage to a specific number of hammer blows. Although rivets would be roughly set due to rivet-setting variables described earlier, this method may be more consistent than previous practices and in particular in cases of highly unique bucking bar shapes are used to buck rivets in difficult to reach locations. These locations are also notoriously difficult to inspect and rework. While this not is not a preferred embodiment of the invention, those skilled in the art, using the teachings herein, could adapt the rivet gun to limit the rivet driving stage to a specific number of hammer blows to set the rivet.

This example also demonstrated that the signature shown in FIG. 22 can be used to count hammer blows and coupled with a hammer cycle timer also determine hammer frequency. This embodiment allows the setting of the maximum time limit the bucking bar can be decoupled from the rivet during the driving stage. Exceeding this maximum time limit would be a detection of the bucking bar anvil face being disengaged with the rivet during the driving stage and thus prevent inadvertent hammer blows to work not being backed by the bucking bar. In another preferred embodiment, system 100 alternately includes an on-circuit-board accelerometer sensor to sense impacts and determine hammering frequency.

In an alternate embodiment, a first fifth-sensor comprised of three orthogonally positioned accelerometers may sense 3-axis inclination of the bucking tool to determine three-dimensional (e.g., x, y, and z-axis) orientation; similarly by likewise affixing a second fifth-sensor to the rivet gun set tool, another three-dimensional orientation can be determined. Then using software and data from the first and second fifth sensors, those skilled in the art will recognize that it is possible to determine when the tools are substantially parallel and that parallel alignment between a set tool and a bucking bar tool, during the rivet driving stage is yet another way to determine tool alignment. This approach is an option or supplement to the means previously described with respect to FIG. 16.

It is understood from these findings that microprocessor 500 may optionally also use measured bucking bar tool-to-rivet contact data to automatically adjust, or otherwise recommend to the user, the air regulator setting levels supplied to the rivet gun by adjustment of the air regulator setting. This feedback would effectively modulate the above signature forming a controlled Pulse Width Modulated (PWM) digital signature, i.e., controlling the elapsed time of the trough and the elapsed time of the crest of the pulse-train signature. It is noted in the described method that a safe time interval prior to a "hammer blow" is important but can also be a limitation to detecting bucking bar disengagement during a riveting stage and to the maximum safe amount of air pressure supplied to the rivet gun.

Furthermore, upon starting a riveting project, users normally practice on test work specimens to ensure they have the proper air regulator setting before beginning work on aircraft surfaces; however, should this step be omitted, microprocessor 500 would optionally also detect anomalies in the measured bucking bar tool-to-work contact signature to identify grossly improper air regulator settings and to immediately stop the rivet gun or alternately adjust to in real time the air regulator setting thus preventing damage to the work.

Finally to summarize, it is noted that the mechanical vibration and previously cited switch chatter are substantially reduced using bucking bar 238 compared to a conventional bucking bar having similar mass. This reduction in vibration is a result of at least one of the spindles feet contacting the work and/or the compressive spring providing a dampening effect. In either case, preferred embodiments of bucking bar 238 are more stable and controllable when compared to conventional bucking bars of comparable mass. Also, compared to conventional bucking bars of similar mass, bucking bar 238 spends more time with anvil face 300 in communication with the rivet 70. This is a demonstration of the improved performance of preferred embodiments of bucking bar 238 over conventional bars. This improved performance can be exploited by increasing the rivet gun hammer frequency to set rivets faster. Benefits of faster rivet setting include saving time, improved rivet properties by reducing work hardening of the rivet material resulting is stronger rivets, and improved consistency since critical tool-position holding time is reduced during the rivet driving stage. Alternatively, since this improved performance results in reduced tool vibration, the invention reduces carpal tunnel or hand-arm vibration syndromes and other debilitating user injuries such as white finger.

Figure 24:
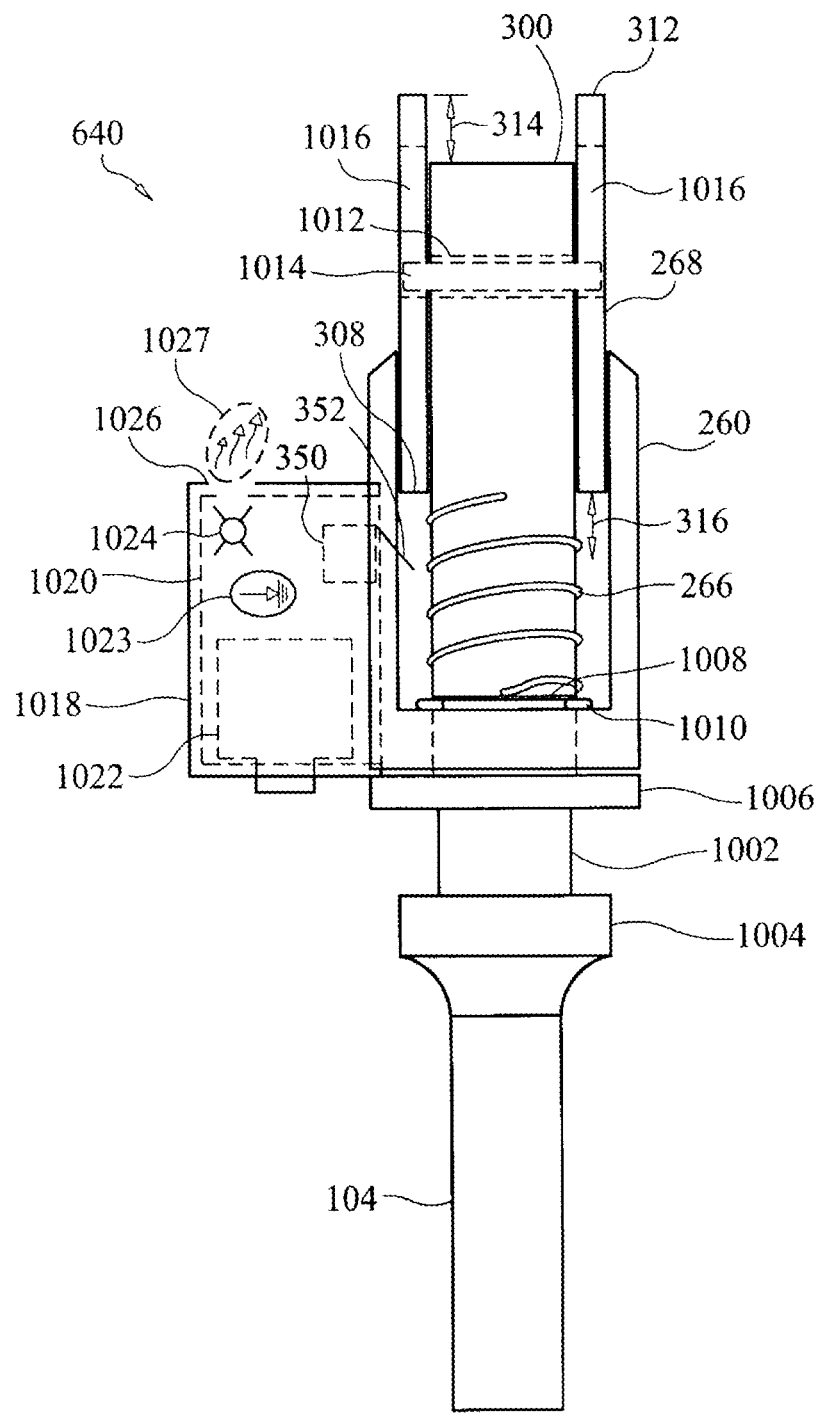
FIG. 24 is a partial cross-sectional view of still another alternate embodiment of the invention depicting another backriveting approach similar to FIG. 14 but also applying the teachings previously illustrated in FIGS. 7A and 7B.

Referring to FIG. 24, a partial cross-sectional view of still another alternate embodiment of the invention is presented. In this embodiment, set tool assembly 640 comprising set tool 104 that conventionally attaches to rivet gun 102 using a retaining spring (not shown) by coupling rivet gun 102, or other type of rivet driver, into recess 1002 between first raised cylinder diameter 1004 and second raised cylinder diameter 1006. Set tool 104 further has reduced cylinder diameter recess 1008 to receive external spring clip 1010 and center-line-located hole 1012 to receive a spiral roll pin 1014. Set tool 104 further has anvil face 300 at its distal end while shaft 325 of set tool 104 provides axial guidance to plunger 268.

Next, housing 260 is secured proximal to the shoulder of second raised cylinder diameter 1006 by spring clip 1010 or alternately by spring 266 and also serves to provide axial motion guidance for plunger 268. Spring 266 pushes against said clip 1010 and/or against inside of housing 260 and also pushes against plunger 268 at plunger shoulder 308. A person having skill in the art will understand that the load source force applied to plunger 268 may be applied by means other than a spring, such as by an air bladder. Plunger 268 is retained by pin 1014 located in hole 1012 of set tool 104; where the ends of pin 1014 protrude into pin slots 1016 of plunger 268. Therefore, under normal conditions, spring 266 pushes plunger 268 axially outward of housing 260) until pin 1014 stops plunger 268 with pin 1014 being disposed at a first end of slot 1016. In use, by applying force at spindles feet 312, plunger 268 can travel axially, compressing spring 266 until pin 1014 limits or stops the travel of pin 1014 at a second end of slot 1016. As plunger 268 travels axially, the gap height 314 between spindles feet 312 and anvil face 300 changes. Sufficient travel of plunger 268 is provided between first and second ends of slot 1016 to accommodate under normal conditions a protruding rivet shank in gap height 314 and to accommodate under rivet set conditions a desired rivet head height in gap height 314.

Next, affixed to housing 260 via a slotted groove mate is lid 1018. Lid 1018 preferably has four sides and a top and has a pocket or recess therein to hold sub-assembly circuit board 1020. Sub-assembly circuit board 1020 preferably comprises multi-conductor connector jack 1022, LED 1024, spring loaded contacting pin 1023, and micro-switch 350 (a first sensor) that comprises switch lever arm 352. Spring loaded contacting pin 1023 allows electrical conductive communication from sub-assembly circuit board 1020 to anvil face 300 via lid 1018 or via conducting path from lid 1018 and housing 260 to anvil face 300. In this illustration, plunger 268 is considered to be a non-electrically-conductive material; however, those skilled in the art will recognize other configurations are possible such that contact of anvil face 300 to rivet shank end 70 (not shown) can be detected by a formed loop circuit like those previously illustrated herein using wires 220 and 226 as presented in FIG. 8 or conducting other paths using optical photo coupler circuits (presented later). Other possible configurations are also presented later. Hole 1026 in said lid 1018 allows light 1027 from LED 1024 to illuminate the work pieces (not shown) and/or may be used for operator communication. Sub-assembly circuit board 1020 couples to a circuit board (not shown but similar to circuit board 212 in FIG. 8) via a multi-conductor cable (not shown) or alternately via a wireless communication link.

Upon assembly, sub-assembly circuit board 1020 is preferably inserted into the recess in lid 1018 and is potted into place while ensuring conductive pin 1023 contacts the frame of lid 1018. Next, using a sliding motion, lid 1018 is affixed to housing 260 via a groove male/female mate. Next, housing 260 is installed by sliding it over anvil face 300 of set tool 104 and is held into position by installing external clip 1010. Next, compression spring 266 is inserted over the end of set tool 104. Finally, plunger 268 is installed, causing some pre-compression of spring 266 and is secured by equally spacing pin 1014 in hole 1012 so that it retains plunger 268 by the presence of pin 1014 in slots 1016. Those skilled in the art will recognize that there are many ways to attach housing 260. In a first example, rather than using external clip 1010, an internal clip may be used by extending housing over second raised cylinder diameter 1006 in installing an internal clip on housing 260 body proximal to recess 1002. In a second example, body of plunger 260 may be made longer and have receiving holes that mate with hole 1012. In this case, pin 1014 may then be lengthened to secure plunger 260.

In this embodiment, a means for making various micro-adjustments is omitted and the desired rivet head height is determined by appropriately selecting component dimensions, such as appropriately sizing the cylinder length of plunger 268 and slot 1016 locations in plunger 268. By specifying the length of plunger 268 and allowing necessary the plunger travel, when gap height 314 (between anvil face 300 and spindles feet 312) becomes substantially equal to a desired rivet head set height 84, then switch 350 simultaneously actuates by movement of switch lever arm 352 against plunger shoulder 308. Those skilled in the art will recognize many ways to locate switch 350 (a first sensor) so that the switching threshold toggles the switch state when switch lever 352 contacts on shoulder 308 when the gap height or distance between the anvil face and work surface substantially matches a desired rivet height.

In other words, in practice set tool assembly 640 is preferably designed to set a specific rivet head size and a multiplicity of attachable set tool assemblies 640 (or packaged kits of set tool assemblies 640) are each manufactured to match a desired rivet head height 84 for each specific rivet head being formed 86 (see FIG. 3). In practice, this approach is analogous to a conventional socket set having multiplicity of sockets with each socket mating with a specific bolt size. Previously described features of other embodiments are intentionally omitted here for clarity, such as the plunger travel detection switch 708 (see FIG. 15) or spindles feet contact points 312', 312" and 312''' (see FIG. 16) or LED communication lights (see FIG. 8); however, it will be understood by those skilled in the art that any of the teachings or tool features throughout this invention may be incorporated into this tool and that teachings or features throughout this discourse are interchangeable between all tools without limitation—according to the needs of the user.

Still referring to FIG. 24, in application, set tool 104 is attached to rivet gun 102. A bucker installs a rivet and backs the manufactured head with a bucking bar. Then, the rivet gun operator positions set tool 104 over rivet shank end 70, contacting spindles feet 312 on the work surface and, by applying force, compresses spring 266 to slide plunger 268 axially. Contact of anvil face 300 with rivet shank end 70 is then preferably detected by a loop circuit sensor and rivet gun 102 is enabled by coupling it to a power supply, for example, an air supply if the rivet driver is pneumatically powered or other type of power supply if the rivet driver is powered other than pneumatically. Then, the rivet driving stage commences. When the driven rivet head height substantially equals to desired rivet head height 84, a switch, for example switch 350 described above, is actuated and riveting ceases by decoupling rivet gun 102 from its air supply. Given the many teachings of this invention, those skilled in the art will recognize many methods for detecting when anvil face 300 contacts rivet shank end 70. One of the preferred methods of detecting anvil face and rivet shank end contact with tool illustrated in FIG. 24, is via a loop circuit using the circuit described above with wires 220 and 226 in FIG. 8, thereby using the loop circuit as a sensor.

In an alternate embodiment a mass block (not shown in FIG. 24) is attached to set tool 104 (similar to attaching set tool 104 to a rivet gun). This functionally transforms the set tool into a bucking bar and further demonstrates that the teachings of the set tool can be applied to the bucking bar and that both tools are the same or nearly the same. Those skilled in the art will recognize that a set tool or a bucking bar may serve as a rivet shank deforming tool. Therefore, a rivet shank deforming tool may be either a set tool or a bucking bar.

Figure 25:
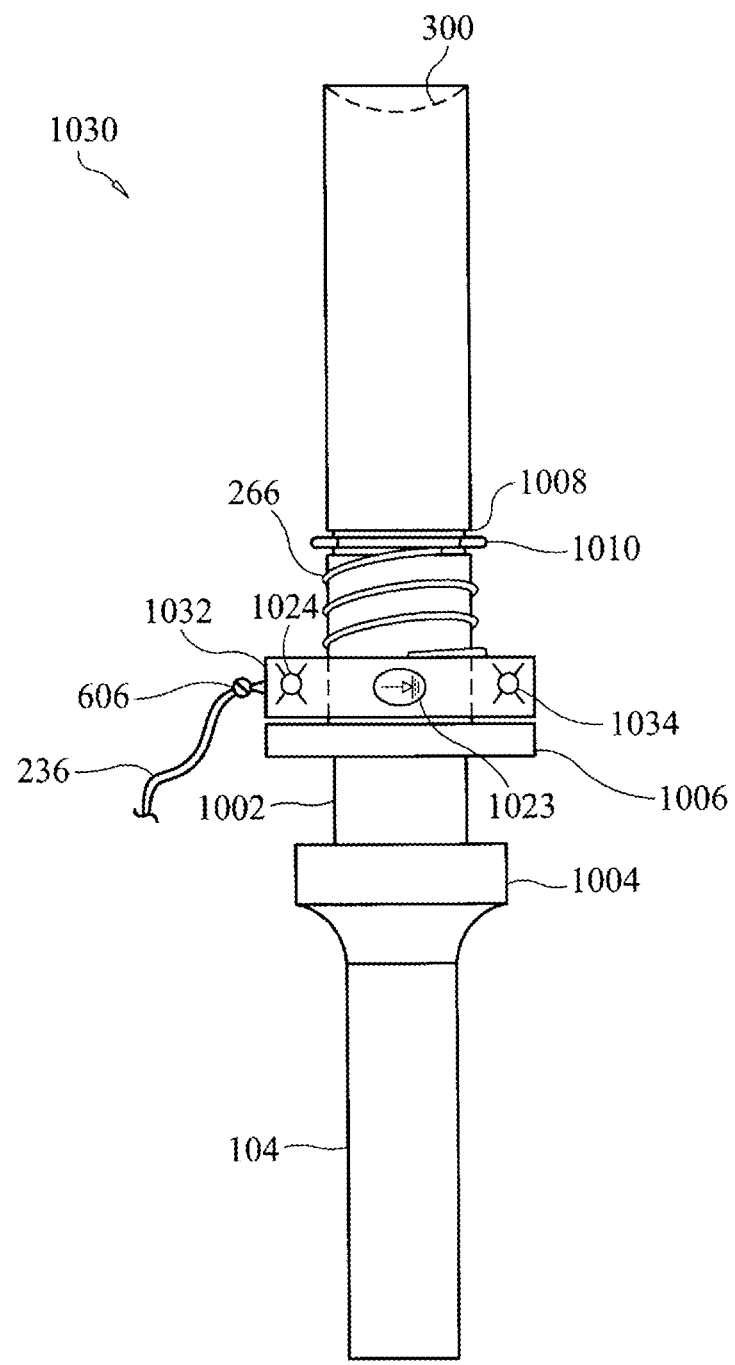
FIG. 25 is a partial cross-sectional view of still another alternate embodiment of the invention.

Referring to FIG. 25, a partial cross-sectional view of still another preferred embodiment of the invention is presented. In this embodiment, alternative set tool assembly 1030 comprises set tool 104 that conventionally attaches to rivet gun 102 using a retaining spring (not shown) by coupling rivet gun 102 into recess 1002 between first raised cylinder diameter 1004 and second raised cylinder diameter 1006. Set tool 104 further has recess slot 1008 to receive external spring clip 1010 and anvil face 300. In this illustration, anvil face 300 has a concave surface to substantially match the shape of universal manufactured rivet head 62 depicted in FIG. 2A. Compression spring 266 applies force against clip 1010 and housing 1032 to secure housing 1032 against second raised cylinder diameter 1006. Alternative housing 1032 has a circuit subassembly (not shown) having optional LED 1024 to illuminate the work pieces and optionally LED 1034 to provide communication to the user; although optionally LED 1024 may also provide communication (serve as an indicator). The circuit subassembly further contains a contacting pad (not shown) or optionally spring loaded electrical contacting pin 1023 to provide electrical communication from the circuit subassembly to anvil face 300. A multi-conductor cable 236 preferably attaches to alternative housing 1032 and has strain relief 606. Combined with the teachings and equipment of FIG. 8, a similar loop circuit forms a second sensor that uses circuit board 212, wire 220, and wire 226 is used to preferably detect when anvil face 300 is contacting rivet head 62 (although wire 226 is preferably replaced by multi-conductor cable 236). In preferred embodiments, this loop circuit forms a second sensor and the microprocessor detects when this anvil face 300 decouples from the rivet during a rivet driving stage and determines a damage event condition; then immediately ceasing riveting to prevent "smiley" face damage.

The circuit subassembly (not shown) couples to a circuit board (not shown) via a multi-conductor cable 236 or alternately via a single conductor cable or via wireless communication according to user needs. If wireless communication is used, the circuit subassembly provides necessary wireless equipment with microprocessor and means for delivering power, preferably from battery source. Also, for wireless application, any proximity sensor, loop circuit sensor, touch-capacitance sensor, or other sensor technology may be employed to detect the contact of anvil face 300 with rivet head 62. Given the many teachings of this invention, those skilled in the art will recognize that many methods may be used for detecting when anvil face 300 contacts either manufactured head 62 or 64, or rivet shank end 70. This statement also applies to detecting when spindles feet 312 of plunger 268 (see FIG. 24) contact a first work surface 74 or a second work surface 76 (see FIG. 3). Other preferred methods are presented later in this disclosure.

In application, the rivet gun operator installs a rivet and places anvil face 300 of set tool 104 on rivet manufactured head 62. Contact is detected by second sensor. The bucker then backs rivet shank end 70 with conventional bucking bar 52 (or the like) or optionally backs rivet shank end 70 with bucking bar disclosed herein (e.g., one described in FIGS. 7A and 7B). When the bucker uses bucking bar 52, a master circuit board (not shown) coupled to alternative set tool assembly 1030 detects when tool 104 anvil face 300 contacts rivet head 62 and enables the operation of rivet gun 102 by coupling it to its air supply. Then the rivet driving stage commences. During the rivet driving stage, system 100 (see FIG. 8) immediately detects if anvil face 300 of set tool 104 substantially decouples contact with said manufactured head 62 and immediately ceases riveting in order to prevent smiley face damage 63 or 63' (described in FIG. 4F). If the described decoupling above does not occur, the operators judge the duration of said driving stage based on their skill and art to set the rivet so that driven rivet head 86 height substantially equals desired rivet head height 84. Accidentally decoupling of anvil face 300 from rivet head 62 during the rivet driving stage typically occurs as a result of the rivet gun operator not maintaining correct forces or tool alignment relative to the rivet head 62 or to the work surface 74.

However, when the bucker uses a disclosed bucking bar with system 1030, a circuit board detects when both anvil face 300 of tool 104 contacts rivet head 62 and anvil face 300 of disclosed bucking bar in contact with rivet and then enables the operation of rivet gun 102 by coupling it to its air supply. Then the rivet driving stage commences. If the described decoupling above does not occur, circuit board ceases riveting when disclosed bucking bar sensor indicates that driven rivet head height 86 substantially matches desired rivet head height 84. Optionally LED communication lights on set tool 104 and the disclosed bucking bar indicate to the operators when that rivet gun operator is "ready", when bucker is "ready", and when the rivet driving stage is complete. Therefore, those skilled in the art will recognize that equipment shown in FIG. 25 used with other equipment from other teachings presented herein provides a means to prevent the smiley damage described in FIG. 4F. Set tool assembly 1030 may be optionally used with either conventional or invented bucking bars disclosed herein.

Figure 26:
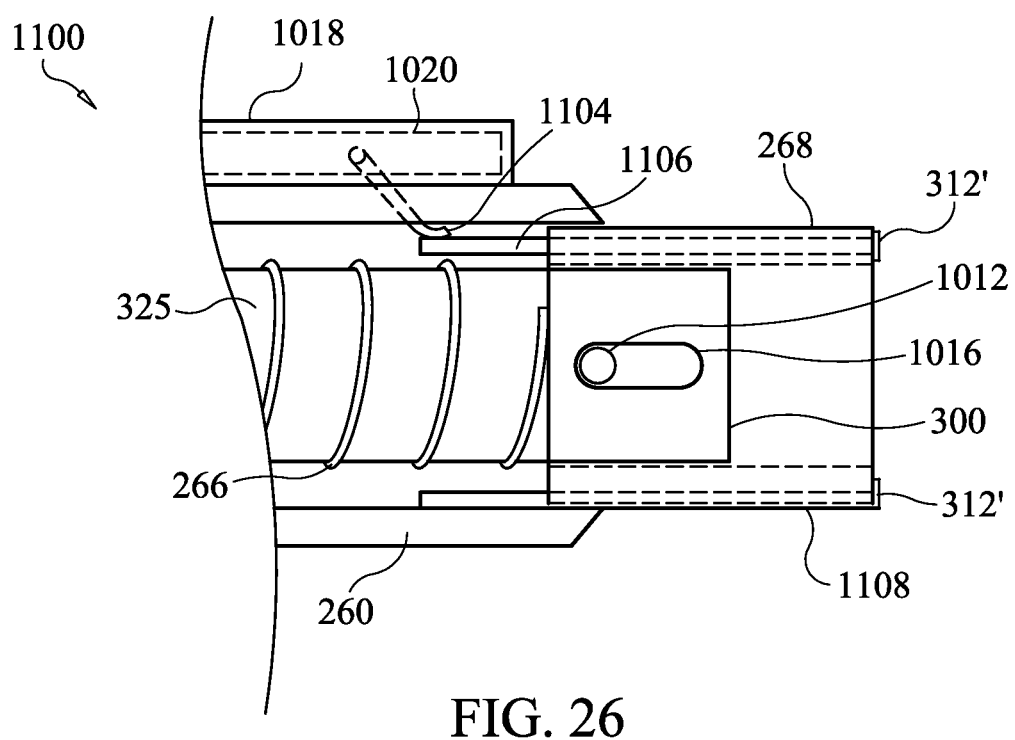
FIGS. 26, 27A, and 27B are partial cross-sectional views of still another preferred embodiment of the invention depicting means for tool alignment, tool contact, and anvil position sensing relative to the plunger spindles feet; these illustrations provide alternate sensing approaches and sensing technology applications that may be applied to teachings previously illustrated in FIGS. 7A, 7B, 13, 14, 15, 16, and 24.

Referring to FIG. 26, a partial cross-sectional view of still another embodiment of the invention is presented. This illustration employs the many teachings in this discourse to convey another embodiment of a rivet set tool assembly 1100. Here, partial assembly 1100 is depicted for brevity to represent the working end of either the invented bucking bar or the invented set tool because, when forming a shop head, either tool functionally works in a similar manner and given the teachings herein those skilled in the art can construct the remainder of the tool. Hammer stem 325 has hole 1012 and anvil face 300 at its distal end. Plunger 268 has two opposing pin slots 1016 and is axially retained on hammer stem 325 by pin 1014 (not shown in this view) which is disposed in hole 1012. Compression spring 266 applies axial force to plunger 268. In this embodiment, housing 260 comprises at least one lid 1018 and sub-assembly circuit board 1020 having a commutation lever 1104 that rides on first electrical conducting pin 1106. First electrical conducting pin 1106 is affixed to plunger 268 and forms spindles feet 312' at distal end of plunger 268. A plurality of first electrical conducting pins 1106 may be used to form additional spindles feet 312" and 312''' where each spindles foot is part of a unique electrical loop circuit and can form a plurality of fourth sensors).

Alternately, in another embodiment, a plurality of second electrical conducting pins 1108 may be affixed (preferably embedded, but protruding slightly) to the outside diameter of plunger 268 so that conductive commutation is provided from friction contact of each second electrical conductive pin 1108 to commutation lever 1104 or to a conductive pad (not shown) located on the inside diameter of housing 260. Those skilled in the art will understand that a plurality of spring pins (similar to spring loaded electrical contacting pin 1023) may be used to provide a plurality of spindles feet 312' to electrically define a planer or near planer surface orthogonal to the plane of work surface 74 while still accommodating slight contours in work surface 74 since most work pieces in aircraft have contour shapes. Spring pin examples are exhibited at the WWW domain mill-max.com. (This sort of pin can also be a conducting post 256). Preferably, a plurality of first electrical conducting pins 1106 or a plurality of second electrical conducting pins 1108 form a plurality of spindles feet 312' and are preferably disposed 120 degrees apart to form first, second, and third contact points, thereby forming spindles feet 312', 312", and 312''' as shown in FIG. 16.

In application the preferred embodiment commutation lever 1104 is a radially positioned first spring-loaded (Pogo) pin with spring-contact-end in commutation with electrical conducting pin 1106, then pin 1106 is affixed to plunger 268 and to an axially positioned second Pogo pin with spring-contact-end protruding beyond plunger feet 312 (representative of 312' in FIG. 26). Preferably first Pogo pin (replacing lever 1104) is affixed to housing 260 and wired to circuit board 1020. Second Pogo pin (protruding from plunger feet 312 at 312') is affixed to distal end of conducting pin 1106 and allows spring-loaded end to recess inside plunger 268 until flush with spindles feet 312. Sliding commutation between first Pogo pin (shown as lever 1106) and conducting pin 1106 accommodates axial displacement of plunger 268. This provides electrical circuit loops between a plurality of second pogo pins (at location 312'). Further since hammer 325 is in electrical conductive communication with circuit board 1020, when anvil face 300 contacts distal end of rivet shank 70 yet another electrical loop is formed from Pogo pin (at location 312') to anvil face 300, by passing over electrically conductive work surface 76 and through rivet shank 68. In application detection of any one of the plurality of electrical loops is by a pull-up or pull-down digital input sensor on a microcontroller 500. For clarity, Pogo pins are not shown in FIG. 26.

Though not limiting, this configuration therefore provides electrical conducting paths to detect if a plurality of spindles feet 312' are substantially orthogonal to a work surface 76 or 74 and alternately to detect when the anvil face contacts the rivet shank end (useful for measuring the protruding shank length or forming shop-head button of a rivet). In an alternate embodiment, those skilled in the art will recognize that pin 1106 and axial pogo pin forming spindles feet 312' contact point can be replaced with a mechanical microswitch or other sensor type to aid in determining substantial tool orthogonal alignment when the work surface is not electrically conductive.

In the illustrative embodiment shown in FIG. 26, plunger 268 is preferably fabricated from a non-electrically conductive material. This configuration preferably provides a unique electrical loop circuit that is formed (or switched) by contact of one or more spindles foot with work surface 74. For example, by allowing spindles feet 312' to have a positive circuit electrical potential and both spindles feet 312" and 312''' to have a negative circuit electrical potential, then when the spindles feet contact the airframe surface, a first circuit is formed by loop circuit closure from spindles feet 312' to 312" and a second circuit is formed by loop circuit closure from spindles feet 312' to 312'''. The first and second circuits form fourth sensors. Furthermore, in this example, a third circuit is formed between spindles feet 312' and anvil face 300 when anvil face 300 contacts rivet. The third circuit forms a second sensor. Therefore, with the loop circuits described above, means are provided to detect contact of one or more spindles foot with work surface 74, to detect tool alignment and to detect when anvil face 300 contacts rivet shank end 70 or optionally rivet head 66. Microprocessor instructions can then poll loop circuit detection sensors (or similar sensors) to determine when the tool contacts the work, to determine tool orthogonal or near orthogonal tool alignment relative to the work, and to determine when anvil face 300 is in contact with rivet head 66 or rivet shank end 70. After said determination is made, microprocessor instructions can then interrupt tool operation if undesired tool alignment is determined and/or can operate communication LEDs, like LED 240" in FIG. 16, to provide feedback to correct tool alignment. Given the teachings of this example, those skilled in the art will recognize numerous ways to form the described circuits so the example is not limiting.

The configuration described above provides yet another loop circuit detection path by eliminating wire 220 and replacing wire 226 with multi-conductor wire 236 to replicate the described loop circuit formed using wires 220 and 226 in FIG. 8. The configuration eliminates the need for wires 220 and 226 in FIG. 26. Sub-assembly circuit board 1020 is preferably coupled to a control circuit board by a multi-conductor cable or by any wireless means (not shown). Also the features of FIGS. 24 and 26 could be incorporated into FIG. 25 to aid tool alignment and prevent "smiley" type damage; yet another damage event condition. Therefore, in addition to further illustrating the concepts presented in FIG. 16, FIG. 26 demonstrates to those skilled in the art the potential benefits of using selective teachings presented in this disclosure to achieve user goals.

Figure 27A:
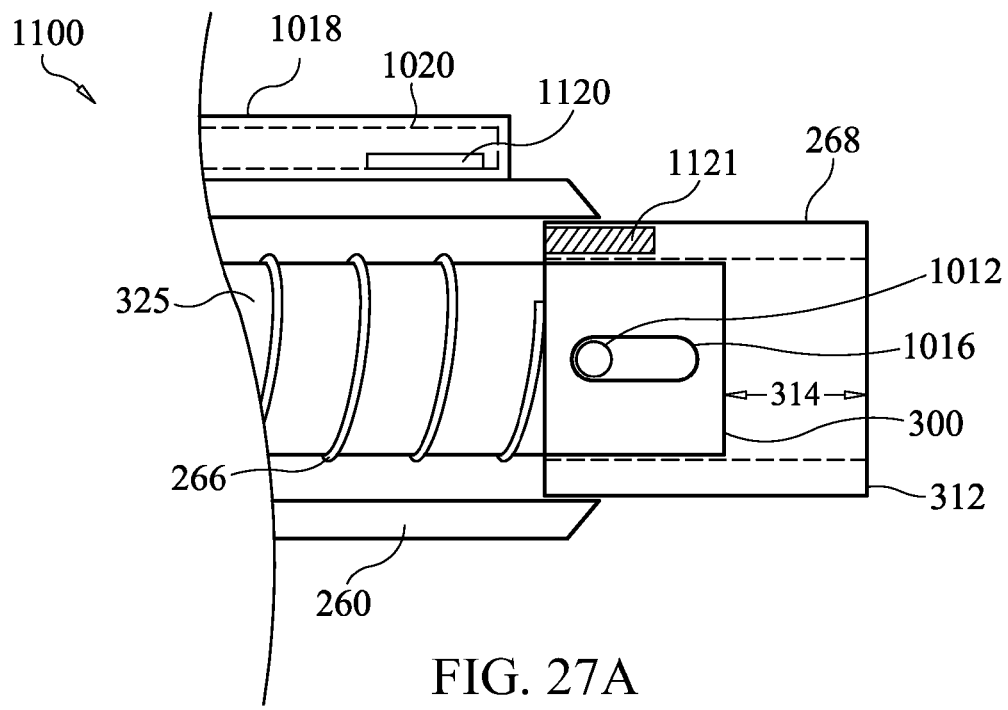

FIG. 27A presents a partial cross-sectional view showing a partial assembly of still another embodiment of the invention Like FIG. 26, this illustration also employs many of the teachings in this disclosure to convey to those skilled in the art that the depicted partial assembly features may be employed on the "working end" of either the disclosed set tools or the disclosed bucking bar tools. In other words, portions of alternate set tool 1100 in FIG. 27A are functionally equivalent to those shown in FIG. 26 and are again depicted for clarity to represent the working end of either the disclosed bucking bar or the disclosed set tool. Given the proceeding teachings, those skilled in the art will be able to construct the remainder of the tool. In alternate set tool 1100, analog detector or sensor 1120 is depicted that continuously measures linear displacement of plunger 268 relative to anvil face 300 to measure gap height 314 (during a rivet driving stage and when the anvil face is in contact with the rivet shank end, the gap height is substantially equivalent to the distance between the anvil face and the work surface). In this illustration, detector or sensor 1120 measures the linear travel of target 1121 material affixed in plunger 268 to determine or measure gap height 314 between spindles feet 312 and anvil face 300

Sensor 1120 senses distance between the work surface and the anvil face; it serves as a first sensor when said distance is substantially equal to a desired rivet head height. However because it is analogue, sensor 1120 may also serve as a third sensor when said distance is a measure of protruding rivet shank length which allows determination of rivet size and corresponding desired rivet head height. A protruding rivet shank is distance 80 (See FIG. 3). Sensor 1120 also serves to continuously measure axial travel or displacement of the plunger relative to the anvil face which allows determination of when this travel first stops to be a measurement of rivet protruding shank length (discussed later). Preferably a microprocessor uses input from a second sensor (e.g., described earlier as loop circuit sensors) to determine when an anvil face 300 first makes contact with a rivet shank end, just prior to commencing a rivet driving stage. Those skilled in the art will recognize still more methods of anvil face and rivet shank end detection: when urging anvil face 300 towards a work surface the plunger 268 does not move until spindles feet 312 come into contact with work surface. Upon further urging the plunger 268 displaces axially and stops (displacement motion ceases) when the anvil face first contacts the rivet shank end; software detecting this ceased motion may then poll sensor 1120 to determine a protruding shank length, a rivet size and a desired driven rivet head height; before commencing a rivet driving stage. Using this sensor and software detection method, sensor 1120 can serve as a third sensor without first using information from a tangible second sensor to determine as a marker when an anvil face first makes contact with a rivet shank end. This is because software detects when the anvil face contacts a shank end by monitoring motion of the plunger through continuous polling of sensor 1120 and therefore the combination software and sensor 1120 forms another type of second sensor.

With the above teaching, those skilled in the art will recognize that when using software to monitor the third sensor 1120 input signal and corresponding plunger motion, a protruding rivet shank length may be determined when the plunger first stops (this corresponds to a measurement between the anvil face and work surface when the anvil face first contacts a rivet shank end) and, therefore, a rivet size may be determined. This is a preferred method of determining a rivet size when the work surface is a non-conductive material, such as carbon fiber. Alternately, an input from a second sensor detecting an anvil face contact with a rivet shank end is used to signal a microprocessor to poll third sensor 1120 and then determine a rivet size. A user input is yet another way to provide the microprocessor with rivet size information. Next, using input from an impact sensor, a microprocessor can determine the total or tally of impacts needed to set a rivet from a rivet driving stage. Next, the microprocessor determines by calculation or lookup table said tally of impacts to drive said rivet approximately corresponds to said rivet size and optionally indicates to a user a recommend air regulator adjustment recommendation for a next rivet. This air regulator adjustment feedback approach preferably improves rivet properties such as fatigue strength and minimizes rivet material work hardening caused using excessive impacts to set a rivet. Said air regulator adjustment recommendations are used to continuously improve the rivet set quality.

This configuration illustrates the use of other types of sensors to measure linear travel of plunger 268 to determine gap height 314. In a first example, sensor 1120 may be a high resolution magnetic displacement sensor integrated circuit paired with magnet target 1121. In a second example, sensor 1120 may be an inductive proximity sensor paired with iron target 1121. Those skilled in the art will recognize that other sensors and/or targets are also possible with this configuration and that these may include without limitation at least one of inductive, hall effect, and magneto-resistive technologies. Furthermore, the configuration may be modified to accommodate such sensors. Such artisans will also recognize and incorporate sensor calibration when necessary and understand that at least one of the above example sensors requires that housing 260 (and particularly sensor 1120) rotation not be permitted to avoid rotational position changes between the sensor and the target that would misalign the sensor/target pair and loss of calibration or produce inaccurate linear plunger motion measurement. Without limit, other sensor configurations are also possible. A plurality of sensors 1120 and/or targets 1121 may be used to improve measurement resolution. A target may also consist of a plurality of magnets stacked together with reversing poles. Alternatively, the body of an inductive sensor such as an LVDT sensor may be affixed to housing 260 while the sensor's plunger could be in contact with or affixed to the plunger 268. Likewise those skilled in the art will recognize the application of capacitive, eddy current, magneto-inductive, draw-wire, confocal or other sensors for measuring relative displacement, distance or position between the housing 260 and the plunger 268 to determine a corresponding off-set distance between the anvil face and the work surface.

Figure 27B:
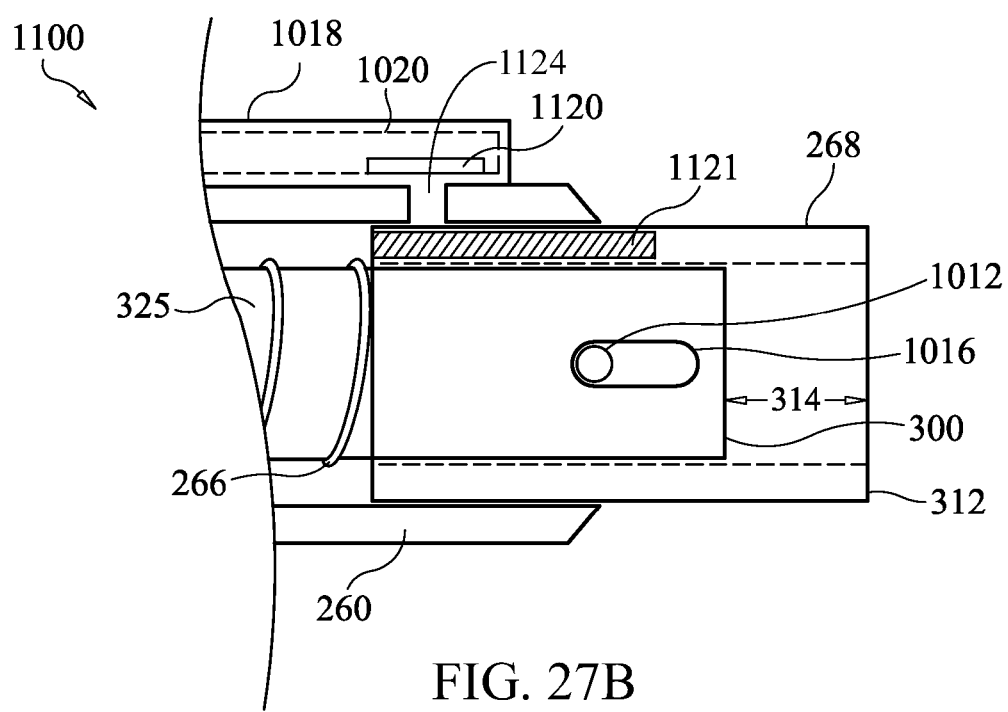

FIG. 27B depicts a partial assembly in cross-sectional view of preferred embodiment using a sixth sensor for measuring axial displacement of plunger feet spindles 312 relative to a fixed frame such as the anvil face 300. In this embodiment sensor 1120 is an optical, reflective or inductive linear encoder paired with a target 1121, e.g., these sensors are available at WWW domain avagotech.com or at WWW domain posic.com. For these sensors the term target 1121 also means "scale." Sixth sensors (encoders) are used with a microprocessor preferably with embedded quadrature encoder interface capability to decode the sensor information. By comparison to FIG. 27A, FIG. 27B shows an elongated plunger 268, target 121 and provides a viewport 1124 that allows unobstructed visual sight-path between the sensor 1120 and target 1121 (in the case of an optical encoder). Preferably the encoder has three output channels, the first and second channels produce digital pulse train signatures out of phase with each other and a third channel produces a digital pulse when an index (not shown in FIG. 27B) on the target is detected.

When passing over an index (not shown in FIG. 27B) on target 121, absolute encoders produce a third channel output consisting of a single digital pulse signature to achieve sensor absolute position measurement capability. In application, a software calibration step is used to measurement the distance between the index location and a reference location (e.g., a reference location may be a displacement distance from the target index location to the anvil face 300 when spindles feet 312 and feet contact points 312' are flush with anvil face 300). Meanwhile digital signatures from channels 1 and 2 coupled with software measure linear displacement substantially equal to the distance between spindles feet 312 and anvil face 300. During the rivet driving stage force is applied to the hammer 325, compressing spring 266 and holding spindles feet 312 against a work surface. This preferably compresses a plurality of Pogo pins (at location 312', 312'' etc.) to form a coincident relationship with spindles feet 312.

As previously defined, coupled with software the sensor 1120 and target 1121 pair can measure a plurality of parameters and consequently can be substituted for other sensors in this invention. Preferably in operation an absolute linear encoder sensor 1120, coupled with previously described electrical loop sensors, is used to measure the rivet protruding rivet shank length, the nominal rivet shank length (after each rivet-driver impact blow during the rivet driving stage), and the final set rivet shop-head or button height. Encoder data is also used to determine a desired rivet head height from the protruding rivet shank length. Those skilled in the art will recognize a number of methods to achieve rivet height measurement, even if the work surface is non-conductive.

In applications when fastening non-conductive work pieces together with rivets, to measure a rivet protruding shank length the plunger spindles feet 312 contacts a work surface 74 or 76 and upon compressing spring 266 plunger 268 moves axially inward until momentarily stopping when the anvil face 300 first contacts rivet shank end 70. Those skilled in the art will appreciate that using a clock timer and software on microcontroller 50 the protruding shank length can be determined from this first contact, e.g., after first detecting plunger 268 travel, (which compresses spring 266) software monitoring sensor 1120 recognizes plunger 268 momentarily stop when plunger 268 travel displacement is in a deflected position relative to its normal "at rest" position and does not substantially change for a specified time interval. Then the microcontroller 50 interprets the momentary travel stop of plunger 268 to be representative of a protruding rivet shank length. This approach allows protruding shank measurement without using previously described conductive electric loop switching circuit(s) (and depicted in FIGS. 16 and 27) and is useful when installing rivets when fastening together work piece 72 and 73 (FIG. 3) materials that are not electrically conductive.

A sixth sensor can also detect a change in plunger 268 travel direction, i.e., when plunger travel direction changes from an inward to outward or from an outward to inward displacement. Although FIGS. 22 and 23 depict tool vibration signatures of anvil face 300 bouncing on a forming shank end 70, due to a hammer blow, artisans will also recognize that sixth sensor information yields yet another signature (not shown) representative of a step-wise decreasing height change of the plastically forming rivet button head produced from the rivet driving stage. In application the preferred embodiment includes using a software loop to store in a first memory the rivet button height measurement each time the plunger 268 travel direction changes from an inward to outward direction, next comparing first memory value (new button height) to a previously stored second memory value (old button height) and over-writing (replacing) the second memory value with the first memory value if the first memory value (new button height) is substantially smaller than the second memory value (old button height). Since anvil face 300 bouncing vibration in FIGS. 22 and 23 does not produce substantially enough load source force to plastically deform the rivet button so the term "substantially smaller" means that sufficient load source force was applied to the rivet to plastically deform the rivet button to a step-wise decreased height above a work surface 76 or 74. (Each step change in button height results from an impact blow.)

This approach filters out vibration signatures to produce a step-wise button height signature representative of the forming rivet as a result each impact blow from the start to the end of a rivet driving stage. Step-wise plastic button deformation data can be stored in an array and be used to characterize a rivet deformation curve (presented later). Frequency analysis of sixth sensor data or preferably by recording elapsed time between step-wise changes can be used to determine rivet gun impact blow frequency and a tally of step-wise button changes stored in the array is representative of the number of impact blows used to set the rivet to a substantially desired height. Other approaches to characterize rivet deformation during the rivet driving stage are possible, but this approach is the preferred embodiment due to its simplicity and because it applies when fastening conductive or non-conductive work pieces 72 or 73 together.

A sixth sensor encoder has plurality parameter measurement capability, e.g., coupled with software and a microcontroller an encoder can be used to determine a travel direction, a change in travel direction, a position, a velocity, an acceleration and frequency spectrum data of a plunger 268. This is list not limiting for example it is also possible to determine at least one of an impact blow, a tally of blows and a series of rivet heights resulting from sequential impact blows. Further coupled with a clock timer additional data including rivet gun hammering frequency can also be determined. Those skilled in the art will recognize that analyzing sixth sensor data, for example plunger change-of-travel-direction data may be used to characterize tool vibration for assessment of susceptibility of injury to mechanics or to change rivet gun driving forces (described in FIG. 20), i.e., regulate the load source or driving force produced from the rivet gun, or to characterize the deformed rivet "button" height upon each successive impact blow to produce a rivet set curve. Though not limiting, a plurality of rivet set curve data can be generated that are representative functions of at least one of first-measurement nominal protruding rivet head heights, driving forces, driving frequencies, vibration frequencies (FIG. 22), rivet sizes, total elapsed time to drive a rivet, step-wise formation of button heights and elapsed total time to set a rivet. Preferably a plurality of data sets are stored in database 994 (FIG. 20) and can be used in post-processing analysis (discussed in FIG. 30).

Still referring to FIG. 27B it is important to understand that using a sixth sensor encoder 1120 with a microprocessor timer and software code (not shown in FIG. 27B) rivets can be set in non-conductive materials according to the teachings of this invention. This equipment combination is also a seventh sensor, a sensor system and may be more simply referred to as a "sensor." First in application microprocessor determines preferably by comparison of plunger 268 travel position data received from encoder 1120 to a first memory storage value representative of a substantially nominal at-rest position of plunger 268; i.e., when hole 1012 and pin slots 1016 are substantially aligned as shown in FIG. 27B. Next when sensor head assembly 1100 addresses rivet shank end by placing plunger 268 over the protruding rivet shank end (illustratively represented as dash-line distance 80 in FIG. 3) until spindles feet 312 are in contact with and substantially orthogonally aligned to work surface 76 (FIG. 3). Next a load source compresses spring 266 as plunger 268 travels inward until anvil face 300 first contacts rivet protruding shank end. Here microprocessor stores into a second memory the protruding rivet shank length when plunger 268 has traveled from its nominal at-rest position and when encoder values have not substantially changed over a small elapsed time interval (this indicates a substantially steady-state static condition when the rivet manufactured head 66 shown FIG. 2A, is fully seated in the hole and distance between anvil face 300 and plunger 268 spindles feet 312 is substantially equivalent to the protruding rivet shank length). This measures a protruding rivet shank length. Next the microprocessor uses second memory value and a look-up table or a calculation to determine and store a desired rivet head height into a third memory. Next microprocessor preferably activates a rivet drive stage light indicator, enables the rivet gun and continuously monitors encoder 1120 measurements to determine when measurement becomes substantially equivalent to third memory value. Finally microprocessor ceases rivet driving stage by disabling rivet gun when the rivet shop-head button is substantially equivalent to the desired rivet head height.

Therefore, using the above teachings, just before commencing a rivet driving stage and when a described second sensor detects first contact of anvil face 300 with a rivet shank end 70, microprocessor 500 immediately measures and stores into memory the length of protruding shank 80 from work surface 76. (Measuring a protruding shank length is another method of determining a rivet size and a desired rivet head height). Then, microprocessor 500 calculates or otherwise uses a look-up table (also stored in microprocessor memory 504) to determine the optimal or desired rivet set head height 84. This ensures that all rivet heads are set to substantially match a desired set rivet head height 84. Optionally, previously described LED lights 214, 240 may be used to indicate to operators when anvil face 30 first makes contact with either rivet manufactured head 66 or with rivet shank end 70. Also, since measuring protruding rivet shank length and rivet driving stage use the same tool in the same mechanical motion, system 100 can determine the achievement of a desired rivet head height and set a rivet faster than conventional methods that require a plurality of robotic motions to achieve this result. Therefore, the teachings of FIGS. 26, 27A, and 27B may be incorporated into the working end of fully robotic machines to set rivets at a faster rate.

To further clarify, preferably in the embodiment illustrated in FIGS. 27A and 27B when sensors are used, a measurement of protruding rivet shank length is made by storing gap height 314 value when anvil face 300 first contacts rivet shank end 70. This is a measure of protruding shank length and corresponds to a rivet size. Then, with rivet size information the microprocessor 500 uses a lookup table or alternately calculates desired set rivet head height 84 and stores this value into a first memory. Finally, during the rivet driving stage, the measured forming rivet head height is continuously updated into a second memory and when the said forming rivet head height is substantially equal to a desired set rivet head height 84, stored in the first memory, riveting is ceased. In other words, the measured rivet height of the forming rivet head is continuously stored in the second memory and repeatedly compared to desired set rivet head height 84 in first memory and riveting is ceased when these values substantially match.

As previously indicated, after measurement of a protruding shank length (a measure of rivet size) this disclosure also allows for rivet property assessment. Assessment may include rivet material strength based on number of impacts required to achieve a desired rivet head height or may include to precise control of a set rivet by closely matching it a desired rivet head height; this also controls the location of the rivet material strength on a stress-strain curve to optimize rivet set strength and rivet fatigue strength (this are rivet properties). Any means of feedback is permitted to adjust or recommend adjustment of air regulator settings is possible.

Also as previously indicated, the tools provided in this disclosure may be automatically recalibrated by tracking the number of rivets that have been set and then invoking a recalibration test when the rivet number substantially reaches a predetermined number of rivets. In addition, a recalibration procedure can also include an offset determination step where a measure of how close the tool was to a desired calibration distance (at the beginning of a recalibration process) is assessed. In other words an offset distance is a measure of how far out of calibration a first sensor is at the beginning of a re-calibration procedure. If there is no offset distance (or it is very small) the tool is determined to closely match a desired calibration and either not require recalibration or be slightly out of calibration. On the other hand, if there is an offset distance (and particularly if it is large, i.e., large enough to set rivets outside specification limits), the tool is determined to not only to be out of calibration, but may also need to be refurbished or replaced. For example, a control subsystem is operative to determine an offset distance and notify said user of said offset distance, said offset distance being a difference between a first measure and a second measure, said first measure being indicated by said first sensor when a first known distance is sensed between the work surface and the anvil face before a recalibration of the rivet driver and said second measure being indicated by said first sensor when a first known distance is sensed between the work surface and the anvil face upon a recalibration of the rivet driver.

Therefore if the offset distance is determined to be large then the tool likely has been setting rivets to incorrect tolerances prior to the re-calibration checking process. Because rivets are manufactured in various sizes and are used to fasten materials of various thicknesses, the measured protruding shank length will vary; therefore the term "large" related to offset distance is a relative measure determined by those skilled in the art but is generally to be understood as an offset value that is unacceptable because it could produce rivets outside specification limits based on the rivet being set. To prevent this from happening, the predetermined number of rivets that initiated the re-calibration checking process can be automatically reduced. Alternately if the tool is outside acceptable re-calibration parameters, there is likely a component failure (such as a sensor failure) or part wear and the tool may be flagged to be removed from service including being refurbished or replaced. When determining an offset distance, a first measure is a reading of the first sensor when the gap height or distance between the anvil face and work surface is known. A second measure is a reading of the sensor after it has been calibrated to match the known distance between the anvil face and the work surface. Finally the difference between the first measure and the second measure is the offset distance.

Although feedback control has been presented throughout this disclosure, those skilled in the art will recognize that feedforward predictive control strategies can also be used to determine when a forming rivet head height will substantially match a desired rivet head height. For example, by plotting the deforming height of a rivet shank end during the rivet driving stage, a deformation curve showing forming rivet head height and number of impacts can be produced. Those skilled in the art will recognize a plurality of real-time or near real-time analysis methods to determine when a deformation curve will intercept a desired rivet head height and then cease the rivet driving stage. It is understood then that feedforward control may use deformation rate characteristics to determine when the deformation curve intercepts a desired optimal set-point before ceasing riveting. The approach has the potential advantage of eliminating a final rivet driver impact that would set the rivet head height slightly lower than an optimal location (even without feedforward control, the rivet would still be set within specifications).

Those skilled in the art will recognize that a rivet shank deforms more near the beginning of rivet driving stage and less near the end of the rivet driving stage due to material work hardening. This characteristic provides yet another alternate way to determine when a driven rivet head substantially matches a desired rivet head height. In a first example, a microprocessor monitoring a first analogue sensor can determine the slope (or near instantaneous slope) of a rivet deformation curve to determine approximately when a driven rivet head matches a desired rivet head height. In this case the slope is negative and a relatively high scalar value (magnitude) at the beginning of the rivet driving stage and becomes negative and a relatively low scalar near the end of the rivet driving stage. Relative rate of changes in slope or values of slope compared from beginning to near end of the rivet driving stage can be used to assess and determine when a driven rivet head height substantially matches a desired rivet head height.

Likewise in a second example, a microprocessor monitoring a first analogue sensor can determine the amount of rivet shank deformation (or change in protruding rivet shank height) while a rivet undergoes deformation to determine approximately when a driven rivet head matches a desired rivet head height. In this case the deformation magnitude is relatively large at the beginning of the rivet driving stage and comparatively small near the end of the rivet driving stage. Relative rivet shank deformation amounts (per hammer blow) are another way of expressing a rivet deformation curve to assess shank deformation magnitudes from beginning to near end of the rivet driving stage to determine when a driven rivet head height substantially matches a desired rivet head height.

Furthermore, the applicant also recognizes that by assessing near real-time rivet setting parameters such as rate or magnitude of slope or rivet size changes, it may be also possible to determine a rivet size and thus a desired rivet head height. However, because the number of impacts quantitatively relates to the shank deformation (the rate or magnitude of shank slope change or the rate or magnitude of shank deformation change), these examples are considered to be the same approach as limiting the number of impacts during a rivet driving stage, based on rivet size (presented earlier). These examples illustrate how measuring and assessing plastic deformation of a rivet shank can be used as an alternative means for sensing when a rivet has been set to a desired rivet head height. These examples are not limiting, for example plastic deformation could be assessed by a high frequency anvil signature resulting from an impact or by other means for sensing.

Referring again to FIGS. 27A and 27B, in an alternate embodiment a user has an input device to provide the microprocessor with data related to a rivet size being driven. This data may be in the form of a manufacturer's specified rivet size or a protruding shank length. Upon receiving this input from the user, the microprocessor then determines a desired rivet head height. Furthermore, to provide calibration functionality, a user can set the distance between a work surface and an anvil face to a known distance and then so input said known distance into said microprocessor.

Figure 28:
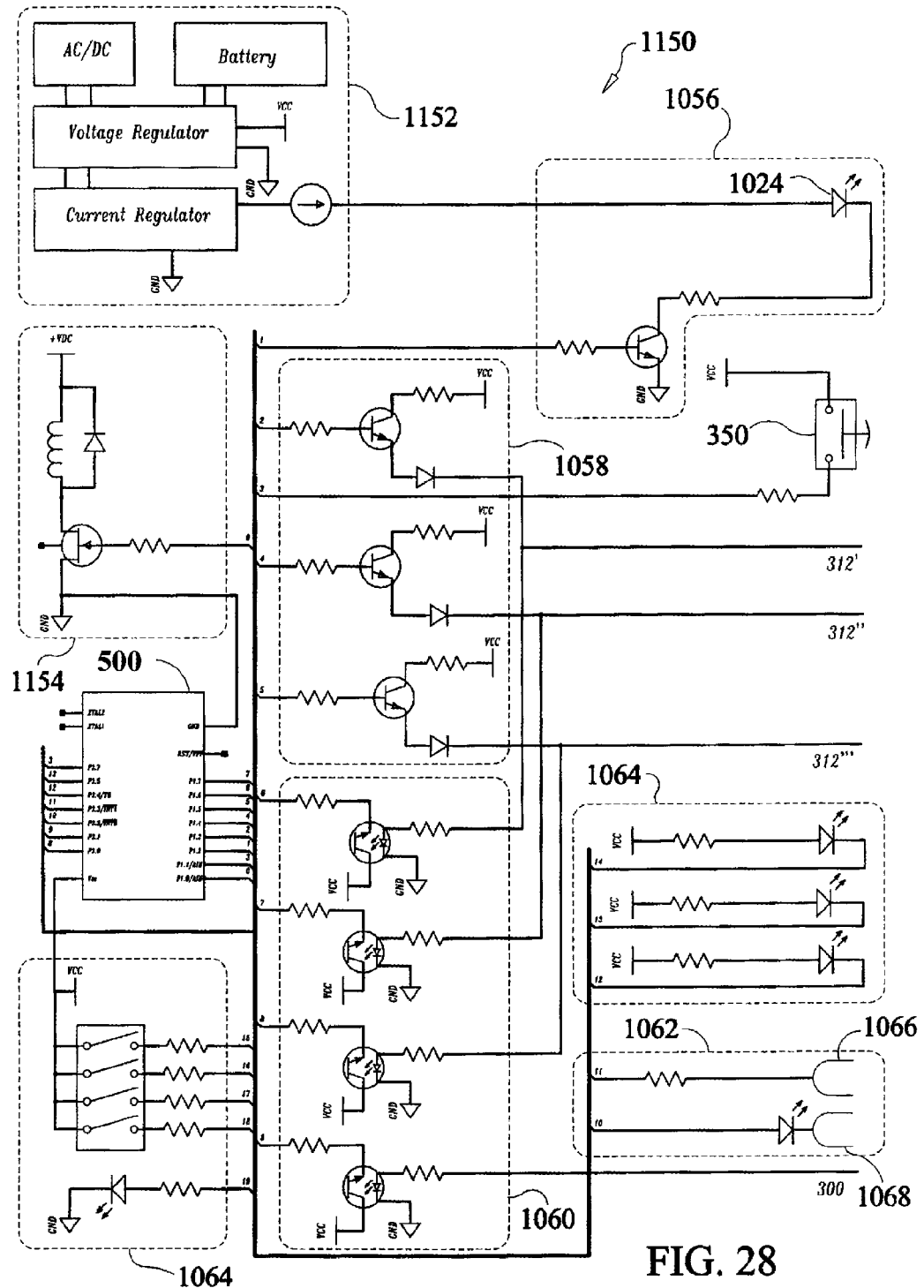
FIG. 28 is a simplified schematic block diagram of yet another simplified embodiment of rivet system that may be applied to teachings previously illustrated in FIGS. 5A, 7A, 7B, 8, 9, 13, 14, 15, 16, 17, 18, 20, 21A, 21B, 24, 25, and 26.

FIG. 28 illustrates a schematic drawing of an illustrative embodiment of the firmware to operate tools provided in the previous teachings. Schematic drawing 1150 includes a power supply block 1152 comprising an AC/DC power converter (utility power supply not shown) and alternately a battery power supply. A voltage regulator supplies desired voltage source (designated VCC) and a current regulator supplies desired current source. A plurality of voltage or current regulators may be used to achieve design goals. Microprocessor 500 operates in accordance with microprocessor instructions and has a plurality of digital input output channels (for purposes of simplicity the microprocessor shown does not show in-system programming or additional input/output ports needed to handle all channels presented). Next, control block 1154 depicts a direct current powered solenoid valve controlled by a field effect transistor from a microprocessor output channel (other power supply and circuit configurations are possible). Next, in light control block 1056, LED 1024 is operative to be an indicator to a user and is operated by a transistor using an output channel from the microprocessor 500 to control LED 1024 lumen output or the on or off state.

Switch 350 is a first sensor and is used to detect when forming rivet head becomes substantially equal to desired rivet head height. Said switch 350 is coupled to a microprocessor input channel. However it is understood by those skilled in the art using teachings of FIG. 9 that analogue LVDT sensor or of FIG. 27 depicting analogue sensor 1120 and target 1121 pair or (any analogue sensor) can alternately be substituted for switch 350; in this case an analogue to digital integrated circuit would be employed prior to coupling to microprocessor input channels.

Next, signal control block 1058 uses microprocessor digital output channels and transistors to supply positive potential power according to microprocessor instructions to spindles feet 312', 312" and/or 312'''. Output signal control block 1058 follows microprocessor instructions allowing the microprocessor digital output channels to switch power supply via transistors to any one of spindles feet 312', 312", and 312'''. These components include transistors and as needed resistors and diodes. This allows the microprocessor to preferably provide power in a sequential step-wise process to any of the spindles feet and is useful because not all spindles feet are necessarily in simultaneous contact with an airframe work surfaces 74 or 76 (a work surface may have a convex or concave shape). Alternately power could also be provided to the anvil face and a loop circuit sensor formed through at least one of the spindles feet, but this is less preferred because upon use the spindles feet preferably come in contact with a conductive material (airframe) before anvil face comes into contact with a conductive material (rivet).

In contact sensor 1060 block, the microprocessor digital input channels are preferably coupled to said spindles feet 312', 312", 312''' and to anvil face 300 (as described in FIGS. 16 and 26) via a multiplicity of optical photocouplers. Preferably photocoupler integrated circuits are sensors for the microprocessor when loop circuits are closed (made). Said microprocessor 500 digital output channels in signal control block 1058 preferably work in conjunction with said digital input channels in contact sensor 1060 block; optionally rapidly switching power in a repeating cycle to at least one of the spindles feet allows same-time detection on at least one of the other spindles feet and/or anvil face. Since said spindles feet are also coupled to signal control block 1058, microprocessor instructions are used to track the spindles feet being supplied with a signal output from signal control block 1058 to avoid negative or false detection of said spindles feet contact. Photocouplers coupled to spindles feet 312', 312" and 312''' serve as fourth sensors to determine spindles feet contact with work surface. A photocoupler coupled to anvil face 300 is a second sensor used to determine when an anvil face contacts a rivet shank end or alternately a rivet manufactured head.

Interface loop circuit sensor block 1062 couples the microprocessor 500 to alligator clips 1066 and 1068 forming a second sensor. Alligator clip 1068 corresponds to a digital output channel and alligator clip 1066 corresponds to a digital input channel. In a first example use, said clip 1068 can be coupled to a set tool while said clip 1066 can be coupled to a work surface to form a loop circuit sensor path capable of detecting when a set tool anvil face contacts a rivet in said work. In a second example use, said clip 1068 can be coupled to a bucking bar anvil while said clip 1066 can be coupled to a work surface to form a loop circuit sensor capable of detecting when a bucking bar anvil face contacts said rivet in said work. In a third example use, said clip 1068 can be used with photo-coupler input 300 to from a loop circuit sensor path to detect anvil face contact with a rivet. Alligator clips 1066 and 1068 are similar to lead wires 220 and 226 in FIG. 8 and provide an alternative loop circuit path to having spindles feet contacts described in FIGS. 16 and 26. Next, indicator block 1063 preferably provides a plurality of LED indicators to provide a user with information about tool alignment according to spindles feet contact with work surface. Indicator block 1063 shows three LED lights, corresponding to those depicted in FIG. 16.

Finally in FIG. 28, user interface block 1064 depicts a multiplicity of switch state settings and a LED indicator to form a user input/output device. Although preferably tip switch detectors in jack plug connects (not shown in drawing) would be used to determine peripheral equipment coupled to the schematic 1150; however alternately, said switch settings of said block 1064 allows users to inform said microprocessor the mode of operation (and consequently what software subroutines to operate) according to the peripheral equipment connected to schematic drawing 1150. The LED in interface block 1064 is capable of providing an operator with mode selection feedback in the form of unique flashing light signals.

FIGS. 29A and 29B present a schematic process flow diagram for software instructions in accordance with a preferred embodiment of the invention illustrated in FIGS. 24 through 27. The flow diagram provides a broad structural framework describing software functionality which, based on the equipment configuration and knowledge of those skilled in the art, may be modified to suite specific needs of the user and accommodate the operation of the tools presented throughout this disclosure. Details of this flow diagram are omitted intentionally for purposes of clarity and brevity and also because it is understood that those skilled in the art can configure software to match the function of the tools using these teachings perhaps also with the flow diagram teachings in FIGS. 12 and 19.

Referring to FIG. 29A, in Step 1, the program starts. In Step 2, the program initializes program settings. Step 3 is the main program and may include the following tasks:

Step 3*a* calls a subroutine to determine the mode of operation.

Step 3*b* calls a subroutine to calibrate the tool; this subroutine may be configured to be called periodically to ensure the tool is recalibrated on a routine basis, e.g., after setting a specific number of rivets.

Step 3*c* calls a subroutine to set the rivet according to the mode determined in the Step 4 subroutine.

Step 3*d* provides fault notification to user, e.g., if a mode of operation could not be determined, a fault is generated to inform the user that the microprocessor could not detect the equipment being used and determine the desired operation mode.

Step 3*e* restarts the main program, e.g., after each rivet setting cycle.

Step 4 is a subroutine to determine the operation mode. The purpose of determining a desired operation mode is to run the correct software based the tools being used and the desired work to be performed. For example, forward riveting tools shown in FIGS. 7A and 7B using the configuration shown in FIG. 8, or tools shown in FIG. 9, 13, 15, or 16, or the configuration shown in FIG. 20 all need to be identified to run the appropriate forward rivet setting software. Back riveting tools depicted in FIGS. 14 and 24 follow a different sequence of operations that requires a different software code. The forward setting tool of FIG. 25 also requires a unique software code. Furthermore, the tool equipment depicted in FIGS. 26 and 27 also require unique software code. Some tools may be equipped only with LEDs for communication, and tool combinations may be used, such as the set tool depicted in FIG. 25 in conjunction with a bucking bar tool depicted in FIG. 26 or 27. Due to these numerous tools and tool combinations, for purposes of brevity while still providing sufficient teachings to those skilled in the art, only selected modes of operation described in Steps 4*a* (Mode A with the FIG. 24 set tool) and 4*f* (defined here using the FIG. 25 set tool and FIGS. 26 and 27 bucking bar tool) are presented later in the rivet set subroutines disclosed herein.

Step 5 is a subroutine for tool calibration. Upon the initialization Step 2, this subroutine is configured to be CALLED the first time the tool is used and then periodically for recalibration after a predetermined number of rivets have been set. Rivet counting logic is included to keep track of the number of rivets set. A two-point tool calibration process is preferably used according to those skilled in the art and communication LEDs, normally used to indicate the stage of the rivet driving process, may be used for feedback to operators to guide them through the calibration process. Calibration is also considered to be understood by those skilled in the art.

Step 6 is a subroutine to set rivets when Mode A was determined in Step 4. Again due to these numerous tools and tool combinations, and for purposes of brevity while still providing sufficient teachings to those skilled in the art, Step 6 describes the process flow for using the set tool described in FIG. 24 with a flush rivet and a standard bucking bar like prior art FIG. 1A. Therefore, the equipment includes: FIG. 8 circuit board assembly 212, wire 220, a multi-conductor cable 236 coupling said assembly 212 to the FIG. 24 set tool (replacing wire 226 in FIG. 8), wires 232, and solenoid 112. In operation, the rivet is set as follows:

In Step 6*a*, flags are cleared and LEDs are turned on to illuminate the work.

In Step 6*b*, the bucker inserts a rivet into a hole and backs it with a conventional or prior art bucking bar on a manufactured flush head. Then, the software detects when FIG. 24 set tool anvil face first contacts rivet shank end and enables the rivet gun by coupling it to an air supply by solenoid actuation.

In Step 6*c*, the height of driven rivet head is continuously measured and stored into a second memory and compared to a desired rivet head height stored in a first memory to determine when the driven rivet head height substantially equals a desired rivet head height. When the determination is made, riveting is ceased and preferably a short timing delay is used to allow the rivet gun operator to fully decouple from the rivet before allowing a next rivet setting cycle to begin.

Also in Step 6*c*, preferably rivet set anvil face contact with the rivet shank end is also monitored to determine if these surfaces become substantially decoupled (breaking loop circuit sensor) during the rivet driving stage because this condition could indicate that the rivet gun operator has prematurely removed the rivet gun from the rivet before the desired rivet set has been achieved. If decoupling is determined, riveting is ceased and LEDs are used to indicate the error to the operator. This allows corrective action.

At the end of Step 6, control is returned to the main program.

Referring to FIG. 29B (which is a continuation of FIG. 29A), Step 7 is a subroutine to set rivets when Mode D was determined in Step 4. Again, due to the numerous disclosed tools and tool combinations, for purposes of brevity while still providing sufficient teachings to those skilled in the art, Step 7 describes the process flow for using the set tool described in FIG. 25 with a bucking bar having features described in FIGS. 26 and 27. Communication between circuit board 212 and bucking bar is RF and multi-conductor cable 236 replaces wire 226. Wire 220 is also used to form a loop circuit sensor to detect when the set tool anvil face is in contact with the universal manufactured head of the rivet. In operation, the rivet is set as follows:

In Step 7*a*, flags are cleared and the LEDs are turned on to illuminate the work.

In Step 7*b*, the rivet gun operator inserts a rivet into a hole and places the rivet set tool (FIG. 25) on the rivet universal head. Then this action is detected by make of loop circuit sensor formed by conductor in cable 236, set tool, anvil face, rivet, work, and wire 220 and then momentarily LEDs flash to indicate that the rivet gun operator is "ready".

In Step 7*c*, bucker then applies a bucking bar (including features illustrated in FIGS. 26 and 27). Bucking bar anvil face contact with the rivet shank end is detected by a loop circuit through spindles feet 312', the work, the rivet, the anvil face, and the hammer stem; then, the protruding rivet shank length is immediately measured and stored into first microprocessor memory. Then, a microprocessor calculates or otherwise uses look-up table to determine desired rivet set head height 84 which is stored into second microprocessor memory. Finally, LEDs flash again to indicate that both operators are "ready".

Step 7*d* is the rivet driving stage. Here, the rivet gun is enabled by coupling the air supply to the rivet gun using a solenoid valve. Throughout the rivet driving stage, at least one software loop continually monitors equipment to determine if the rivet has been set or if either the rivet gun operator or bucker operator disengaged from the rivet during the rivet driving stage. It is understood that if the rivet set tool anvil face substantially decouples from the rivet manufactured head; riveting is immediately ceased and LED lights indicate the fault type to inform the operators about what happened and to restart the riveting process on the same rivet. This fault detection serves to prevent smiley damage caused by the set tool anvil face (illustrated in FIG. 4F). It is further understood that as its name indicates, the bucking bar anvil face literally bounces on the forming rivet head (as illustrated in FIGS. 22 and 23). However, if the bucker were to remove the bucking bar during the rivet driving stage, monitoring in Step 7*d* quickly detects this tool-removal type of decoupling from the bouncing type of decoupling illustrated in FIG. 22 and immediately ceases riveting and similarly LED lights indicate the fault type to inform the operators about what happened and to restart the riveting process on the same rivet. Flow charts are used in this specification to broadly describe system operation; however, they should not be considered limiting. Also, text further augmenting the flowcharts should be considered to be included with flowcharts when applicable.

A person having ordinary skill in the art would understand that the invention has applications in all types of riveting operations. Applications include aircraft manufacture, recreational trailer manufacture; commercial semitrailer manufacture, boat manufacture, and other riveting operations. Other sensors may be incorporated into system 100, including MicroStrain® miniature contact and non-contact sensors, e.g., available at WWW domain microstrain.com. This invention could be incorporated into other machines without limitation.

Figure 30:
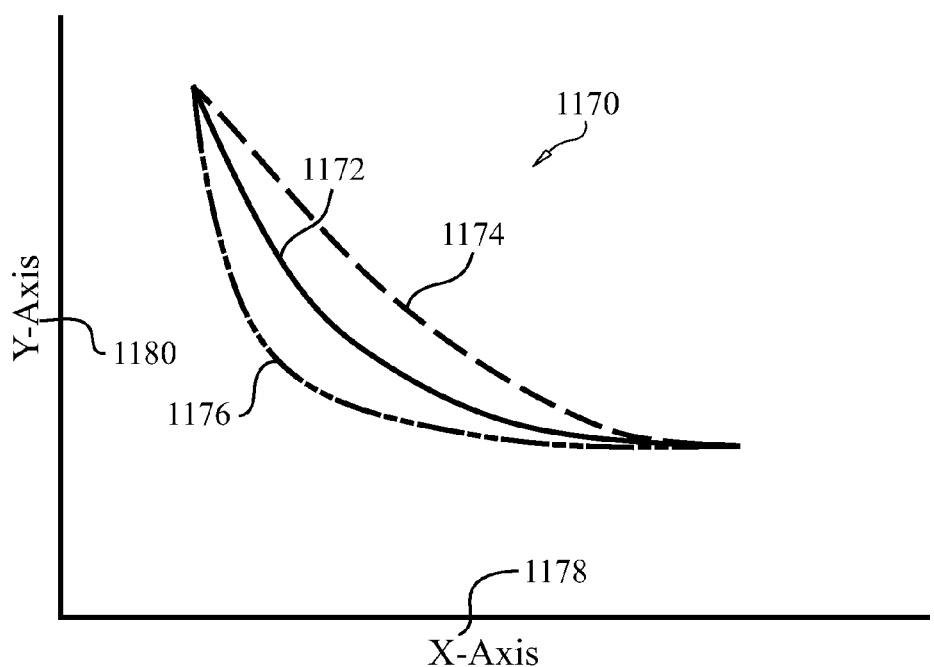
FIG. 30 is a graph depicting a characteristic curve derived from a plurality of rivet driving data sets compared to individually set rivets to illustrate how rivet driving anomalies can be identified that may indicate a rivet setting an error.

FIG. 30 shows a graph 1170 depicting a plurality of rivet setting curves resulting from rivet driving operations. Curve 1172 depicts a characterized representative curve profile derived from a plurality of previously set rivets. Curves 1174 and 1176 depict examples of individual rivet setting curve profiles that are anomalies with respect to curve 1172. In this graph, the X-axis 1178 and Y-axis 1180 may represent any data set plotted according to any combination of the previously described functions described in FIG. 27B and data sets are be categorized match at least one of to the described functions. The graph 1170 is used to illustratively convey how improperly set, defective rivets, or deformed misaligned rivet holes may be identified in a post processing step, for example, at computer database 994 (FIG. 20). Anomalies are preferably indicated to a mechanic via a communication system described in FIG. 20 and stored into computer memory. Curves 1172, 1174 and 1176 are not limiting; other curve shapes are possible.

As previously described, average curve 1172 data can be a function of variables, including at least one of rivet gun hammering frequency and driving air pressure force, or a function of the rivet code (consisting of a rivet material, manufactured head style, rivet shank diameter and rivet length). Therefore, alternate graphs 1170 may be produced for each unique function of rivet driving conditions. For example, the Y-axis 1180 may be representative of a deforming rivet shank (during the rivet driving process) while the X-axis 1178 may be representative of at least one of total driving elapsed time, tally of impacts, or load source force. Other X-Y graphing functions are possible for characterizing vibration, acceleration or frequency spectrum data.

A sixth sensor encoder is capable of measuring a plurality of parameters and will therefore produce a plurality of data for determining anomalies in set quality for each rivet. For example, if graph 1170 may depict number of impacts (X-axis, 1178) versus deforming rivet head height (Y-axis, 1180); in this case the curve 1176 may indicate at least one of a rivet set in misaligned holes, misshaped holes, and an incorrect rivet size. Similarly curve 1174 indicates an anomaly that may be a rivet that is too hard possibly from incorrect material or from improper annealing. These are example illustrations intended to simplistically teach how rivet anomalies may be detected for factory rework even though their rivet set height matches a desired rivet set height. Therefore, these examples are not limiting.

Encoders also measure other rivet driving characteristics, for example, tool vibration, velocity and acceleration. Since rivet-gun impact blow acceleration forces are high (sometimes this g-force is as high as 3,000 g) and occurs nearly instantaneously the system mass (rivet gun including bucking bar and forces applied) becomes somewhat negligible and consequently the mass term in Newton's second law (F=ma) nearly becomes negligible and an acceleration measurement is substantially representative of an active or reactive load source force. An active force is defined as an acceleration derived force from a mechanical load source like a rivet gun and a reactive acceleration response (bucking bar reaction) from an applied impulse load source. These forces are captured and stored in computer 994 (FIG. 20). As previously described, a plurality of step-wise rivet head button heights from sequential impact blow are also collected. This data along with applied load source force (e.g., rivet-gun air pressure, FIG. 20) and a tally of rivet-gun impact blows produces useful data set(s) that can be stored in a database at computer 994 (FIG. 20). By storing and post-processing rivet setting data, typical rivet setting curves can be produced from a plurality of data sets and from which atypical rivet anomalies having curves that are characteristically different can be identified.

Referring to FIGS. 2A and 3, those skilled in the art appreciate that the shank 68 expands radially to fill concentrically aligned and preferably same diameter holes, to join work pieces 72 and 73 together. Opposing clamping forces are created between the rivet manufactured head 66 and rivet deformed button head 86 which produces additional fastening friction force at the boundary layer of work pieces 72 and 73. Using cumulative data sets representing a plurality of set rivets, containing the above described information, post processing analysis of each rivet set can detect rivet set anomalies such as rivet hole-size or rivet material hardness, elasticity or plasticity. Using equipment described in FIG. 20, any anomaly can be reported to the mechanic in real or near-real time. This capability allows for further inspection during the manufacturing process and possibly leading to rework of a flaw that is otherwise undetectable. There is a plurality of possible causes for anomalies. While not limiting, anomaly examples include at least one of non-concentrically aligned holes, incorrect hole sizes (relative to the rivet-size being set), hole deformation(s) resulting from improper drilling, or an air gap 96 (FIG. 4E) and rivet material properties.

In application, at least one post-processing analysis tool would compare a first data set representing each driven rivet curve to a second data set containing an equivalent, similar or otherwise categorically matched rivet-curve produced from a database containing a plurality of previously driven rivets. By preferably categorically sharing at least one function parameter, the analysis tool can better compare data sets representative of similar rivet driving conditions. Possible shared parameter(s) include at least one of a pre-rivet protruding length, a driven air pressure setting, a rivet-gun hammering frequency and a number of impacts required to achieve rivet set. Post processing would compare the curve for the driven rivet (derived from sequential measurements of the deforming rivet head during the driving stage) to the equivalent representative curve of a plurality of previously driven rivets. If a curve comparison anomaly was detected the rivet could be flagged, stored and indicated to a mechanic for further inspection during aircraft manufacture. This approach is not limiting, it also applies to press-driven rivets (driven in a single motion, e.g., from a hydraulic press); however in this case it compares rivet-set parameters such as load source force required to achieve the rivet set or the elapsed setting time rather than sequential rivet length measurements from repetitious rivet-gun hammer blows. These teachings can all be applied to FIG. 30.

This disclosure describes circuit boards in many forms, including master circuit board and circuit board subassembly. It is understood that descriptions of circuit boards were to simplify the invention for teaching purposes and that these descriptions should not be limiting. Also, in many instances, wires were used for communication where wireless communication is also possible. Furthermore, the power supply used to impart rivet deforming energy may be an air supply if the rivet driver is pneumatically powered or other type of power supply if the rivet driver is powered other than pneumatically. Also, although this disclosure provides means for detecting when a deforming rivet shank substantially matches a desired rivet head height and then ceases riveting, preferably, the desired rivet head height lies within a desired range of manufacturing specifications or tolerances (between upper and lower specification limits); however, using the teachings of this disclosure—more preferably the desired rivet head height may have significantly tighter specifications than is otherwise conventionally achievable with prior art manually operated equipment. Those skilled in the art will recognize that the disclosure is for illustration and teaching purposes and is not limiting.

Many variations of the invention will occur to those skilled in the art. Some variations include hard wired variations and others call for wireless variations. Other variations call for forward riveting and others call for back riveting. Still other variations serve to eliminate damage event conditions caused to the rivet manufactured head by the set tool anvil face. Variations further include controlling air pressure and air flow and reporting the manufacturing progress to a central computer. All such variations are intended to be within the scope and spirit of the invention.

Although some embodiments are shown to include certain features, the applicant specifically contemplates that any feature disclosed herein may be used together or in combination with any other feature on any embodiment of the invention. It is also contemplated that any feature may be specifically excluded from any embodiment of the invention.

The embodiments of the invention in which an exclusive property or privilege is claimed are defined as follows:

1. A system for fastening a rivet in a work piece with a rivet driver, the workpiece having a work surface, said rivet having a manufactured head, a shank, and a shank end, the shank and shank end nominally projecting from said work surface, said system comprising:
    an anvil having an anvil face;
    a plunger slidably engaged with said anvil, said plunger having a distal end, said distal end nominally extending beyond said anvil face;
    a load source that is operative to nominally urge said plunger distal end forward relative to said anvil face while said distal end maintains in contact with a work surface;
    a sensor subsystem that is operative to sense the distance between said distal end and said anvil face and produce a first input signal related to said distance; and
    a control subsystem comprising a controller; said controller subsystem operative to:
        enable and disable the rivet driver;
        receive said first input signal from said sensor subsystem;
        measure a protruding rivet shank length;
        determine a desired rivet head height;
        monitor subsequently produced first input signals;
        determine when one of said subsequently produced first input signals is substantially equal to said desired rivet head height;
        send an output signal to the controller; and
        disable the rivet driver when said distance is substantially equal to said desired rivet head height;
    wherein said distal end is nominally in contact with said work surface when driving a rivet and said sensed distance is nominally a height of the rivet shank or of a deforming shop-head button projecting from said work surface.

2. The system of claim 1 wherein:
    (a) said sensor subsystem comprising:
        an encoder sensor operative to produce said distance;
        a timer operative to time an event; and
        a software operative to said determine; and
    (b) said control subsystem operative to use said sensor subsystem to substantially determine said protruding shank length to be substantially equal to said distance and representative of a shank length nominally projecting from said work surface upon a first contact of said anvil face with a rivet shank end.

3. The system of claim 2 wherein:
    (a) said sensor subsystem comprising:
        an encoder sensor operative to produce said distance;
        a contact sensor operative to detect when said anvil face first contacts a rivet shank end; and
        a software operative to said determine; and
    (b) said control subsystem operative to use said sensor subsystem to substantially determine said protruding shank length to be substantially equal to said distance and representative of a shank length nominally projecting from said work surface upon a first contact of said anvil face with a rivet shank end.

4. The system of claim 1 wherein:
    (a) said sensor subsystem comprising:
        an encoder sensor operative to produce said distance;
        a contact sensor operative to detect when said anvil face first contacts a rivet shank end; and
        a software operative to said determine; and (b) said control subsystem operative to use said sensor subsystem to substantially determine said protruding shank length to be substantially equal to said distance and representative of a shank length nominally projecting from said work surface upon a first contact of said anvil face with a rivet shank end.

\* \* \* \* \*